(12) United States Patent
Lim et al.

(10) Patent No.: US 11,013,249 B2
(45) Date of Patent: May 25, 2021

(54) COMPOSITIONS FOR CONTROLLED RELEASE OF VOLATILE COMPOUNDS

(71) Applicant: University of Guelph, Guelph (CA)

(72) Inventors: Loong-Tak Lim, Guelph (CA); Wenjing Wang, Guelph (CA); Wenyu Huang, Guelph (CA)

(73) Assignee: UNIVERSITY OF GUELPH

( * ) Notice: Subject to any disclaimer, the term of this patent is extended or adjusted under 35 U.S.C. 154(b) by 0 days.

(21) Appl. No.: 16/301,365

(22) PCT Filed: May 12, 2017

(86) PCT No.: PCT/CA2017/050573
§ 371 (c)(1),
(2) Date: Nov. 13, 2018

(87) PCT Pub. No.: WO2017/193221
PCT Pub. Date: Nov. 16, 2017

(65) Prior Publication Data
US 2019/0200651 A1    Jul. 4, 2019

Related U.S. Application Data

(60) Provisional application No. 62/335,964, filed on May 13, 2016.

(51) Int. Cl.
| | |
|---|---|
| *A01N 31/08* | (2006.01) |
| *A01N 25/10* | (2006.01) |
| *A01N 25/34* | (2006.01) |
| *A01N 35/02* | (2006.01) |
| *A01N 47/46* | (2006.01) |
| *A23L 3/349* | (2006.01) |
| *A23L 3/3499* | (2006.01) |
| *A23L 3/3535* | (2006.01) |
| *A23L 3/3463* | (2006.01) |
| *B65D 81/28* | (2006.01) |

(52) U.S. Cl.
CPC .......... *A23L 3/34635* (2013.01); *A01N 25/10* (2013.01); *A01N 25/34* (2013.01); *A01N 31/08* (2013.01); *A01N 35/02* (2013.01); *A01N 47/46* (2013.01); *A23L 3/349* (2013.01); *A23L 3/3463* (2013.01); *A23L 3/3499* (2013.01); *A23L 3/3535* (2013.01); *B65D 81/28* (2013.01); *A23V 2002/00* (2013.01)

(58) Field of Classification Search
CPC ........ A01N 31/08; A01N 35/02; A01N 47/46; A23L 3/349; A23L 3/3499; A23L 3/3535; A23L 3/3463; B65D 8/28
See application file for complete search history.

(56) References Cited

U.S. PATENT DOCUMENTS

2009/0186096 A1    7/2009   Kritzman et al.

FOREIGN PATENT DOCUMENTS

| CA | 2935237 | 7/2015 |
|---|---|---|
| CN | 1840196 | 10/2006 |
| CN | 102274177 | 12/2011 |
| CN | 104686561 | 6/2015 |
| WO | WO2006000032 | 1/2006 |
| WO | WO2014165969 | 10/2014 |

*Primary Examiner* — Zohreh A Fay
(74) *Attorney, Agent, or Firm* — Morriss O'Bryant; Compagni Cannon, PLLC

(57) ABSTRACT

It is provided a composition for controlled-release of volatile compounds comprising at least one poly(ethylene glycol) (PEG) polymer and one or more volatile compounds, the composition used for preserving food when incorporated in a food packaging. The volatile compounds are antimicrobial compounds such as allyl isothiocyanate (AITC), diacetyl, cinnamaldehyde, thymol, carvacrol and a combination thereof. The composition can comprise a blend of two or more PEG polymers of different molecular weights and/or a mixture of poly(lactic acid) (PLA) and poly(ethylene oxide) (PEO).

22 Claims, 26 Drawing Sheets

COMPOSITIONS FOR CONTROLLED RELEASE OF VOLATILE COMPOUNDS

CROSS-REFERENCE TO RELATED APPLICATIONS

This application is a national phase entry under 35 U.S.C. § 371 of PCT/CA2017/050573 filed on May 12, 2017, which claims priority to U.S. Provisional Patent Application No. 62/335,964 filed on May 13, 2016, the entirety of each of which is incorporated by this reference.

TECHNICAL FIELD

The present application relates to compositions for controlled release of volatile compounds and methods of use thereof.

BACKGROUND

Active packaging systems interact with food and/or the environment (internal/external), which in turn carry out a desirable action to enhance the protective function of the package, for the purpose of extending the product's shelf-life, maintaining/enhancing product quality, and ensuring safety. Antimicrobial active packaging relies on a controlled release mechanism to deliver antimicrobial compounds to inhibit the growth of microorganisms. Depending on their volatility, the antimicrobial species may be delivered by direct diffusion to the food contact surfaces, or indirectly by first vaporization into the headspace followed by solubilisation onto the food surfaces. Because the antimicrobial species are being directed to the surface where spoilage tends to occur, antimicrobial active packaging can effectively inhibit the growth of spoilage and pathogenic microorganisms on food surfaces using a lower of quantity of preservative.

Volatile antimicrobial compounds have been widely used in antimicrobial active packaging. Allyl isothiocyanate (AITC), diacetyl and cinnamaldehyde are well-studied volatile antimicrobial compounds effective to inhibit the growth of spoilage and pathogenic microorganisms in food. However, direct addition of these antimicrobial compounds to food and/or packaging structures can be problematic due to their rapid release to the headspace, impacting sensory and quality attributes of food. For example, discoloration in chicken breast was observed when AITC is used as an antimicrobial agent. Flavor changes in cooked rice and cheese have been reported after AITC treatment due to the presence of residual above the sensory detection threshold. Other studies show that physiological damages can occur when berries were treated with AITC, resulting in reductions in phenolics and anthocyanins contents. In order to achieve a maximal antimicrobial efficacy while minimizing sensory/quality attribute impacts, volatile antimicrobials are often encapsulated within formulated polymeric matrices to manipulate their release profiles.

There are many disadvantages of using a sole antimicrobial compound for food preservation. Because of their strong aroma profiles, undesirable sensory properties may occur in certain food products before achieving the minimal inhibitory concentration.

To mitigate these risks, one solution is to utilize the synergistic or additive effects of combined antimicrobial compounds to minimize the unintended sensory changes induced by sole antimicrobial agent and provide broader antimicrobial spectrum. There are still uncertainties of using combined antimicrobial compounds for food preservation. Synergistic effects potentially observed can be influenced by phytochemicals present in plant tissues, types of microorganisms, and composition of the food matrix. Also, undesirable off-flavor may still be an issue if the antimicrobials are not compatible with the inherent sensory properties anticipated by the consumers. In some cases, combining antimicrobial agents, such as nisin and diacetyl, may result in antagonistic effects.

Antimicrobial compounds used for active packaging purposes are usually unstable during storage (e.g., degradation, evaporation loss) and, therefore, must be protected. Moreover, to facilitate the handling and deployment of liquid antimicrobials, these compounds are often immobilized in solid-state matrices. To this end, various microencapsulation methodologies have been investigated not only to preserve the activity of the antimicrobials, but also to control the release of these compounds according to the change of environmental conditions to maximise their efficacy.

Microencapsulation allows the incorporated active compounds to migrate and release from carriers to headspace or products. It is a process that incorporates active ingredients (also known as core material or fill) within carrier materials (also known as wall material or shell), forming a reservoir encapsulate. Alternatively, the active compounds, together with other additives, are dispersed throughout the carrier material, forming a matrix encapsulate. The matrix encapsulate can be further structured to include a wall material.

Diacetyl and cinnamaldehyde are potent naturally occurring antimicrobial agents promising for food preservation. These compounds are potentially useful for modified atmosphere packaging applications, especially when they are being used as antimicrobial vapours concurrently to achieve synergistic antimicrobial efficacy. Since AITC and diacetyl are volatile (0.49 and 6.9 kPa at 20° C., respectively), the vaporization of these antimicrobial compounds has to be controlled in order to achieve the desired headspace concentration within the package. Moreover, the compounds must be protected to increase their stability during storage, as well as to facilitate the end use handling/deployment in food packaging.

There is thus still a need to be provided with a mean to control release of volatile compounds in food packaging.

SUMMARY

In accordance with the present disclosure, it is provided a composition for controlled-release of volatile compounds comprising at least one poly(ethylene glycol) (PEG) polymer and one or more volatile compounds.

In an embodiment, the one or more volatile compounds are antimicrobial compounds.

In another embodiment, the composition described herein further comprises poly(lactic acid) (PLA).

In a further embodiment, the composition comprises a blend of two or more PEG polymers of different molecular weights.

In an additional embodiment, the two or more PEG polymers have a molecular mass from about 100 Da to about 50,000 Da.

In another embodiment, the two or more PEG polymers are selected from PEG polymers of molecular mass 400 Da (PEG400) and PEG polymers of molecular mass 10,000 Da (PEG10K).

In an embodiment, the two or more PEG polymers are PEG400 and PEG10K in a ratio by weight of PEG400 and PEG10K from about 1:4 to about 4:1.

In an embodiment, the ratio by weight of PEG400 and PEG10K is 4:1.

In another embodiment, the composition described herein comprises from about 0.01% (w/w) to about 50% (w/w) of volatile compounds.

In a further embodiment, the composition described herein comprises from about 0.05% (w/w) to about 5% (w/w) of volatile compounds.

In another embodiment, the one or more volatile compounds are present in an amount of from about 20% (w/w) to about 50% (w/w).

In an additional embodiment, the one or more volatile compounds are present in an amount of from about 30% (w/w) to about 35% (w/w).

In a further embodiment, the antimicrobial compounds are selected from allyl isothiocyanate (AITC), diacetyl, cinnamaldehyde, thymol, carvacrol and a combination thereof.

In another embodiment, the antimicrobial compounds are selected from allyl isothiocyanate (AITC), diacetyl and a combination thereof.

In an additional embodiment, the composition described herein comprises a mixture of diacetyl and AITC.

In a further embodiment, the ratio of diacetyl:AITC is between 10:1 to 1:1.

In an additional embodiment, the composition described herein comprises a mixture of diacetyl:AITC in a ratio of 1:1.

In an additional embodiment, the composition described herein comprises a mixture of diacetyl, AITC and cinnamaldehyde.

In an embodiment, the composition described herein comprises a mixture of AITC:diacetyl:cinnamaldehyde in a ratio of 1:4:60.

In an embodiment, the one or more volatile compounds are disperse in a carrier.

In another embodiment, the carrier is electrospun fibers.

In a further embodiment, the electrospun fibers are produced by electrospinning.

In an additional embodiment, the composition described herein comprises a mixture of poly(lactic acid) (PLA) and poly(ethylene oxide) (PEO).

In an additional embodiment, the composition described herein comprises a mixture of PLA:PEO in a ratio of 7:3.

In an additional embodiment, the composition described herein further comprises cellulose.

In an embodiment, the cellulose is ethylcellulose or cellulose acetate.

It is also provided a method of preserving food comprising storing food in the presence of the composition as described herein.

In an embodiment, the food is selected from fruits, vegetables, bakery products, fresh pastas and fresh meat.

It is additionally provided a packaging material for preserving food comprising the composition as described herein.

BRIEF DESCRIPTION OF THE DRAWINGS

Reference will now be made to the accompanying drawings.

DETAILED DESCRIPTION

Figure 1:
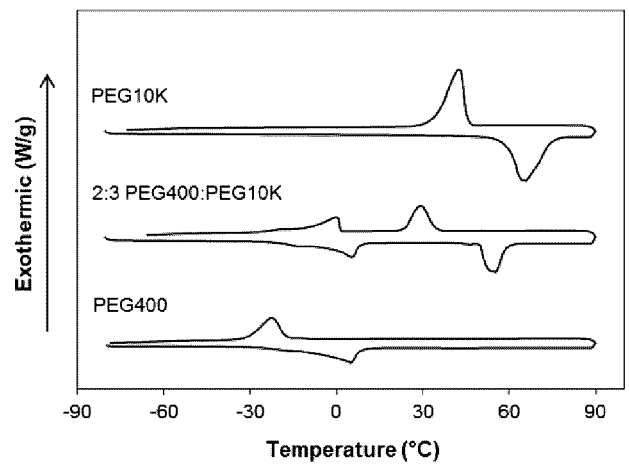
FIG. 1 shows the thermograms of heating followed by cooling cycle of PEG400, PEG10K and their blends, cooling and heating rates: 10° C./min.

In accordance with the present description, there is provided a composition for controlled-release of volatile compounds comprising a blend of two or more poly(ethylene glycol) (PEG) polymers having different molecular weights and one or more volatile compounds.

The present application also relates to a composition for controlled-release of volatile compounds comprising a blend of poly(lactic acid) (PLA) and poly(ethylene oxide) (PEO) polymer nonwoven fibers and one or more volatile compounds.

The present application also further relates to a combination product comprising a PEG polymer composition of the application and a PLA-PEO composition of the application.

The present application relates to a method of preserving food comprising storing food in the presence of a PEG composition of the application or a PEO-PLA composition of the application or combinations thereof.

Recent consumer preference for fresh and minimally processed foods has presented considerable challenges because these products are susceptible to microbial growth. Premature product spoilage not only shortens shelf-life which is essential for distribution and sales, but also causes food wastage. To address the product stability issues and achieve adequate product shelf-life, many packaging innovations have emerged, such as using packaging structures that exhibit antimicrobial properties. This variant of packaging systems delay/prevent undesirable microbial activities through controlled release of antimicrobial compounds, either directly onto the surface of foods or releasing the antimicrobial volatiles into the package headspace. Because antimicrobial active packaging provides preservative effects primarily on surfaces of food matrix where most food spoilage occur, the dosage of the antimicrobial compound needed tends to be lower than the traditional approach of adding the preservatives into the food matrices. The non-contact delivery of antimicrobial can be beneficial in packages with a large headspace volume, where direct diffusion of antimicrobial from the package structure onto food surfaces is not feasible. This mode of active packaging can be considered as one variant of modified atmosphere packaging, where the headspace air composition is modified to achieve antimicrobial effect. The efficacy of the volatile antimicrobials depends on a number of parameters; of particular importance are the release rate of the volatiles into the headspace and solubilization of volatile onto the surface of food.

Diacetyl (2,3-butanedione) is a metabolic by-product of many microorganisms, such as the lactic acid bacteria (LAB; e.g., *Lactococcus, Leuconostoc, Lactobacillus* and *Pediococcus*). It is naturally-present in dairy products, wines, coffee, and fermented food. Diacetyl has a wide antimicrobial spectrum, including yeast, Gram-positive and Gram-negative bacteria. Studies revealed that diacetyl has higher inhibitory efficacies on fungi and Gram-negative bacteria than on Gram-positive non-lactic acid bacteria, but has no effect on LAB—the producer of diacetyl.

AITC is a naturally occurring compound responsible for the characteristic flavor of mustard seeds and other vegetables from the Brassicaceae family. Its potency against spoilage and pathogenic microorganisms has been well documented in the literature. In general, AITC is more effective against Gram-negative than Gram-positive bacteria. The compound is more effective in its gaseous phase than its liquid phase. Also, AITC is more potent against strictly aerobic than facultative anaerobic bacteria.

Diacetyl and AITC have strong flavor attributes. Therefore, their potential impact on the sensory attributes of the product must be considered when they are being deployed in active packaging applications. Saturated vapor pressures of AITC and diacetyl increase from ~140 to 1500 Pa and ~2400 to 20100 Pa, respectively, as temperature increases from 5 to 45° C. Direct addition of liquid diacetyl and AITC is not optimal due to rapid evaporation, which may pose sensory issues. Moreover, a sustained release of volatile to exert continuous antimicrobial effect will be difficult.

On the basis of strong bacteriostatic properties of diacetyl and AITC, these compounds are promising for active antimicrobial packaging applications. Accordingly, it is demonstrated herein that PEG blends as a carrier for controlling the release of diacetyl and AITC vapours to inhibit the growth of microorganisms in food.

Methodologies are described herein to co-disperse diacetyl and AITC in semi-crystalline polymeric carriers, prepared by melt blending of PEG polymers of two different molecular weights. Release behaviors of diacetyl and AITC vapors from the PEG blends were evaluated under various humidity conditions. To elucidate the release behaviors of the PEG carriers, thermal properties and crystalline morphology of the molten PEG blends were evaluated. Antimicrobial properties were tested on two model spoilage microorganisms, *Pseudomonas Fluorescens* and *Pythium aphanidermatum*, which are associated with the spoilage of fruits and vegetables.

As described herein, solidification, diacetyl/AITC impregnated PEG sheeting were formed and the release properties of diacetyl and AITC vapours from the PEG matrices were determined by using an automatic headspace sampling system.

The thermal properties of PEG blends with and without antimicrobial compounds were studied using a differential scanning calorimeter and microstructures of the PEG blends were examined using a light microscope. Scanning electron microscopy (SEM) was used to further observe the grain boundaries between PEG crystals. Water sorption capacity of PEG blends was evaluated gravimetrically.

Polyethylene glycol (PEG) is a polyether compound. PEG is also known as polyethylene oxide (PEO) or polyoxyethylene (POE), depending on its molecular weight.

The thermograms of PEG400, PEG10K and their blends, during the heating followed by cooling cycles, are presented in FIG. 1. As shown, PEG400 had melting ($T_m$) and crystallization ($T_c$) temperatures of 6.2 and −10.9° C., respectively. In comparison, PEG10K had higher $T_m$ and $T_c$ at 65.8 and 42.3° C., respectively. The crystallinity ($X_c$) of PEG increased with molecular weight (52.9% for PEG400 and 96.8% for PEG10K). The increase in crystallinity as molecular weight increased can be attributed to the reduced segmental mobility of the longer polymer chain, favoring the chain packing of the crystallites. FIG. 1 also shows that blending the PEG polymers resulted in considerable shifts in $T_m$ for the PEG10K fraction to a lower value, but negligible shift in $T_m$ for the PEG400 fraction, as compared with the respective pristine polymers. This observation suggested that the presence of PEG10K did not interfere the chain packing of the PEG400 crystallites, but the smaller PEG400 polymers did interfere with the interlamellar packing for the PEG10K fraction, resulting in imperfections in the crystallites that melted at lower temperature. On the other hand, blending the PEG polymers resulted in significant shift of $T_c$ values to higher and lower values for PEG400 and PEG10K, respectively, as compared to the pure polymers. This observation indicates that the presence of PEG400 interfered with the crystallization of PEG10K during cooling, while PEG10K appeared to act as a nucleating agent, promoting the crystallization of PEG400 at higher temperature during cooling.

The addition of diacetyl and AITC lowered $T_m$ and $T_c$, as well as the respective enthalpy values (Table 1), indicating that the loaded volatile compounds hindered the nucleation and/or lamellar packing of PEG polymer chains. The crystallinity values of the PEG10K fraction were not significantly ($p>0.05$) affected by the amount of diacetyl/AITC loaded, even though the enthalpies of melting decreased significantly ($p<0.05$), due to the decreasing PEG10K fraction (i.e., decreasing w value) when the antimicrobials were added to the blend. This result suggests that both diacetyl and AITC were not being incorporated into the lamellae of the spherulite structures as PEG10K crystallized; these compounds likely remained dissolved in the amorphous region of the PEG matrix.

Figure 2:
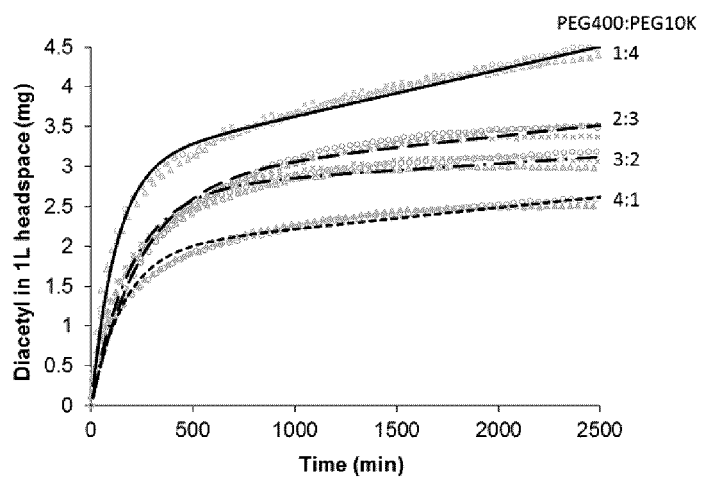
FIG. 2 shows the effect of PEG blend ratio on the amount (mg) of diacetyl released into one liter headspace from one gram of PEG blend at 25° C., wherein symbols are experimental data in triplicate, solid/dash lines are fitted model, and all samples are in same thickness (1 mm) with one surface expose to the headspace air.
Figure 3:
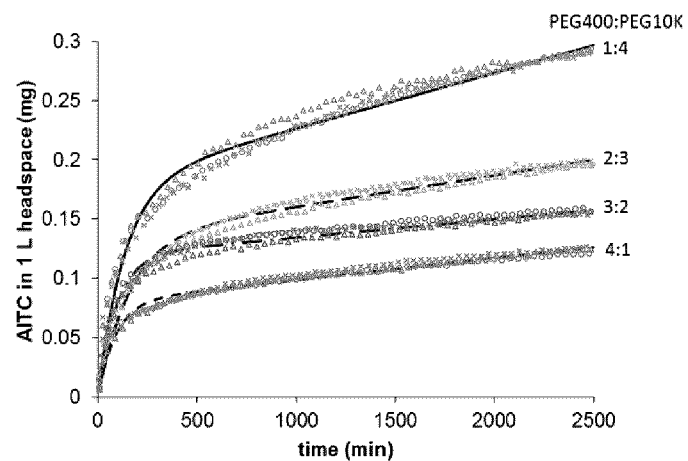
FIG. 3 shows the effect of PEG blend ratio on the amount (mg) of AITC released into one liter headspace from one gram of PEG blend at 25° C., wherein symbols are experimental data in triplicate, solid/dash lines are fitted model, and all samples are in same thickness (1 mm) with one surface expose to the headspace air.
Figure 4:
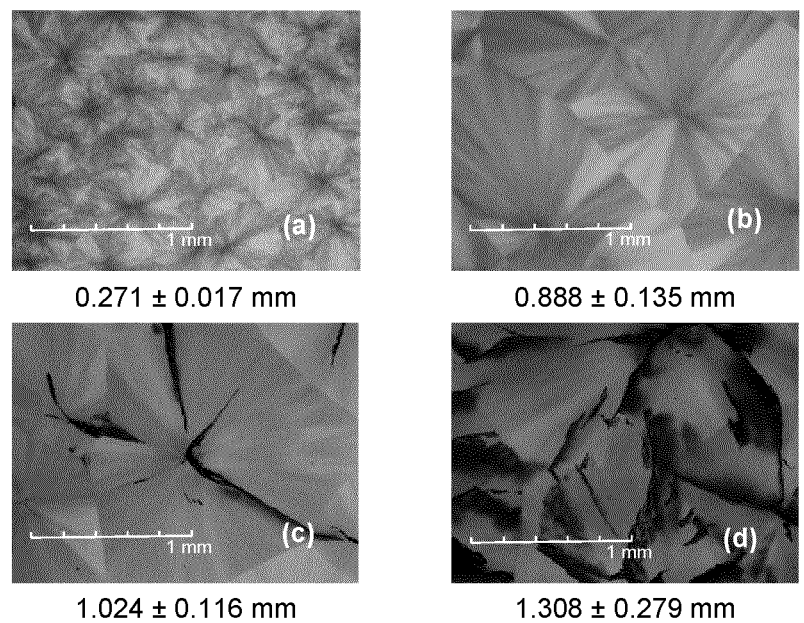
FIG. 4 shows the light micrographs of PEG blends after cooling to room temperature (~22° C.) of (a) 4:1 PEG400:PEG10K; (b) 3:2; (c) 2:3; and (d) 1:4, numbers under the micrographs are average crystal sizes (n=40).

FIGS. 3 and 4 summarize the concurrent release profiles of diacetyl and AITC from the PEG blends. As shown, the higher the proportion of PEG10K, the greater the amounts of the volatiles were being released. This observation can be attributed to the increased concentration of diacetyl and AITC in the PEG400 phase (liquid at room temperature) as more PEG10K fraction was being crystallized, creating a greater concentration gradient that resulted in faster vaporization rate. FIGS. 2 and 3 also show that AITC and diacetyl displayed two different release mechanisms, i.e., rapid release that characterized the initial phase of mass transfer, and slow release that displayed approximate linear trends within the time frame of the experiments. The fast release is likely attributable to the rapid vaporization of species on or near the surface of the PEG matrix. The second slower release mechanism is likely caused by the release of AITC and diacetyl from the grain boundaries between PEG10K spherulies as discussed below.

Table 3 summarizes fitted model for diacetyl and AITC release kinetics at 25° C., as affect by PEG10K content. As shown, $R^2$ values are greater than 0.98, indicating that the

TABLE 1

Melting and crystallization temperature/enthalpy of 3:2 PEG400:PEG10K with different loadings of diacetyl/AITC.

| Diacetyl/AITC loading | Temperature (° C.) | | Enthalpy (J/g sample) | | |
|---|---|---|---|---|---|
| | $T_m$ | $T_c$ | $\Delta H_m$ | $\Delta H_c$ | $X_c$ (%) |
| 0% | 55.16 ± 0.24[a] | 31.50 ± 0.31[a] | 74.26 ± 0.89[a] | 70.12 ± 0.28[a] | 98.54 ± 1.18[a] |
| 1% | 54.21 ± 0.48[b] | 30.38 ± 0.37[b] | 72.33 ± 0.61[b] | 66.72 ± 0.51[b] | 96.95 ± 0.81[a] |
| 10% | 51.00 ± 0.13[c] | 26.63 ± 0.48[c] | 66.80 ± 1.25[c] | 61.58 ± 0.15[c] | 98.49 ± 1.85[a] |

Values are mean ± standard deviation (n = 3). Means within a column with different superscript letters indicate statistical significant difference (p < 0.05). Statistical analysis was conducted using one-way ANOVA with Tukey's post-hoc test.

In the presence of diacetyl and AITC (1% loading), Table 2 summarizes the $T_c$ and $T_m$ values for the PEG fraction in various PEG blends. The $T_m$ and $T_c$ for the PEG10K fraction decreased from 63 to 53° C. and 41 to 24° C., respectively, as PEG400 content increased from 0 to 80%. The temperature shifts followed a similar trend shown in FIG. 1. Crystallinity of the PEG10K fraction did not vary significantly ($p>0.05$) with PEG400 content, indicating that the presence of PEG400 did not significantly change the heat capacity of the crystalline PEG10K. The decreasing melting and crystallization enthalpies as the PEG400 fraction decreased showed that there was an overall reduction in total crystallite content in the PEG blend due to the substitution of crystalline PEG10K with amorphous PEG400.

model described the release profiles well. In general, the higher the PEG10K fraction, the lower the k value because of the increased total crystallite contents in the PEG blend, thereby reducing the diffusivity of the volatile molecules. At 2:3 PEG400:PEG10K blend ratio, boundary defects started to appear as dark features on the micrographs. At 1:4 PEG400:PEG10K blend ratio, considerable crystal defects can be seen, appearing as dark lines, crevices, and cracked faces on the micrographs (FIG. 4 (d)). These defects might have increased the total surface area of the PEG matrix, resulting in increased release rate of diacetyl and AITC vapors.

TABLE 2

Melting and crystallization temperature and enthalpy of PEG10K fraction with 1% diacetyl/AITC loading.

| PEG blends PEG400:PEG10K | Temperature (° C.) | | Enthalpy (J/g sample) | | Degree of crystallinity (%) |
|---|---|---|---|---|---|
| | $T_m$ | $T_c$ | Melting | Crystallization | |
| 4:1 | 52.58 ± 0.48[a] | 23.55 ± 0.09[a] | 35.83 ± 0.55[a] | 33.32 ± 0.58[a] | 96.05 ± 1.48[a] |
| 3:2 | 54.21 ± 0.49[b] | 30.38 ± 0.37[b] | 72.33 ± 0.61[b] | 66.72 ± 0.51[b] | 96.95 ± 0.81[a] |
| 2:3 | 56.24 ± 0.34[c] | 33.95 ± 0.68[c] | 108.05 ± 1.39[c] | 101.38 ± 1.33[c] | 96.55 ± 1.24[a] |
| 1:4 | 59.14 ± 0.73[d] | 36.89 ± 1.10[d] | 145.77 ± 1.21[d] | 136.93 ± 0.50[d] | 97.69 ± 0.81[a] |
| 0:5 | 62.85 ± 0.51[e] | 41.14 ± 0.76[e] | 182.37 ± 0.95[e] | 179.63 ± 0.72[e] | 97.77 ± 0.51[a] |

Values are mean ± standard deviation (n = 4). Means within a column with different superscript letters indicate statistical significant difference (p < 0.05). Statistical analysis was conducted using one-way ANOVA with Tukey's post-hoc test.

TABLE 3

Parameters of fitted model for diacetyl and AITC release kinetics at 25° C., as affect by PEG10K content.

| PEG400:PEG10K | $C_\infty$ (mg/L) Diacetyl | $C_\infty$ (mg/L) AITC | $k$ (h$^{-1}$) Diacetyl | $k$ (h$^{-1}$) AITC | $\alpha$ (h$^{-1}$) Diacetyl | $\alpha$ (h$^{-1}$) AITC | $R^2$ Diacetyl | $R^2$ AITC |
|---|---|---|---|---|---|---|---|---|
| 4:1 | 1.957 ± 0.026 $^a$ | 0.0796 ± 0.00086 $^a$ | 0.00807 ± 0.00067 $^a$ | 0.01437 ± 0.00291 $^a$ | 2.64 × 10$^{-4}$ ± 1.2 × 10$^{-5}$ $^a$ | 1.88 × 10$^{-5}$ ± 1.56 × 10$^{-6}$ $^a$ | 0.988 | 0.993 |
| 3:2 | 2.563 ± 0.282 $^b$ | 0.1188 ± 0.00583 $^b$ | 0.00656 ± 0.00046 $^{ab}$ | 0.01353 ± 0.00023 $^a$ | 1.67 × 10$^{-4}$ ± 4.1 × 10$^{-5}$ $^a$ | 1.55 × 10$^{-5}$ ± 2.21 × 10$^{-6}$ $^{ab}$ | 0.990 | 0.992 |
| 2:3 | 2.858 ± 0.158 $^{bc}$ | 0.1340 ± 0.00649 $^b$ | 0.00529 ± 0.00078 $^b$ | 0.00804 ± 0.00039 $^b$ | 2.73 × 10$^{-4}$ ± 7.7 × 10$^{-5}$ $^a$ | 2.64 × 10$^{-5}$ ± 1.90 × 10$^{-6}$ $^b$ | 0.996 | 0.991 |
| 1:4 | 3.044 ± 0.114 $^c$ | 0.1797 ± 0.00120 $^c$ | 0.01058 ± 0.00132 $^c$ | 0.00969 ± 0.00115 $^b$ | 5.86 × 10$^{-4}$ ± 6.5 × 10$^{-5}$ $^b$ | 4.68 × 10$^{-5}$ ± 4.82 × 10$^{-6}$ $^c$ | 0.998 | 0.983 |

Values are mean ± standard deviation (n = 3).
Means within a column with different superscript letters indicate statistical significant difference (p < 0.05).
Statistical analysis was conducted using one-way ANOVA with Tukey's post-hoc test.

Figure 5:
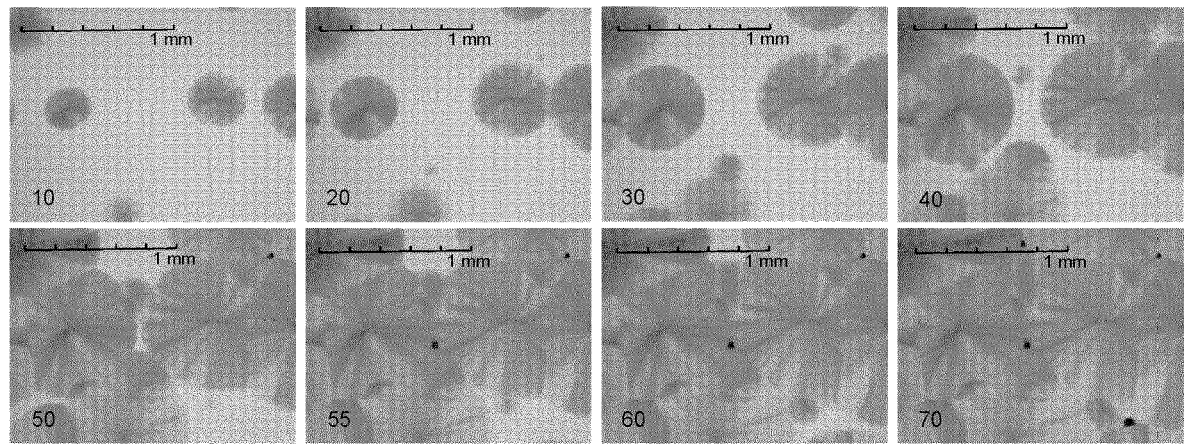
FIG. 5 shows the light micrographs of 3:2 PEG400:PEG10K blend during cooling to room temperature, with 10% diacetyl/AITC loading.
Figure 6:
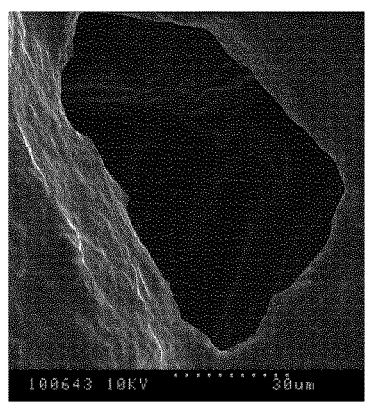
FIG. 6 shows the SEM micrograph of 3:2 PEG400:PEG10K blends loaded with 10% diacetyl/AITC, showing the cross section of a fractured surface.

The grain boundary defects shown in FIG. 4 could be the localities where diacetyl and AITC were being concentrated as the PEG10K fraction crystallized. This hypothesis is supported by the time lapse light micrographs of 3:2 PEG400:PEG10K blend loaded with 10% diacetyl/AITC (FIG. 5). As shown, the growth of an individual crystal began from its spherulite nucleus (FIG. 5; 10 and 20 s). As the spherulite became larger, in came in contact with the boundary of another spherulite. While the growth at the contact boundary halted, the crystals continue to grow in other directions along the grain boundaries until the spherulites were completely in contact with other spherulites. Concomitantly, the uncrystallizable fractions of the PEG blend, i.e., diacetyl, AITC and PEG400, were being concentrated and trapped at the plateau borders (FIG. 5; 55 s and onwards), appear as opaque dark spots on the bright field optimal micrograph. To investigate the nature these dark spots, SEM analysis was conducted (FIG. 6). As shown, under high magnification, a typical dark spot at the plateau border appeared as a hollow cavity, which might be previously occupied by AITC and diacetyl that were vaporized under vacuum during the SEM analysis. The inter-spherulitic plateau border can be considered as a reservoir for the antimicrobial compounds. The zero order release kinetics observed, within the time frame of the release experiment, may be due to the mass transport of diacetyl and AITC molecules from the plateau border. Within 42 hours, the amounts of diacetyl released from 1:4, 2:3, 3:2, 4:1 PEG400:PEG10K blends were 4.5, 3.5, 3.1 and 2.6 mg, and the amounts of AITC were 0.29, 0.19, 0.15 and 0.12 mg, respectively. On the basis that the initial loading of diacetyl and AITC are 0.91 and 0.09%, respectively, about 28.7-49.4% original loading of diacetyl and 13.4-32.3% of AITC were released from the PEG blends in 42 h.

Figure 7:
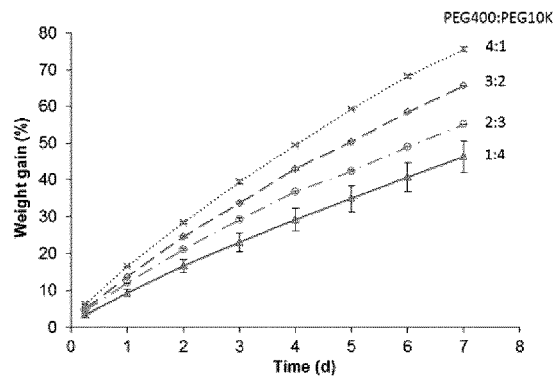
FIG. 7 shows the weight gain of different PEG blends over time (100% RH).

Since PEG is a water-soluble polymer, moisture content in the environment will affect the release behavior of the loaded diacetyl and AITC. As shown in FIG. 7, of all the PEG blends tested, 4:1 PEG400:PEG10K exhibited the fastest water sorption rate. The observation can be explained on the basis that PEG400, being lower in molecular weight, has a greater number of hydroxyl end groups than PEG10K. Therefore, PEG400 has a greater propensity for forming hydrogen bonds with water than PEG10K. The slower moisture sorption rate for PEG blends with a greater proportion of PEG10K can be caused by their higher total crystallite content that impede the diffusion of water. In order to examine the moisture content effects on release behaviors, 4:1 PEG400:PEG10K with fastest water sorption rate was tested under different moisture conditions.

Figure 8:
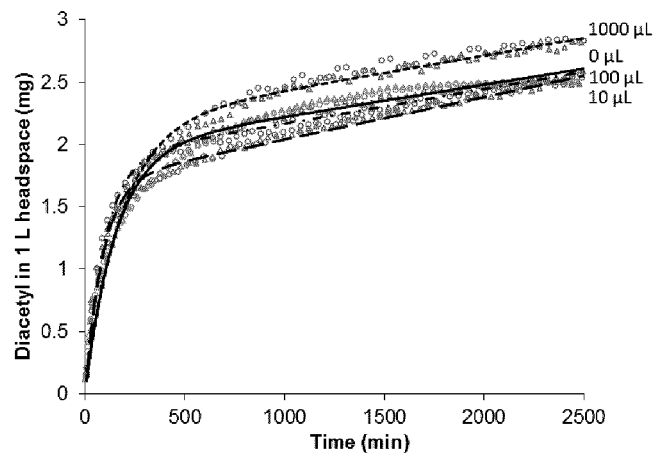
FIG. 8 shows the release of diacetyl from one gram of 4:1 PEG400:PEG10K into headspace of one L glass jar, with the presence of 0, 10, 100, or 1000 μL water at 25° C.
Figure 9:
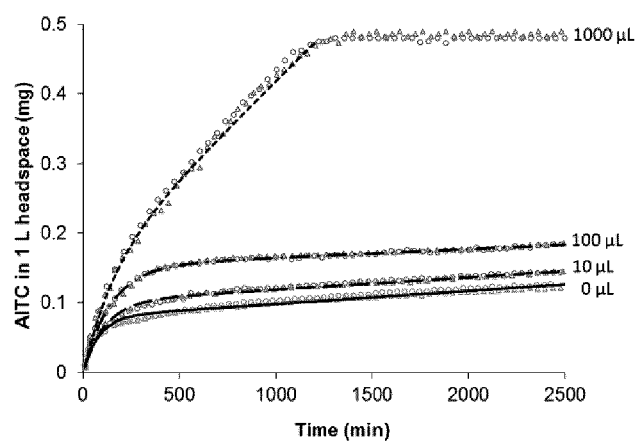
FIG. 9 shows the release of AITC from one gram of 4:1 PEG400:PEG10K into headspace of one L glass jar, with the presence of 0, 10, 100, or 1000 μL water at 25° C.

In terms of 4:1 PEG400:PEG10K blend, the release profiles of diacetyl from the carrier matrix at 25° C. were comparable when 0, 10, 100 and 1000 µL of water were added to the glass jar (FIG. 8). This observation is probably due to the high solubility of diacetyl in water (200 g/L at 20° C.). When water was introduced into the jars, on one hand, it partially solubilizes the PEG matrices, causing diacetyl release faster from the matrices; on the other hand, the increased hydrophilicity of PEG matrices induced by water prevents diacetyl from evaporation. In this case, the diacetyl concentration in the headspace of the jar didn't show significant change with different amount of water added. In comparison, moisture has a more pronounce effect on the co-release of AITC (FIG. 9). As moisture increased from 0 to 1000 µL, k value for AITC decreased from 0.016 to 0.009 h$^{-1}$, while $\alpha$ value increased significantly from 1.94×10$^{-5}$ to 2.9×10$^{-4}$ h$^{-1}$ (Table 4). The greater moisture-sensitivity of AITC release can be attributed to the considerably lower solubility of AITC in water (2 g/L, 20° C.) as compared to diacetyl (200 g/L, 20° C.). At high moisture content, besides causing extensive plasticization and partial solubilization of the PEG, conceivably, the increased hydrophilicity of the carrier matrix also reduced the solubility of AITC in the matrix, causing it to partition into the gaseous phase. Moreover, it is observed that when 1000 µL of water was added into the jar, the PEG matrices were totally dissolved by water, turning the carrier matrix into liquid phase. This may cause the tremendous release of AITC when 1000 µL of water was introduced, reaching equilibrium at around 1300 min (FIG. 9).

Figure 10:
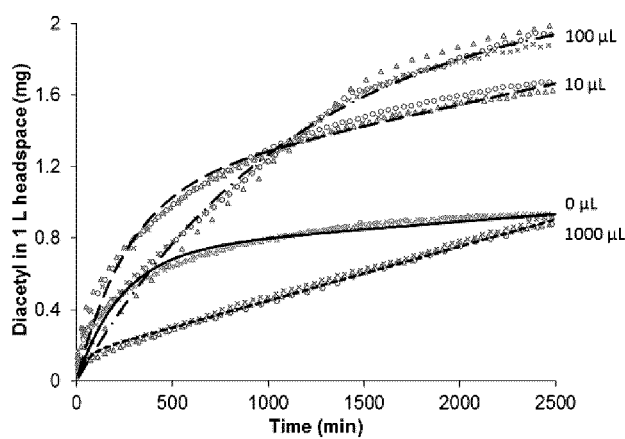
FIG. 10 shows the release of diacetyl from one gram of 4:1 PEG400:PEG10K into headspace of one L glass jar, with the presence of 0, 10, 100, or 1000 μL water at 5° C.
Figure 11:
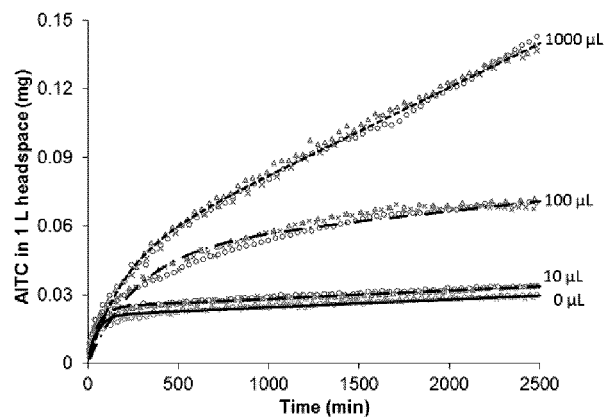
FIG. 11 shows the release of AITC from one gram of 4:1 PEG400:PEG10K into headspace of one L glass jar, with the presence of 0, 10, 100, or 1000 μL water at 5° C.

At 5° C., the releases of diacetyl and AITC were slowed down; both k and a values were significantly lower than those observed at 25° C. (Table 4). The maximum diacetyl released after 42 h at 5° C. (FIG. 10) was 1.98 mg as compared to 2.85 mg at 25° C., and the maximum AITC released at 5° C. (FIG. 11) was 0.14 mg comparing to 0.47 mg at 25° C. Different from what was observed at 25° C., the release behavior of diacetyl showed significant difference between samples at 5° C. The lower vapor pressure of diacetyl at lower temperature will slow down the evaporation, making the effects of moisture content on the release behavior obvious. With higher RH (10 µL water), diacetyl released faster from PEG matrix than with 0 µL water, due to the plasticization and partial solubilisation of PEG carrier. When there is excess amounts of water presence (100 or 1000 µL), diacetyl tends to dissolve in water rather than partition into the headspace, causing the diacetyl concentration in the headspace decreased. However, a value increases with increasing of moisture content (Table 4), indicating that partial solubilization of the PEG induced by water can increase the release rate of diacetyl from the carrier matrix.

The release behavior of AITC affected by moisture content at 5° C. showed a similar trend with which at 25° C., that K value decreased while α value increased with increasing moisture content. For AITC, its release is proportional to the addition of water, regardless of temperature. For example, at 25° C., within 42 h, the maximum release of AITC raised from 0.13 mg at dry condition to 0.15, 0.18 and 0.48 mg when exposed to 10, 100 and 1000 μL water, respectively. This interactive behavior may be useful in moisture-triggered antimicrobial active packages for high moisture products.

TABLE 4

Parameters of fitted model for diacetyl/AITC release kinetics, as affect by moisture content at 5 and 25° C.

| Amount of water (μL) | Temperature (° C.) | $C_e$ (mg/L) DA | $C_e$ (mg/L) AITC | $k$ (h$^{-1}$) DA | $k$ (h$^{-1}$) AITC | $\alpha$ (h$^{-1}$) DA | $\alpha$ (h$^{-1}$) AITC | $R^2$ DA | $R^2$ AITC |
|---|---|---|---|---|---|---|---|---|---|
| 0 | 25 | $1.965 \pm 0.0324^a$ | $0.0791 \pm 9.23 \times 10^{-6\,a}$ | $0.00837 \pm 0.00059^{ab}$ | $0.01604 \pm 0.00053^a$ | $2.58 \times 10^{-4} \pm 8.2 \times 10^{-6\,bd}$ | $1.94 \times 10^{-5} \pm 2.03 \times 10^{-6\,bc}$ | 0.978 | 0.979 |
|  | 5 | $0.631 \pm 0.0307^b$ | $0.0212 \pm 0.00079^b$ | $0.00764 \pm 0.00149^{ad}$ | $0.01490 \pm 0.00203^a$ | $1.49 \times 10^{-4} \pm 1.96 \times 10^{-5\,a}$ | $3.39 \times 10^{-6} \pm 1.21 \times 10^{-7\,a}$ | 0.986 | 0.964 |
| 10 | 25 | $1.701 \pm 0.0008^c$ | $0.1012 \pm 0.00039^c$ | $0.01425 \pm 0.00205^b$ | $0.01169 \pm 0.00084^{ab}$ | $3.40 \times 10^{-4} \pm 5.9 \times 10^{-6\,c}$ | $1.76 \times 10^{-5} \pm 2.26 \times 10^{-6\,b}$ | 0.992 | 0.985 |
|  | 5 | $1.074 \pm 0.0423^d$ | $0.0245 \pm 0.00089^b$ | $0.00484 \pm 0.00059^{ac}$ | $0.01509 \pm 0.00431^a$ | $2.36 \times 10^{-4} \pm 1.06 \times 10^{-5\,b}$ | $3.63 \times 10^{-6} \pm 3.86 \times 10^{-7\,c}$ | 0.988 | 0.980 |
| 100 | 25 | $1.901 \pm 0.0953^a$ | $0.1523 \pm 0.00322^d$ | $0.01281 \pm 0.00346^{bd}$ | $0.00896 \pm 0.00084^{ab}$ | $2.72 \times 10^{-4} \pm 3.3 \times 10^{-5\,bd}$ | $1.25 \times 10^{-5} \pm 1.27 \times 10^{-6\,b}$ | 0.997 | 0.996 |
|  | 5 | $1.418 \pm 0.0072^e$ | $0.0353 \pm 0.00183^e$ | $0.00159 \pm 0.00017^c$ | $0.01022 \pm 0.00110^{ab}$ | $2.53 \times 10^{-4} \pm 1.78 \times 10^{-5\,b}$ | $1.09 \times 10^{-5} \pm 2.64 \times 10^{-6\,b}$ | 0.989 | 0.982 |
| 1000 | 25 | $2.156 \pm 0.0363^f$ | $0.1365 \pm 0.00181^f$ | $0.00728 \pm 0.00025^{abc}$ | $0.00945 \pm 0.00054^{ab}$ | $2.79 \times 10^{-4} \pm 2.8 \times 10^{-6\,bd}$ | $2.91 \times 10^{-4} \pm 7.93 \times 10^{-6\,d}$ | 0.995 | 0.988 |
|  | 5 | $0.151 \pm 0.0072^g$ | $0.0454 \pm 0.00386^g$ | $0.01321 \pm 0.00350^{bd}$ | $0.00564 \pm 8.7 \times 10^{-5\,b}$ | $3.01 \times 10^{-4} \pm 9.01 \times 10^{-6\,cd}$ | $3.75 \times 10^{-5} \pm 1.73 \times 10^{-6\,e}$ | 0.996 | 0.997 |

Values are mean ± standard deviation (n = 3).
Means within a column with different superscript letters indicate statistical significant difference (p < 0.05).
Statistical analysis was conducted using one-way ANOVA with Tukey's post-hoc test.

The antimicrobial efficacy of 4:1 PEG400:PEG10K blends with different diacetyl to AITC ratios were evaluated against two model microorganisms, P. fluorescens and P. aphanidermatum, which are usually involved in spoilage of fresh fruits and vegetables. Table 5 shows that P. fluorescens colony formation was completely inhibited by 0.5% loading of diacetyl:AITC mixture in 10:1, 5:1 and 1:1 ratios. At 0.1% loading level, although P. fluorescens was not completely inhibited, an inhibitory effect was observed when higher AITC content (diacetyl:AITC=1:1) was used, implying that AITC provides the dominant contribution of antibacterial effect. Similarly, the diacetyl/AITC mixture inhibited the growth of P. aphanidermatum colonies, and stronger inhibitory effects were observed when higher AITC concentration (diacetyl:AITC=1:1) was used. Along all the formulations tested, only 1% loading of 1:1 diacetyl:AITC ratio provided complete inhibition on both P. fluorescens and P. aphanidermatum. Despite the stronger inhibitory effect of AITC, the use of diacetyl is beneficial to reduce the AITC level due to potential damage to the plant tissues and off flavour in food induced by high dosage of AITC.

TABLE 5

Effects of Diacetyl/AITC impregnated 4:1 PEG400:PEG10K on the inhibition of P. Fluorescens and P. aphanidermatum.

| Compounds loading (%) | Diacetyl:AITC ratio | P. Fluorescens Day 1 | Day 2 | Day 3 | Day 4 | P. aphanidermatum Day 1 | Day 2 | Day 3 | Day 4 |
|---|---|---|---|---|---|---|---|---|---|
| 0 | 0:0 | ++ | +++ | ++++ | ++++ | 1.2 | 3.1 | 4.3 | 5.1 |
| 1.0 | 10:1 | — | — | — | — | 0.5 | 1 | 1.4 | 1.8 |
| 0.5 | 10:1 | — | — | — | — | 0.5 | 1.5 | 2.2 | 2.7 |
| 0.1 | 10:1 | + | ++ | +++ | ++++ | 1.1 | 2.4 | 3.2 | 3.7 |

TABLE 5-continued

Effects of Diacetyl/AITC impregnated 4:1 PEG400:PEG10K on the inhibition of P. Fluorescens and P. aphanidermatum.

| Compounds loading (%) | Diacetyl:AITC ratio | P. Fluorescens Day 1 | Day 2 | Day 3 | Day 4 | P. aphanidermatum Day 1 | Day 2 | Day 3 | Day 4 |
|---|---|---|---|---|---|---|---|---|---|
| 1.0 | 5:1 | — | — | — | — | 0.3 | 0.3 | 0.3 | 1.1 |
| 0.5 | 5:1 | — | — | — | — | 0.3 | 0.9 | 1.7 | 2.2 |
| 0.1 | 5:1 | + | ++ | ++++ | ++++ | 1.1 | 2.5 | 3.4 | 4 |
| 1.0 | 1:1 | — | — | — | — | 0 | 0 | 0 | 0 |
| 0.5 | 1:1 | — | — | — | — | 0.4 | 1 | 1.9 | 2.5 |
| 0.1 | 1:1 | — | + | ++ | +++ | 1 | 2.5 | 3.6 | 4.8 |

* Measurement of P. aphanidermatum is based on colony diameter (mm);
Measurement of P. Fluorescens are based on the visual colony number:
"—" no growth;
"+" less than 15;
"++" 15-50;
"+++" 50-150;
"++++" more than 150.

It is demonstrated that the release of diacetyl and AITC from PEG blends of different molecule weights can be controlled by adjusting the different PEG fractions and the moisture conditions in the headspace. Increasing the ratio of PEG10K increased the crystallite content of the PEG blends and decreased the diffusion rate of diacetyl and AITC in the carrier matrices. However, high ratio of PEG10K also induced defects in PEG crystals, causing increased release of diacetyl and AITC. Generally, high ratio of PEG10K in PEG blends promoted the release of diacetyl and AITC into the headspace. Moreover, high moisture content in the headspace resulted in solubilisation of PEG carrier and enhanced the release of antimicrobial compounds. Microbial test results showed that with a moderate release, PEG blends with 1% diacetyl and AITC (1:1 ratio) loaded can successfully inhibit the colony formation of P. aphanidermatum and P. fluorescens for 4 days. Taken all evidences together, PEG blend is a feasible carrier for diacetyl and AITC to control the release of these antimicrobial volatiles.

Cinnamaldehyde (CA) is a pale yellow, viscous liquid extracted from the bark of Cinnamonum zeylanicum. It is the major volatile component (97.7%) in the essential oil of cinnamon bark, and the main compound that accounts for the special flavor of cinnamon. CA is one of the most effective antimicrobial compounds among many essential oils studied. The antimicrobial activity of CA or cinnamon essential oil has been extensively tested on many pathogenic microorganisms, such as B. cereus, E. coli and L. monocytogenes. Its inhibitory effects against microorganisms have been investigated on various food products.

One of the technical challenges of applying CA in antimicrobial active packaging is its extremely low vapor pressure as compared with some other volatile antimicrobial compounds, such as allyl isothiocyanate (AITC) and diacetyl. Because of it low vapour pressure, rapid buildup of CA vapor concentration in the headspace to the inhibitory level tends to be problematic, especially for packages with a large headspace and products with higher CA solubility. To increase the vaporization rate of CA, one possible solution is to disperse the antimicrobial in a carrier with a large surface area, such as electrospun fibers fabricated from a polymer with desirable material properties.

Poly(lactic acid) PLA is a biodegradable, bio-absorbable, and food-compatible polyester derived from renewable feedstock, such as starch and cellulosic process residues. The polymer, which can be synthetized into different grades, are being used in many applications, including food packaging, consumer goods, tissue engineering, disposal cutleries, and so on. PLA polymer of different matrices (cast film, electrospun fiber, molded article) have been explored as a controlled release carrier for antimicrobial agents. Previously, the use of electrospun PLA fibers to encapsulate mustard seed meal powder for activated release of AITC was investigated. As shown herein, PEO was added to assist the electrospinning process as well as modified the hydrophilicity of the nonwovens.

Figure 12:
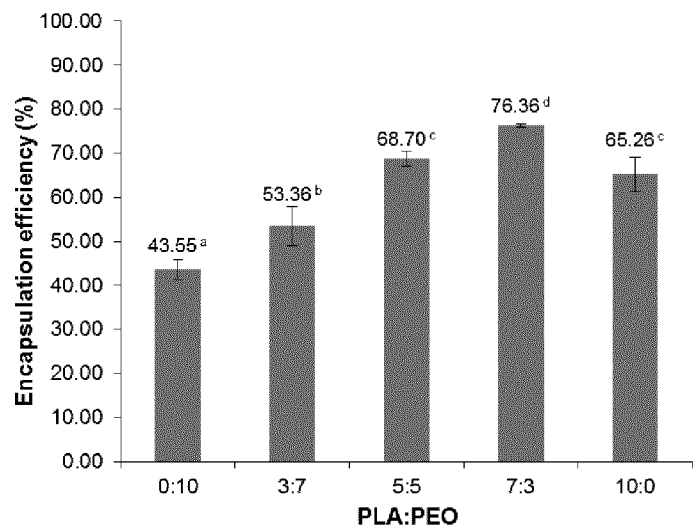
FIG. 12 shows the encapsulation efficiency of CA in PLA-PEO fibers with 33% (w/w) CA loading, means with different superscript letters indicate statistical significant difference (p<0.05), wherein error bars represent the standard deviation of 6 measurements, and statistical analysis was conducted using one-way ANOVA with Tukey's post-hoc test.
Figure 13:
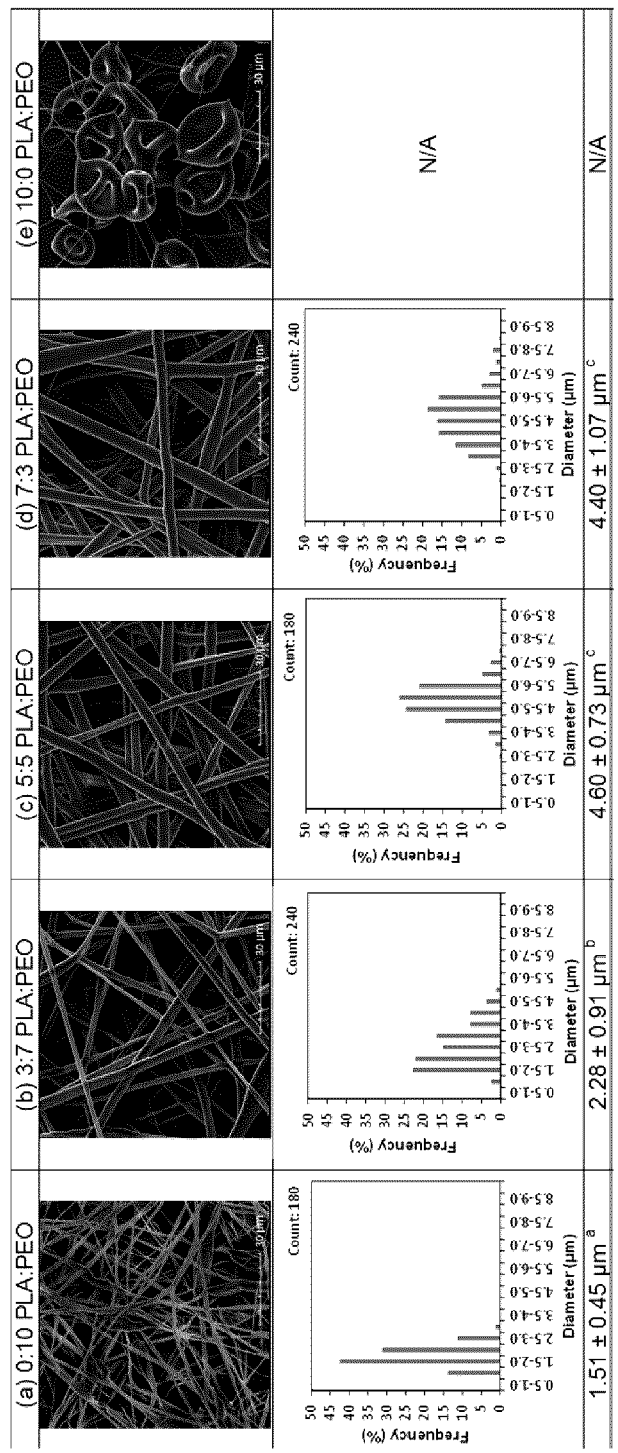
FIG. 13 shows the scanning electron micrographs of PLA-PEO fibers with 33% CA (w/w) loading, wherein values are mean±standard deviation, means with different superscript letters indicate statistical significant difference (p<0.05), and statistical analysis was conducted using one-way ANOVA with Tukey's post-hoc test.

Electrospun fibers with PEO alone resulted in an encapsulation efficiency (EE) of 43.6%. However, as PLA proportion increased to 7:3 PLA:PEO polymer blend ratio, EE value increased significantly to 76.4%, but decreased to 65.3% with the pure PLA polymer (FIG. 12). The changes of EE can be correlated with the morphology of the electrospun materials induced by the total polymer concentration (FIG. 13). Pure PEO solution produced fibers of smallest diameter. As PLA content increased, the fibers diameters increased significantly. This observation can be explained on the basis that PLA stock solution had a higher concentration (9% w/w) than the PEO stock solution (3% w/w). Therefore increasing PLA proportion in the spinning solution would have resulted in a higher total polymer content and thus larger fiber thickness. The increased amount of polymer available for encapsulation was likely the reason for the observed increase in EE as the PLA content increased, although the presence of PEO was also essential in enabling the entrapment of CA. As shown, pure PLA solution did not produce continuous fibers during the electrospinning process, but rather irregular spattered materials resembling collapsed capsules (FIG. 13(e)). The addition of PEO enabled the formation of continuous fibers with diameter ranging between 2-5 μm (FIG. 13(b)-(d)).

Figure 14:
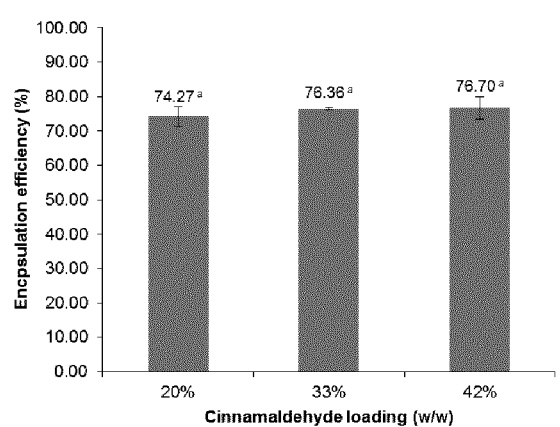
FIG. 14 shows the encapsulation efficiency of 7:3 PLA:PEO fibers with different CA loadings, wherein means with different superscript letters indicate statistical significant difference (p<0.05), and statistical analysis was conducted using one-way ANOVA with Tukey's post-hoc test.

As 7:3 PLA:PEO provided the highest EE, further experiments were conducted at this blend proportion to evaluate the effects of CA loading on the PLA-PEO fibers. As shown in FIG. 14, CA loading effect on EE was not significant (p>0.05) at the CA concentrations tested. However, the addition of CA resulted in a softer structure of the nonwoven obtained, possibly due to the plasticizing effect of CA.

Figure 15:
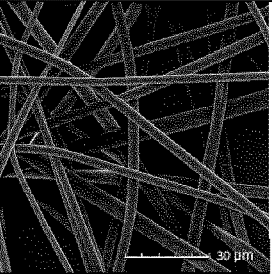
FIG. 15 shows the SEM micrographs of 7:3 PLA:PEO fibers loaded with different concentrations of CA, wherein values are mean±standard deviation, means with different superscript letters indicate statistical significant difference (p<0.05) and statistical analysis was conducted using one-way ANOVA with Tukey's post-hoc test.

SEM micrographs (FIG. 15) show that fibers with different CA loading had similar morphology, although at higher magnification, fibers loaded with higher CA levels (33 and 42% w/w) had rougher surface texture. At 42% (w/w) CA concentration, some fibers appeared to fuse together. Since the vapor pressure of CA (0.02 mm Hg at 20° C.) is relatively lower than THF solvent (127 mm Hg at 20° C.), the addition of CA will depress the vapor pressure of THF. The resulting delayed solvent evaporation during electrospinning likely resulted in "sticky" fibers that tended to fume together (FIG. 15 (d)). At a CA loading of higher than 50%, the collected fiber were "wet" due to over-depression of the evaporation of the solvent, as well as CA leakage. Considering that fibers loaded with 42% CA exhibited substantially rougher surface morphology as compared to fibers at lower CA concentrations, nonwoven prepared from 7:3 PLA:PEO with 33% CA is considered an optimized formulation.

Figure 16:
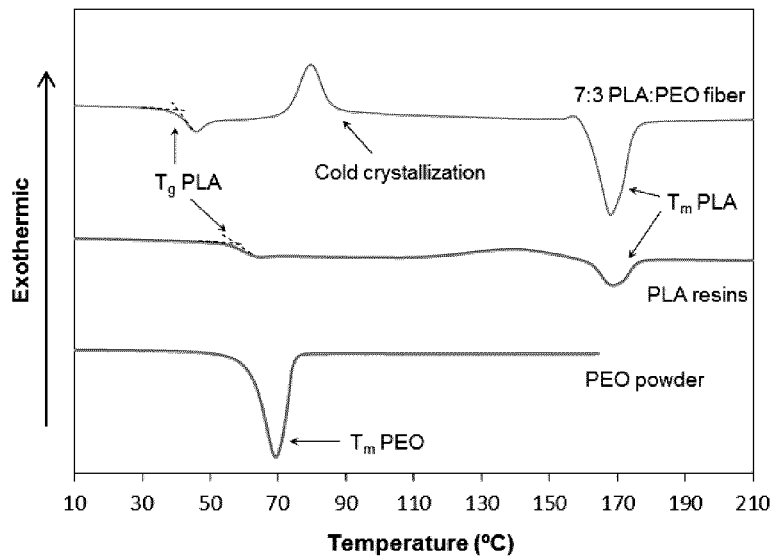
FIG. 16 shows the thermograms of PEO powder, PLA resins and 7:3 PLA:PEO (0% CA) fiber during the first heating scan at 10° C./min.

In the absence of CA, $T_m$ of as received PEO and PLA were 69 and 168° C., respectively (FIG. 16). The $T_g$ of the pure PLA resins was 55° C., which was shifted to 39° C. when PEO was added into PLA, suggesting the plasticization effect of PEO on PLA. Cold-crystallization was not detected in the as-received PLA, indicating that the commercial resin was pre-crystallized. By contrast, a large cold crystallization peak was observed for 7:3 PLA:PEO nonwoven indicating that the electrospun fibers were re-crystallized substantially during the heating process in the DSC analysis, implying that the electrospun material has a relatively low crystallinity level. It is possible that during the electrospinning process, the rapid evaporation of solvent had hampered the polymer chains from organizing into crystalline structures. Similarly, the melting peak for the PEO fraction was not detected in the electrospun fibers, either due to the rapid evaporation of solvent or strong PEO-PLA interaction that prevented crystallization of the PEO polymer.

Figure 17:
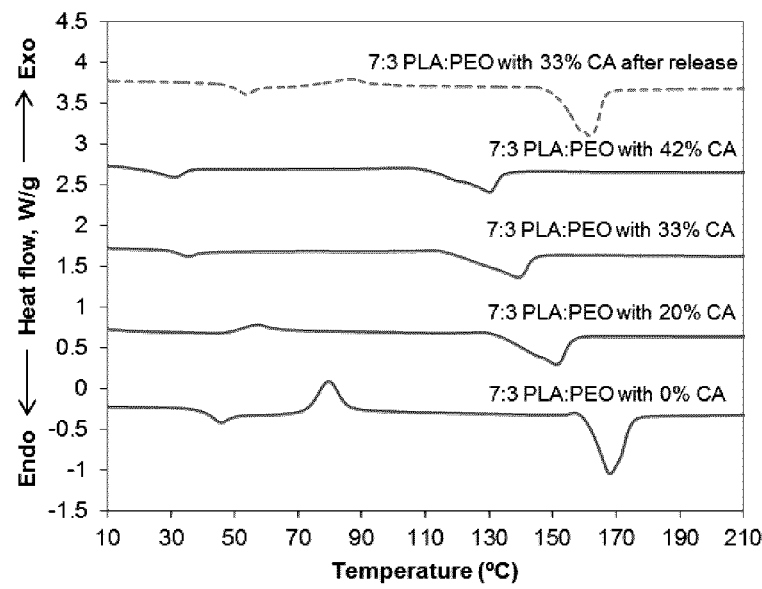
FIG. 17 shows the DSC thermograms of 7:3 PLA:PEO nonwovens loaded with different concentrations of CA.

DSC thermograms for 7:3 PLA:PEO nonwovens with different CA loadings are summarized in FIG. 17. As shown, adding CA into the fiber at 20% level substantially inhibited the cold crystallization of the PLA polymer. Here, the exothermic crystallization peak for the PLA was considerably smaller and shifted to a lower temperature as compared to 0% CA. The PLA $T_g$ was not detected probably due to the close vicinity of the $T_g$ and $T_c$ thermal events. As CA increased to 33 and 42% loadings, both the $T_g$ and $T_m$ of PLA shifted to lower temperatures. On the basis of these observations, one can concluded that the added CA, besides acting as a plasticizer of PLA, also interfered with the crystallization of PLA during reheating. However, the presence of CA did not completely inhibited the crystallization of PLA during electrospinning. As shown in FIG. 17, the presence of melting peaks in electrospun PLA indicates that certain fractions of PLA did crystallize during electrospinning. Here, the lowering of $T_m$ and PLA crystallinity (Table 6) as CA concentration increased shows that the presence of CA had reduced the crystal perfection of PLA, providing evidence that strong interaction exists between CA and PLA that interfered with the polymer chain packing. The plasticizing effect of CA has been reported in films prepared from solvent casting in other polymer systems.

TABLE 6

Melting temperatures, enthalpies and crystallinity of PLA fraction in 7:3 PLA:PEO electrospun nonwovens with different CA loadings.

| CA loading (%) | $T_m$ (° C.) | ΔH (J/g sample) | $X_c$ (%) |
|---|---|---|---|
| 0 | 167.65 ± 0.38 [a] | 36.59 ± 0.42 [a] | 41.82 ± 0.48 [a] |
| 20 | 151.13 ± 0.15 [b] | 29.31 ± 0.35 [b] | 39.72 ± 0.48 [b] |

TABLE 6-continued

Melting temperatures, enthalpies and crystallinity of PLA fraction in 7:3 PLA:PEO electrospun nonwovens with different CA loadings.

| CA loading (%) | $T_m$ (° C.) | ΔH (J/g sample) | $X_c$ (%) |
|---|---|---|---|
| 33 | 139.44 ± 0.45 [c] | 25.31 ± 0.37 [c] | 39.91 ± 0.59 [b] |
| 42 | 130.23 ± 0.26 [d] | 21.72 ± 0.24 [d] | 38.97 ± 0.43 [b] |

Values are mean ± standard deviation (n = 3). Means within a column with different superscript letters indicate statistical significant difference (p < 0.05). Statistical analysis was conducted using one-way ANOVA with Tukey's post-hoc test.

Interestingly, after exposing the 7:3 PLA:PEO nonwoven with 33% CA loading in the air for two weeks, the PLA fraction in the material regained its cold crystallization peak in the subsequent heating during the DSC analysis, with concomitant $T_g$ and $T_m$ shifts to higher temperatures (FIG. 17; thermogram in dashes). Qualitatively, the nonwoven also became tougher but remained flexible during handling. These observations imply that the evaporation of CA from the polymer had partially alleviated the interference of CA on PLA chain-chain interaction, allowing re-crystallization to proceed. Alternatively, the observation many be attributed to post-electrospinning slow crystallization of PLA nonwoven, which might have expelled CA from the fiber matrices that accelerated the release of antimicrobial.

Figure 18:
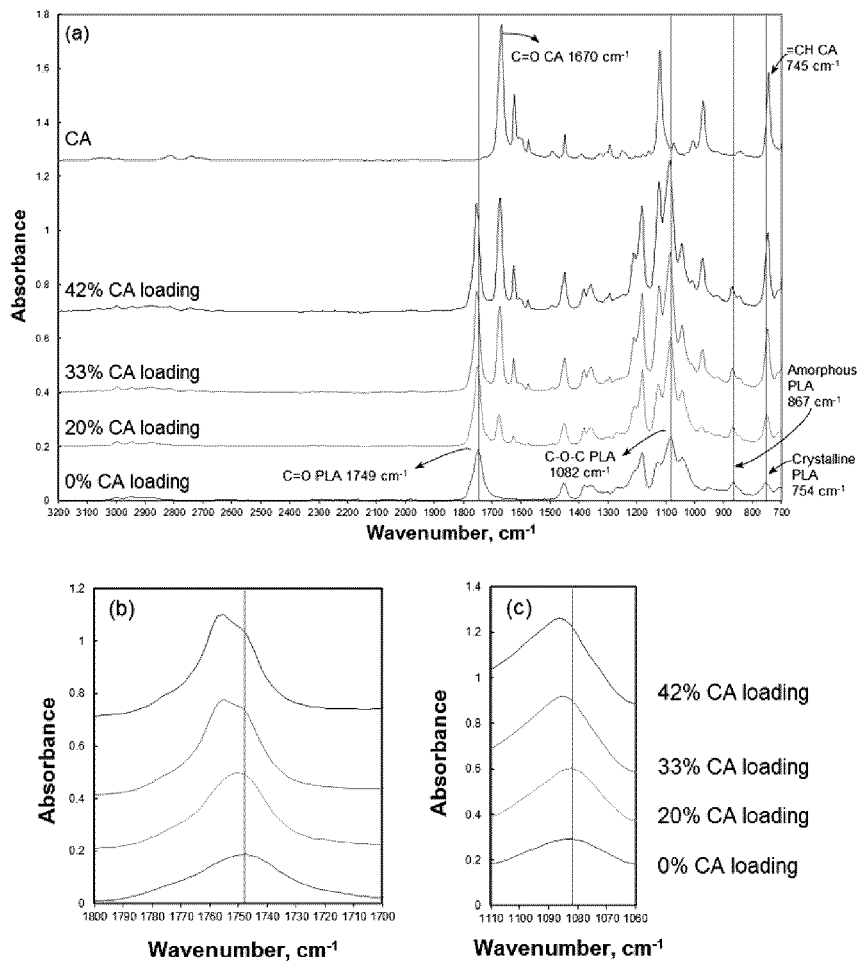
FIG. 18 shows the FTIR spectra of 7:3 PLA:PEO nonwoven sample with different CA loadings: (a) full spectra for nonwovens and CA; (b) spectra near C=O stretching regions of PLA; and (c) spectra near C—O—C regions.

In order to evaluate the nature of interaction between CA and the electrospun PLA-PEO fibers, freshly prepared 7:3 PLA:PEO nonwovens with different CA loadings were analyzed using ATR-FTIR. As presented in FIG. 18(a), the C═O stretching bands of PLA can be clearly distinguished from the C═O aldehyde group of CA, each with absorbance at 1749 cm$^{-1}$ and 1670 cm$^{-1}$ wavenumbers, respectively. The ratio of peak height at 1670 cm$^{-1}$ (CA) to which at 1749 cm$^{-1}$ (PLA) were 0, 0.43, 0.86 and 1.04 for 0%, 20%, 33% and 42% CA loading, respectively, indicating that CA has been encapsulated within the polymer matrix. Moreover, as the amount of CA increased in the PLA-PEO fiber, the C═O group of PLA and C—O—C group of PEO or PLA shifted significantly to higher wavenumber (FIG. 19(b) & (c)), indicating that the presence of CA enhanced the vibration frequency of these covalent bonds, possibly because CA opened up the free volumes existed between the polymer chains. Referring to FIG. 18(b), it is noteworthy that increasing the CA content not only caused the peak maximum of C═O band to shift to higher frequency, but also forming a shoulder that became more prominent as the CA content increased. This observation indicates that there are two species of C═O group in the PLA backbone: (1) original C═O species present in neat PLA vibrating at a lower frequency; and (2) new C═O species that vibrate at a higher frequency due to the incorporation of CA that interrupted the hydrogen bonds initially present in the neat polymer.

Figure 19:
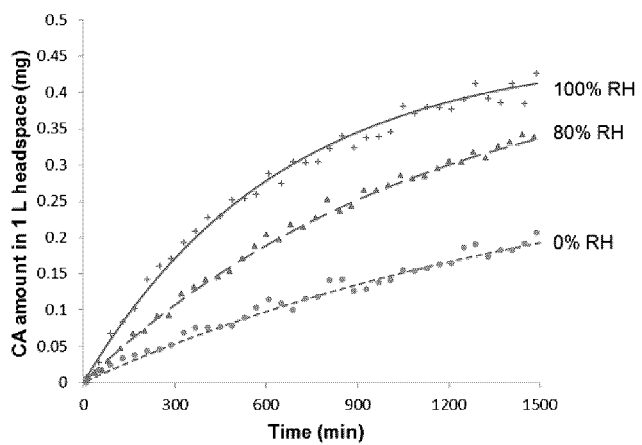
FIG. 19 shows the release of CA from PLA-PEO-CA nonwovens at different RH condition at 25° C.

To evaluate the effect of moisture on the release kinetic of CA, different amounts of water (0, 18 and 30 μL) was injected into a nitrogen-purged 1 L test jar at 25° C. to provide an initial headspace of 0, 80 and 100% RH. The amount of CA in the jar was detected by GC. As shown in FIG. 19, at saturated RH, the release rate of CA from 7:3 PLA:PEO nonwoven loaded with 33% CA was considerably faster as compared to dry condition. The release rate at 100% RH was about two times higher than at 80% RH, and 4.4 times faster than at dry condition. This result indicates that the nonwoven is RH-sensitive and the release of CA from the nonwoven can be enhanced by moisture. The moisture-sensitivity of the nonwoven carrier can be attributed to the added PEO, which is relatively hydrophilic (water-soluble) as compared with PLA (insoluble in water). As the PEO fraction absorbed moisture, the water molecules and/or clusters might have displaced CA from its sorption sites within the fiber matrixes, enhancing its vaporization into the air. By adjusting the PEO content of the fibers, the moisture-sensitivity of the nonwoven can be further manipulated.

To evaluate the antimicrobial efficacy of CA, both PLA-PEO-CA nonwoven and CA liquid were tested against *P. fluorescens* and *P. aphanidermatum*. Results are summarized in Table 7. As shown, the PLA-PEO-CA nonwoven contains equivalent amount of 2 mg CA has the equal inhibitory efficacy as 5 mg liquid CA; while the nonwoven contains equivalent amount of 5 mg CA exhibited better inhibitory efficacy than 30 mg liquid CA. It is noteworthy that the amounts of liquid CA injected into the jars were all beyond saturation. The saturated CA vapor pressure at the test temperature, 25° C., is 0.02 mm Hg. Assuming ideal gas law behaviour, the corresponding concentration calculated is around 0.188 mg/L. This result is important when considering CA vapor for antimicrobial application. Due to the relatively low vapor pressure of CA, the amount of CA added in the jar was not as important as the vaporization rate of CA that dominate the effect, i.e., the faster the CA is being vaporized into the headspace, the more potent the antimicrobial would be. For the pure CA, the rate of CA vaporization was limited by the surface area of the droplet injected into the test bottle. On the other hand, an equivalent amount of CA dispersed in an electrospun nonwoven carrier would release at a faster rate due to the tremendously expended surface area available for vaporization, thereby enhancing the antimicrobial efficacy.

TABLE 7

Antimicrobial efficacy of pure CA and 7:3 PLA:PEO nonwoven loaded with 33% CA.

| | *P. Fluorescens* | | | | *P. aphanidermatum* | | | |
|---|---|---|---|---|---|---|---|---|
| Treatments | Day 1 | Day 2 | Day 3 | Day 4 | Day 1 | Day 2 | Day 3 | Day 4 |
| Control | ++ | ++++ | ++++ | ++++ | 1.6 | 3.2 | 4.3 | 5.1 |
| 2 mg CA | ++ | ++++ | ++++ | ++++ | 1.3 | 2.8 | 4 | 5 |
| 5 mg CA | ++ | ++++ | ++++ | ++++ | 1 | 2.1 | 2.8 | 3.5 |
| 10 mg CA | + | +++ | +++ | +++ | 0.8 | 1.6 | 2.2 | 2.7 |
| 30 mg CA | — | + | + | + | 0.7 | 1.4 | 1.8 | 2 |
| 8 mg fiber (~2 mg CA) | + | +++ | +++ | ++++ | 1 | 2.1 | 2.8 | 3.4 |
| 20 mg fiber (~5 mg CA) | — | ++ | ++ | ++ | 0.5 | 1.1 | 1.5 | 2.1 |

* Measurement of *P. aphanidermatum* is based on colony diameter (mm); Measurement of *P. Fluorescens* are based on the visual colony number:
"—" no growth;
"+" less than 15;
"++" 15-50;
"+++" 50-150;
"++++" more than 150.

When exposed to the air, CA is known to be susceptible to oxidation, forming cinnamic acid as a major product. As described herein, crystals of cinnamic acid were observed to deposit on the side wall of the test jars where the liquid CA was injected. However, the crystalline cinnamic acid was not observed in test jars where electrospun nonwovens were applied. This phenomenon can be attributed to the protection of PLA fibers on CA, preventing it from oxidation degradation. Since the vapor pressure of cinnamic acid (0.0047 mm Hg at 25° C.) is about 4 times lower than CA, the protection provided by electrospun PLA-PEO fiber can be the contributing factor of the observed enhanced antimicrobial effects of CA.

As further described herein, CA was encapsulated in PLA-PEO nonwovens with optimized formula and evaluated for its antimicrobial effects. 7:3 PLA:PEO ratio was chosen to achieve the highest encapsulation efficacy with 33% CA being loaded into the fiber to produce uniform electrospun fibers at very high throughput (17 mL/h). Both PEO and CA were found to plasticize PLA. Moreover, the addition of CA decreased the crystallinity of PLA and reduced the cold crystallization phenomenon, indicating that CA had interfered with the PLA chain packing. FTIR data also provide evidence of interaction between CA and PLA, suggesting an increase of free volume among polymer chains occurred when CA was introduced. The PLA-PEO-CA nonwovens were moisture-sensitive, the exposure of which to elevated humidity enhanced the release of CA into the air. Antimicrobial study showed that the nonwoven promoted the antimicrobial efficacy of CA vapor by enhancing vaporization through expanded surface area. The PLA-PEO-CA nonwoven can thus be used as antimicrobial packaging for food preserving purposes.

Accordingly, as described herein, three volatile antimicrobial compounds have been encapsulated in two different carriers. AITC and diacetyl have been successfully incorporated into the PEG blends, while cinnamaldehyde has been encapsulated by PLA-PEO nonwovens through electrospinning. To achieve a moderate release of AITC and diacetyl, the 4:1 PEG400:PEG10K blend has been selected as a carrier for AITC and diacetyl, while 7:3 PLA:PEO has been determined as the formula of electrospun fiber for the encapsulation of cinnamaldehyde on the basis of maximizing encapsulation efficiency. To validate the preservative effects of these antimicrobial compounds in their respective carriers on real food products under typical storage conditions, mung bean sprouts have been selected as a model system to test the efficacy of the antimicrobial carriers.

Mung bean (*Vigna radiata*) sprout is gaining consumer acceptance in Canada as healthy and low-calorie food. Mung bean sprouts naturally carry microbial aggregates and biofilms, providing protection to bacterial cells. These naturally occurring biofilms can present a challenge in eliminating pathogens during the cleaning process. This makes the consumption of raw or undercooked mung bean sprout much more risky, especially for the vulnerable consumer groups.

Both human pathogens and spoilage microorganisms have been isolated from mung bean sprouts, including *E. coli*, *Salmonella*, coliform bacteria, *B. cereus*, lactic acid bacteria, yeast and various mould species. These microorganisms can be harboured by mung bean from the fields or introduced to the sprouts during sprouting, packaging, transportation, and unsanitary handling procedures. Since bean sprouts inherently have short shelf-life, the proliferation of microorganism changes in organoleptic properties can be profiled easily, making it an ideal model system for shelf-life studies.

The inhibitory effect of the three antimicrobial compounds are disclosed herein (Table 8). Overall, AITC was the most effective, followed by diacetyl and cinnamaldehyde. For example, 0.1 mg/L AITC inhibited the growth of mould for three days, while 2 mg/L of diacetyl and 30 mg/L of cinnamaldehyde were needed to achieve the equivalent inhibitory effect. Same trend was found on *P. fluorescens* and yeast. Moreover, the antimicrobial compounds showed different inhibitory effects on different microorganisms. AITC was more effective against mould (0.1 mg/L) than against *P. fluorescens* (1 mg/L) and yeast (0.5 mg/L). Diacetyl was more potent against *P. fluorescens* (2 mg/L) and mould (2 mg/L), but less effective against yeast (4 mg/L). On the other hand, cinnamaldehyde exhibited similar potency against mould, yeast and *P. fluorescens* (30 mg/L). On the basis of their different potency towards different microorganisms, combining AITC, diacetyl and cinnamaldehyde provides a wider antimicrobial spectrum than single compound alone.

TABLE 8

Inhibitory effects of AITC, diacetyl and cinnamaldehyde on yeast, mould and P. Fluorescens.

| Compound | Amount (mg) | Yeast day1 | Yeast day2 | Yeast day3 | Mould day1 | Mould day2 | Mould day3 | P. Fluorescens day1 | P. Fluorescens day2 |
|---|---|---|---|---|---|---|---|---|---|
| AITC | 0.1 | + | + | + | — | — | — | ++ | ++ |
|  | 0.5 | — | — | — | — | — | — | + | + |
|  | 1 | — | — | — | — | — | — | — | — |
|  | 1.5 | — | — | — | — | — | — | — | — |
|  | 2 | — | — | — | — | — | — | — | — |
|  | 3 | — | — | — | — | — | — | — | — |
|  | 5 | — | — | — | — | — | — | — | — |
| Diacetyl | 1 | + | + | + | + | + | + | + | + |
|  | 2 | + | + | + | — | — | — | — | — |
|  | 3 | — | + | + | — | — | — | — | — |
|  | 4 | — | — | — | — | — | — | — | — |
|  | 5 | — | — | — | — | — | — | — | — |
|  | 7 | — | — | — | — | — | — | — | — |
|  | 10 | — | — | — | — | — | — | — | — |
| Cinnamaldehyde | 2 | + | + | ++ | ++ | ++ | ++ | +++ | +++ |
|  | 5 | + | + | + | + | + | + | ++ | ++ |
|  | 10 | + | + | + | + | + | + | + | + |
|  | 20 | + | + | + | + | + | + | + | + |
|  | 30 | — | — | — | — | — | — | — | — |
|  | 50 | — | — | — | — | — | — | — | — |
|  | 100 | — | — | — | — | — | — | — | — |

Measurement are based on the visual colony number:
"—" no growth;
"+" less than 15;
"++" 15-50;
"+++" 50-150;
"++++" more than 150.

On the basis of the minimum inhibition concentration (MIC) values established on yeast, mould and P. fluorescens for the individual compounds from Table 8 (0.5, 4 and 30 mg/L for AITC, diacetyl and cinnamaldehyde respectively), further experiments were conducted to study the combined effects of these antimicrobials by systematically reducing the MIC values. Table 9 summarizes the inhibitory effect of different combinations of the three antimicrobial compounds. Treatments 25, 26, and 27 were based on single-component formulae, confirming their inhibitory properties against moulds and yeasts. Reducing the MIC for each of the compound by one fifth resulted in a concentration that did not inhibit the growth of mould and yeast (Treatments 22, 23, and 24). However, when same amounts of the antimicrobial compounds were combined together (Treatment 1), the resulting formula inhibited both mould and yeast in day 1 and suppressed the grow rate on days 2 and 3 as compared with the single component treatments (Treatments 22, 23, and 24). Reducing the concentrations further to one tenth of the MIC values (Treatment 13) in a combined formulation was also more effective than one fifth of the MIC of the single compound treatments (Treatments 22, 23 and 24). These results demonstrate that combinations of the three antimicrobials, below the MIC values of the individual compound, have a synergistic effect in enhancing the antimicrobial effectiveness against microorganisms.

TABLE 9

Antimicrobial properties of different combinations of AITC, diacetyl and cinnamaldehyde (CA) against mould and yeast on growth media.

| Treatment | CA (mg) | Diacetyl (mg) | AITC (mg) | Day 1 Mould (mm) | Day 1 Yeast | Day 2 Mould (mm) | Day 2 Yeast | Day 3 Mould (mm) | Day 3 Yeast |
|---|---|---|---|---|---|---|---|---|---|
| 1 | 6 | 0.8 | 0.1 | 0 | — | 0.8 | + | 1.8 | + |
| 2 | 6 | 0.8 | 0.05 | 0 | — | 0.9 | + | 1.8 | + |
| 3 | 6 | 0.8 | 0 | 0 | — | 1.6 | ++ | 1.9 | ++ |
| 4 | 6 | 0.4 | 0.1 | 0 | — | 0.4 | + | 1.0 | + |
| 5 | 6 | 0.4 | 0.05 | 0 | + | 0.8 | + | 1.8 | ++ |
| 6 | 6 | 0.4 | 0 | 0.5 | — | 1.3 | ++ | 2.5 | ++ |
| 7 | 6 | 0 | 0.1 | 0 | — | 0.6 | + | 1.5 | + |
| 8 | 6 | 0 | 0.05 | 0 | — | 1.0 | + | 1.8 | + |
| 9 | 0 | 0 | 0 | 1.6 | ++ | 3.5 | +++ | 6.0 | +++ |
| 10 | 3 | 0.8 | 0.1 | 0.5 | — | 1.5 | ++ | 2.6 | ++ |
| 11 | 3 | 0.8 | 0.05 | 0.7 | + | 1.9 | ++ | 3.2 | ++ |
| 12 | 3 | 0.8 | 0 | 0.6 | + | 1.8 | ++ | 3.0 | ++ |
| 13 | 3 | 0.4 | 0.1 | 0.4 | — | 1.5 | ++ | 2.5 | ++ |
| 14 | 3 | 0.4 | 0.05 | 0 | — | 1.2 | + | 2.3 | + |
| 15 | 3 | 0.4 | 0 | 0.6 | ++ | 1.8 | +++ | 3.3 | +++ |
| 16 | 3 | 0 | 0.1 | 0.6 | ++ | 1.7 | +++ | 3.2 | +++ |

TABLE 9-continued

Antimicrobial properties of different combinations of AITC, diacetyl and cinnamaldehyde (CA) against mould and yeast on growth media.

|  |  |  |  | Day 1 | | Day 2 | | Day 3 | |
|---|---|---|---|---|---|---|---|---|---|
| Treatment | CA (mg) | Diacetyl (mg) | AITC (mg) | Mould (mm) | Yeast | Mould (mm) | Yeast | Mould (mm) | Yeast |
| 17 | 3 | 0 | 0.05 | 0.8 | ++ | 2.0 | +++ | 3.8 | +++ |
| 18 | 0 | 0.8 | 0.1 | 0.5 | ++ | 1.8 | +++ | 3.5 | +++ |
| 19 | 0 | 0.8 | 0.05 | 0.9 | ++ | 2.1 | +++ | 3.9 | +++ |
| 20 | 0 | 0.4 | 0.1 | 0.8 | ++ | 2.1 | +++ | 4.0 | +++ |
| 21 | 0 | 0.4 | 0.05 | 0.9 | ++ | 2.5 | +++ | 4.9 | +++ |
| 22 | 0 | 0.8 | 0 | 0.5 | ++ | 1.8 | +++ | 3.8 | +++ |
| 23 | 0 | 0 | 0.1 | 0 | + | 0 | ++ | 0 | ++ |
| 24 | 6 | 0 | 0 | 1.0 | ++ | 2.0 | ++ | 3.0 | ++ |
| 25 | 30 | 0 | 0 | 0 | — | 0 | — | 0 | — |
| 26 | 0 | 4 | 0 | 0 | — | 0 | — | 0 | — |
| 27 | 0 | 0 | 0.5 | 0 | — | 0 | — | 0 | — |

Measurement of mould is based on colony diameter (mm);
Measurement of yeast are based on the visual colony number:
"—" no growth;
"+" less than 15;
"++" 15-50;
"+++" 50-150;
"++++" more than 150.

Among the treatments tested, Treatment 4 with AITC:diacetyl:cinnamaldehyde weight ratio of 1:4:60, exhibited the highest inhibitory effects. Accordingly, this concentration was selected for the shelf life testing of mung bean sprouts.

Figure 20:
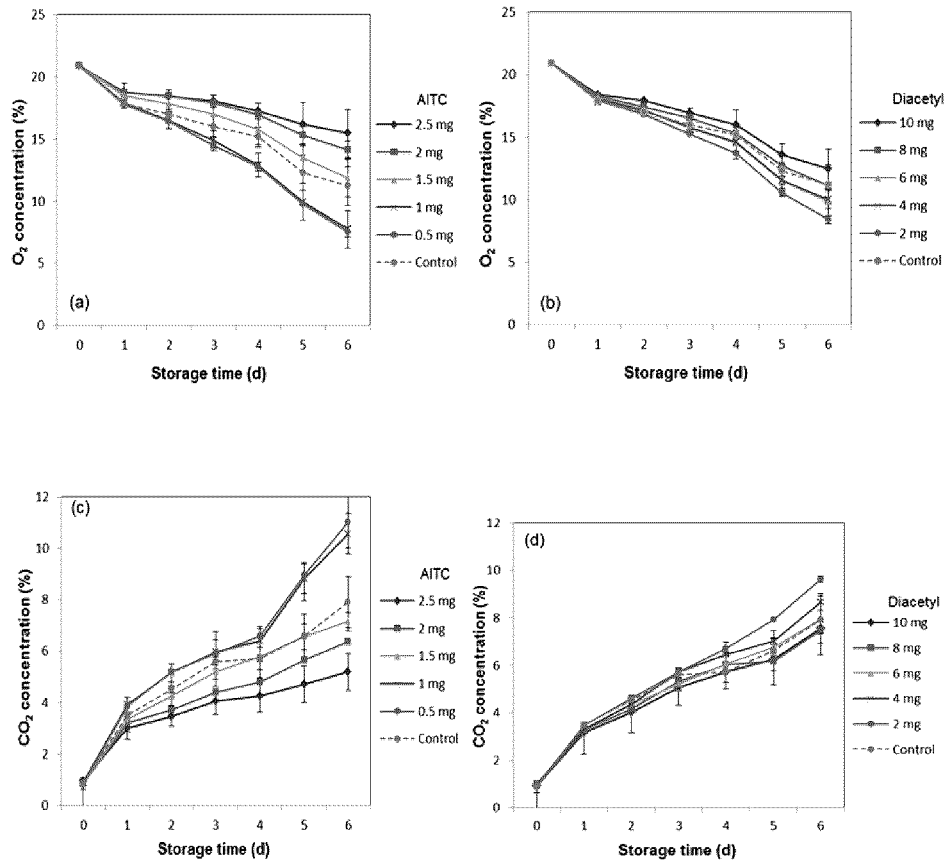
FIG. 20 shows the headspace oxygen/carbon dioxide concentration of mung bean sprout stored at 4° C.: (a) and (c) were treated with AITC; (b) and (d) were treated with diacetyl.
Figure 21:
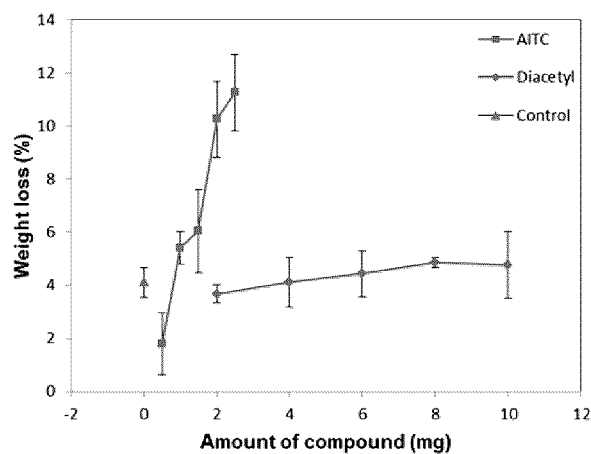
FIG. 21 shows the weight loss of mung bean sprouts after 7 days of storage with or without antimicrobial compounds.

Based on the results from the antimicrobial studies, AITC (0.5 to 2.5 mg/L) and diacetyl (2 to 10 mg/L) were further tested on mung bean sprouts. Since the mung bean sprouts were hermetically sealed in 1 L glass jars, the $O_2/CO_2$ concentration indicates the respiratory activities of the sprouts. FIG. 20 shows the $O_2$ and $CO_2$ concentration of mung bean sprouts treated with different concentration of AITC (FIGS. 20(a) and (c)) or diacetyl (FIGS. 20(b) and (d)). The results revealed that concentration of antimicrobial compounds influenced the respiration rate of the sprouts. With low concentration of AITC (<1.5 mg/L) or diacetyl (<8 mg/L), the respiration rates of the sprouts were higher than the untreated control. However, when the concentration of antimicrobial compounds increased, the respiration of the sprouts was depressed, possibly due to the physiological damage to the plant tissues. Moreover, it can be observed from FIG. 20 that the respiration of mung bean sprouts is more sensitive to the change of AITC concentration rather than change in diacetyl concentration. Although AITC is more effective against microorganisms, it can also induce a greater physiological damage on the sprouts, especially at elevated concentration (FIG. 21).

Figure 22:
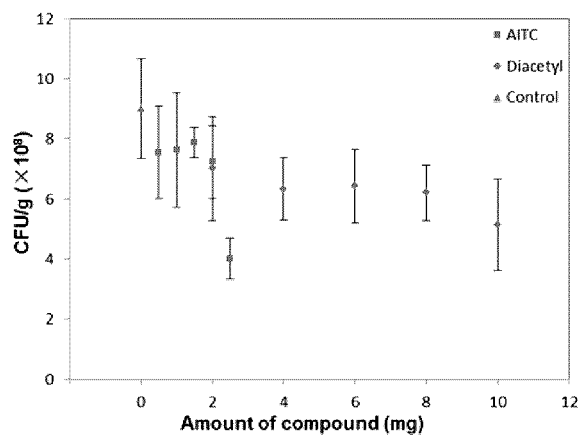
FIG. 22 shows the microbial load of mung bean sprout after 7 d storage with or without antimicrobial compounds.

The microbial load of mung bean sprouts after 7 d of storage is present in FIG. 22. As expected, sprouts treated with higher concentration of antimicrobial compounds showed lower microbial load. Knowing that the combination of the three antimicrobial compounds showed enhanced antimicrobial effects, the shelf life of mung bean sprouts treated was tested with combinations of antimicrobials.

Figure 23:
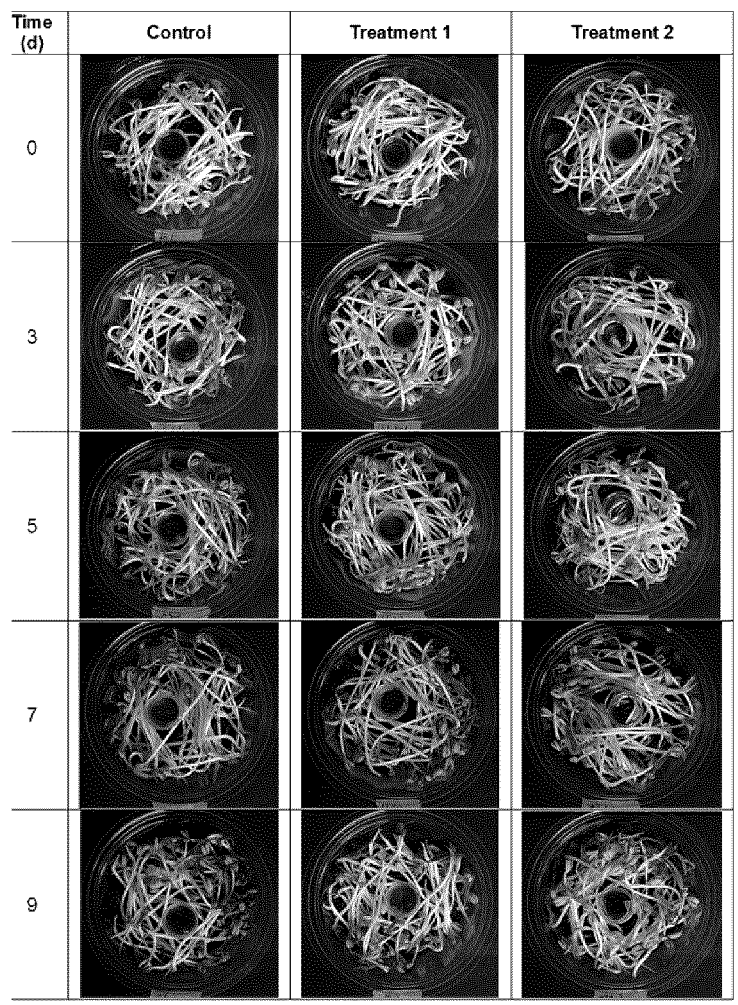
FIG. 23 shows the change of appearance of mung bean sprouts during 9 days of storage at 10° C., wherein control samples were not treated with the antimicrobial compounds; treatment 1 was samples treated with liquid antimicrobials combination; and treatment 2 was samples treated with antimicrobial-loaded carriers.

Accordingly, the optimal ratio of the antimicrobials to inhibit mould and yeasts is 1:4:60 AITC:diacetyl:cinnamaldehyde. Based on these results, the antimicrobial compounds used in this experiment are fixed at 0.1, 0.4, and 6 mg AITC, diacetyl and cinnamaldehyde, respectively in 250 mL PLA bowl. FIG. 23 shows the appearance of packaged mung bean sprouts during storage. The cotyledon and radicle of the sprouts started to turn brown at day 5. At day 7, the appearance of sprouts is no longer acceptable. In comparison, treatment groups showed less browning than control, up to day 9, demonstrating that the antimicrobial compounds inhibit the browning in sprouts.

Figure 24:
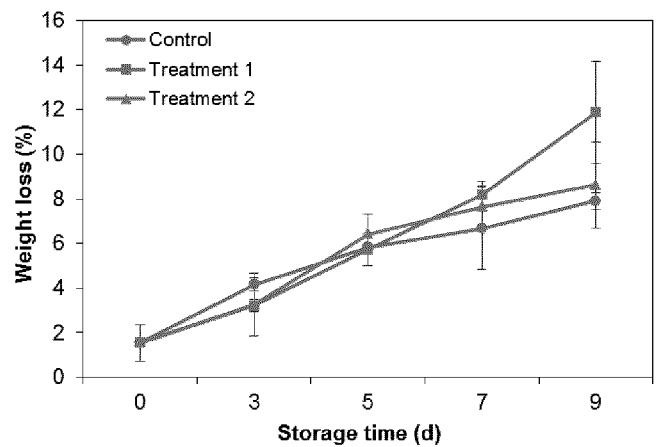
FIG. 24 shows the weight loss of mung bean sprouts for each group during storage at 10° C., wherein control samples were not treated with the antimicrobial compounds; treatment 1 was samples treated with liquid antimicrobials combination; and treatment 2 was samples treated with antimicrobial-loaded carriers.

The weight loss of sprouts from each group increased linearly with time during the 9-day storage (FIG. 24). The weight loss for the control group did not show significant different (p>0.05) from Treatment 2, while the weight loss of Treatment 1 was significantly higher (p<0.05) than other groups on day 9. Since the antimicrobial compounds added in Treatment 1 were not encapsulated, the rapid release of these compounds into the headspace might have resulted in high vapor concentrations that induced sprout tissue injuries. On the contrary, for Treatment 2, the carrier polymers provided gradual release of antimicrobial volatile compounds prevented the headspace concentration from reaching the damaging level, especially for AITC.

Figure 25:
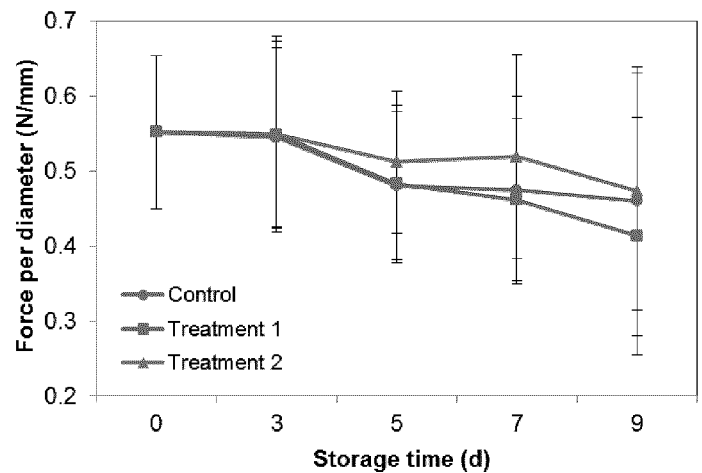
FIG. 25 shows the hardness of mung bean sprouts for each group during storage at 10° C., wherein control samples were not treated with the antimicrobial compounds; treatment 1 was samples treated with liquid antimicrobials combination; and treatment 2 was samples treated with antimicrobial-loaded carriers.

The water loss of sprouts was also reflected on the hardness of the sprouts (FIG. 25). As shown, the hardness of the sprouts for all groups remained unchanged during the first three days, but declined in the following days. Variation between samples was considerable, although average hardness values (n=60) showed a more rapid decreasing trend with time for Treatment 1 than Treatment 2.

Figure 26:
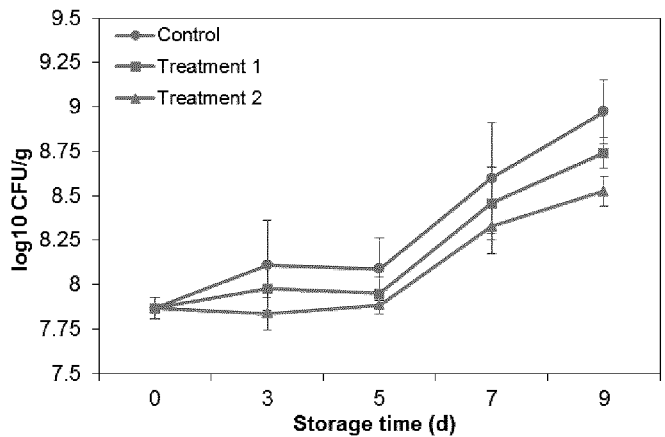
FIG. 26 shows the microbial load of mung bean sprouts for each group during storage at 10° C., wherein control samples were not treated with the antimicrobial compounds; treatment 1 was samples treated with liquid antimicrobials combination; and treatment 2 was samples treated with antimicrobial-loaded carriers.

The microbial load of sprouts for each group is presented in FIG. 26. The initial microbial load of mung bean sprout was 7.8 log CFU/g which is typical for sprouting products. As shown, no significant change in CFU was observed for the first 5 days, but increased thereafter. Both Treatments 1 and 2 showed lower microbial counts than the control group, indicating the antimicrobial properties of the volatile compounds introduced. The greater microbial loads for Treatment 1 comparing with Treatment 2 may be due to tissue injuries induced by high concentrations of the antimicrobial compounds, causing leakage of nutrients that supported microbial growth. Moreover, rapid initial release of volatile compounds also resulted in rapid depletion of the volatiles through permeation and sorption losses, reducing the antimicrobial concentration in the headspace during the later phase of storage. On the other hand, Treatment 2 provided sustained releases of the volatile compounds to continuously exert antimicrobial efficacy against the microorganisms during storage.

Figure 27:
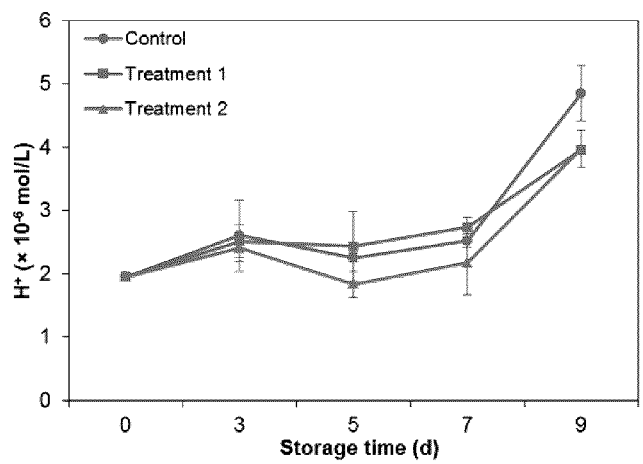
FIG. 27 shows the total titratable acid of mung bean sprouts for each group during storage at 10° C., wherein control samples were not treated with the antimicrobial compounds; treatment 1 was samples treated with liquid antimicrobials combination; and treatment 2 was samples treated with antimicrobial-loaded carriers.

The total titratable acid of sprouts can be correlated with microbial activities, especially the lactic acid bacteria. As shown in FIG. 27, the total acid for all treatments remained fairly unchanged during the first 7 days of storage, but increased considerably on day 9, indicating the potential proliferation of lactic acid bacteria. Although lower titratable acidity values were observed for the treated samples, all products are deemed to be no longer acceptable on day 9 due to the undesirable acidic odor.

Cinnamaldehyde, diacetyl and AITC are effective antimicrobial compounds against wide range of microorganisms, including mould, yeast and bacteria. Based on the minimum inhibition concentration needed to inhibit specific microorganisms, AITC is considered the most effective among the three compounds tested, followed by diacetyl and cinnamaldehyde. Combining the three antimicrobial compounds showed enhanced antimicrobial properties against mould and yeast since less concentration of each compound was needed to achieve same efficiency. Results revealed that AITC:diacetyl:cinnamaldehyde ratio of 1:4:60 was the most effective among all the tested formulations.

Thymol is a natural compound extracted from thyme herb EO. It is an approved food additive and is GRAS. It has been demonstrated to exhibit antimicrobial effect against spoilage bacteria (e.g., *P. fluorescens* and *Enterobacter* sp.) and fungi (e.g., *Aspergillus* spp. and *C. albicans*).

Studies have shown that thymol vapor exhibits strong antimicrobial efficacy against bacteria and fungi. For antimicrobial active packaging applications, because microbial contamination tends to occur on the surfaces of most foods and thymol is insoluble in water, treating the products with thymol vapor would be more efficient than direct addition into the food matrix, especially those with relatively high moisture content, thereby reducing the required dosage. However, thymol has low volatility. For comparison, at 25° C., the vapor pressure of thymol is 0.0054 while water is 3.1579 kPa. The relatively low volatility of thymol may limit its application in antimicrobial active packaging due to slow buildup of concentration in the package headspace to an inhibitory level.

Electrospun nonwoven is a fiber membrane prepared by electrospinning process, which uses high voltage electrical field to draw polymers into continuous fibers ranging from tens to hundreds of nanometers. The high surface area-to-volume ratio of electrospun nonwovens makes these materials more responsive to environmental changes (e.g., moisture and temperature) than other polymer carriers with continuous surface morphology (e.g., smooth films). The interactive behaviors of electrospun nonwovens can be exploited as a trigger to activate the release of loaded antimicrobial compounds. By dispersing low volatile compounds, such as thymol, in a compatible electrospun nonwoven, the vaporization rate of the antimicrobial can be increased to enhance its antimicrobial efficacy.

Ethylcellulose (EC) is a derivative of cellulose in which some of the hydroxyl groups on the repeating glucose units are substituted by ethyl ether groups. As described herein, PEO, a biodegradable hydrophilic polymer, was blended with EC to facilitate the electrospinning process and aqueous ethanol solution was used to reduce the vapor pressure of solvent and to dissolve PEO.

By incorporating hydrophilic PEO of different molecular weight into the relatively hydrophobic EC, the moisture-sensitivity of the resulting nonwovens can be manipulated to achieve the desired controlled-release behavior.

Figure 28:
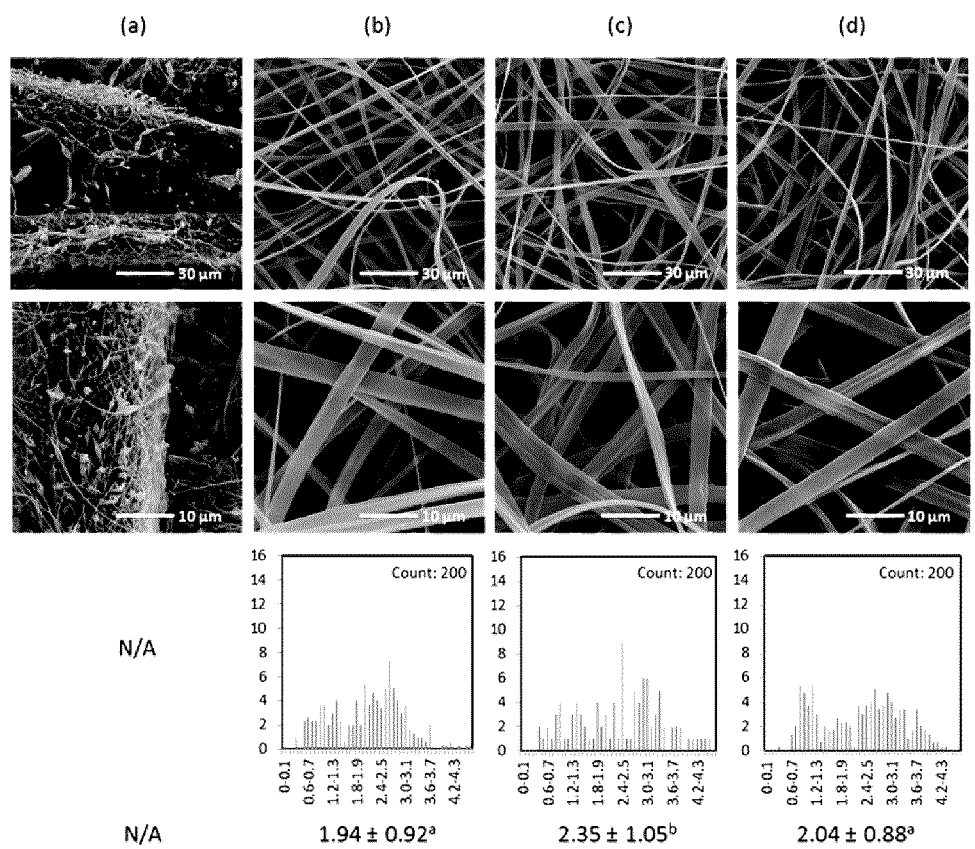
FIG. 28 illustrates scanning electron micrographs of nonwovens electrospun from 10% (w/w) EC solution blended with different concentrations and molecular weights of PEO: (a) 0% (w/w) PEO; (b) 1% (w/w) PEO300; (c) 1% (w/w) PEO900; and (d) 2% (w/w) PEO300, wherein the histograms show the distribution of fibers (y-axis; frequency (%)) in different diameter intervals (x-axis; µm), fiber diameter values are means±standard deviations and means with different superscript letters indicate statistical significant difference ($p<0.05$).

FIG. 28 summarizes the effects of PEO molecular weight and content on the morphology and size distribution of electrospun EC nonwovens produced using the free surface wire electrospinner. The neat electrospun EC had ultrathin but non-continuous fibers, which deposited randomly on the nonwoven polypropylene substrate (FIG. 28*a*). The exposure of spin dope to the air as it was being deposited onto the wire electrode might have caused partial solvent evaporation and polymer solidification, hindering the formation of continuous EC fibers. However, the addition of PEO into the spin dope facilitated the formation of smooth and continuous EC fibers that resembling thin ribbons (FIGS. 28*b-d*). The ribbon morphology is consistent with the apparent broad thickness distributions observed for these fibers, attributable to the two-dimensional measurements made from the SEM micrographs that could not account for the fiber's cross-sectional aspect ratio. The positive effect of PEO is often attributed to the high molecular weight of PEO that increases polymer chain entanglement, stabilizing the polymer jets during the electrospinning process. Moreover, PEO is soluble in water by establishing hydrogen bonds at two sites on each ether oxygen atom of the helical PEO chains, leading to the formation of a coil of water molecules around PEO chain. Therefore, the high affinity of PEO to water may slow down the solvent evaporation rate, preventing the premature solidification of the polymer.

Increasing PEO300 content from 1 to 2% (w/w) did not significantly change the diameter of the resulting electrospun fibers (1.94±0.92 and 2.04±0.88 μm respectively). However, at 1% (w/w) PEO concentration, an increase in molecular weight from 300 to 900 kDa significantly increased the fiber diameters from 1.94±0.92 to 2.35±1.05 μm ($p<0.05$). The increase in molecular weight enhanced the chain entanglement so that increased the viscoelastic force along the jets, which stabilized the charged jets, limited the degree of stretching and generated fibers with larger diameter.

Figure 29:
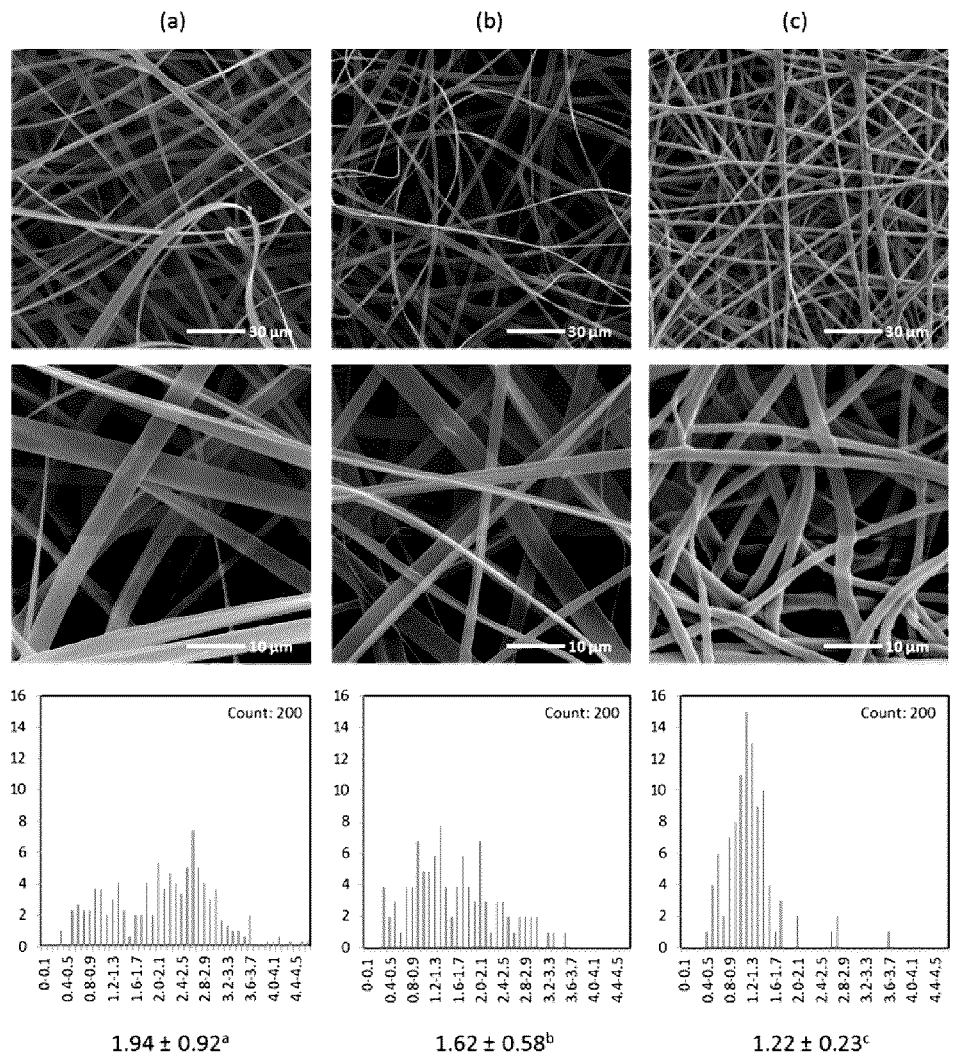
FIG. 29 illustrates scanning electron micrographs of EC-1% PEO300 nonwovens electrospun from dopes with different thymol loadings: (a) 0% (w/w) thymol; (b) 1% (w/w) thymol; and (c) 5% (w/w) thymol, wherein the histograms show the distribution of fibers (y-axis; frequency (%)) in different diameter intervals (x-axis; µm), fiber diameter values are means±standard deviations and means with different superscript letters indicate statistical significant difference ($p<0.05$).

As shown in FIG. 29, the fiber diameter decreased significantly ($p<0.05$) from 1.94±0.92 to 1.62±0.58 μm when 1% (w/w) thymol was loaded into spin dope. Further decrease in fiber diameter to 1.22±0.23 μm was observed when thymol loading in spin dope increased to 5% (w/w). Moreover, the fibers changed from ribbon morphology to more cylindrical thread, consistent with the reduced thickness distribution of the fibers. The addition of thymol might have depressed the vapor pressure of the solvent and slowed down the solidification of the polymer jets, prolonging their flight time that allowed further whipping and stretching of the fibers, thereby decreasing the fiber diameters.

The formation of ribbon-like fibers was probably due to the rapid evaporation of solvent from surface leading to the formation of tube-like sheath layer that collapsed to form flat ribbons. Because ethanol is more volatile than water, the alcohol would tend to evaporate from the surface of the polymer jets quicker than water. This preferential evaporation of ethanol formed a water-rich sub-surface layer that resulted in phase separation of thymol from the polymer solution and partition towards the core of the fibers. As the thymol loading in spin dope increased, the amount of thymol that get partitioned into the core of the polymeric tube is expected to fill, thereby changing the fiber morphology from flat ribbon to cylindrical thread.

Figure 30:
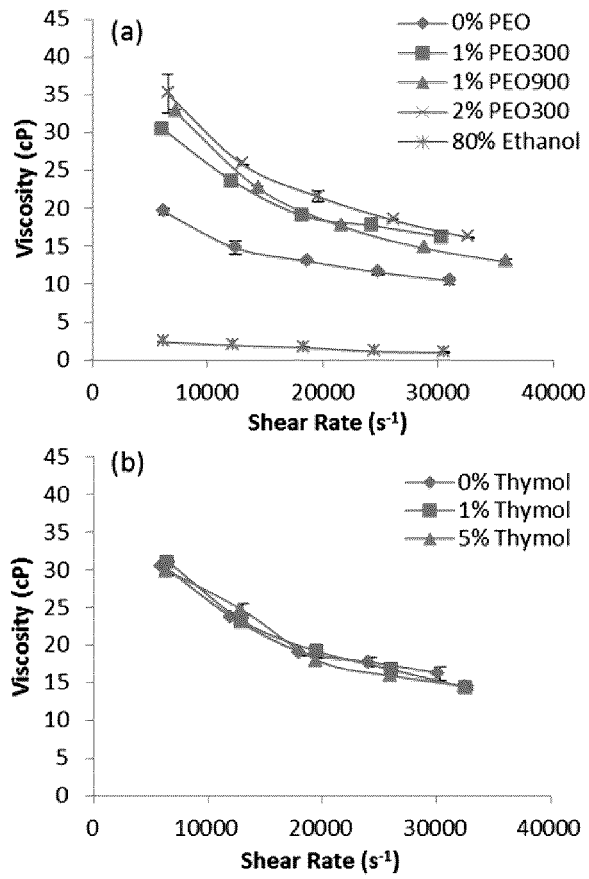
FIG. 30 illustrates the viscosity values of (a) 10% (w/w) EC solutions with different PEO content and molecular weight and (b) EC-1% PEO300 solutions with different thymol loadings as a function of shear rate.

Viscosity is a critical parameter that affects the electrospinning process of polymer solutions and is related to the polymer concentration and molecular weight. All the electrospinning solutions evaluated had flow behavior index 0.11 smaller than 1, indicating that they all exhibited non-Newtonian shear-thinning behaviors (Table 10). The addition of PEO into EC solution resulted in considerable increase in the solution viscosity (FIG. 30a). Increasing PEO300 content from 1 to 2% (w/w) increased the viscosity of polymer solution significantly, with concomitant increase in fiber diameter. This correlation implies that PEO might have increased the polymer chain entanglement between EC and PEO, reducing the extent of fiber drawing. On the other hand, the incorporation of thymol into polymer solution did not result in significant change on the viscosity (FIG. 3.b), indicating that at the concentrations tested (1 and 5% w/w of thymol loading), thymol had a limited effect on the polymer chain-chain entanglement.

TABLE 10

Flow behavior index of different polymer solutions at 21 ± 2° C.

| Polymer | n |
|---|---|
| 10% EC | 0.608 ± 0.011 |
| 10% EC 1% PEO300 | 0.649 ± 0.026 |
| 10% EC 1% PEO900 | 0.419 ± 0.015 |
| 10% EC 2% PEO300 | 0.528 ± 0.053 |
| 10% EC 1% PEO300 1% Thymol | 0.528 ± 0.001 |
| 10% EC 1% PEO300 5% Thymol | 0.529 ± 0.013 |

Electrical conductivity measures the ability of charges to migrate to the spin dope surface, essential for building up Coulombic repulsion to initiate the jetting phenomenon. As shown in Table 10, the electrical conductivity of EC solution decreased from 61.07±0.35 to 53.25±0.31 and 52.17±0.62 µs cm$^{-1}$ when 1% and 2% (w/w) PEO300 were incorporated into the EC solution, respectively. The result shows that PEO had charge-counteracting effect in the spin dope, which is in agreement with what has been previously reported. Increase of PEO molecular weight from 300 to 900 kDa increased the electrical conductivity slightly from 53.25±0.31 to 55.56±0.32 µs cm$^{-1}$ and implies that the difference in charge-counteracting effect between PEO with different molecular weight is minimal within the range tested. The addition of 1% (w/w) thymol into polymer solution did not change the electrical conductivity significantly. However, as the thymol content increased to 5% (w/w), the electrical conductivity decreased from 53.25±0.31 to 46.91±0.26 µs cm$^{-1}$. The decrease in electrical conductivity reduced the slippage of charges along the polymer jets, allowing the electrostatic repulsion force to effective stretch the fibers and reduce the diameter.

As shown in Table 11, the surface tension of EC solution increased from 52.0±0.4 to 55.1±0.4, 68.2±1.0 and 90.6±4.3 mN m$^{-1}$ when 1% (w/w) PEO300, 1% (w/w) PEO900 and 2% (w/w) PEO300 were blended with EC solutions, respectively. This result implies that the addition of PEO into EC solution increased the cohesive energy of the polymer solution, which could be strengthened by the enhancement on the EC-PEO chain entanglement. The incorporation of 1% (w/w) and 5% (w/w) thymol into EC-PEO solution also increased the surface tension from 55.1±0.4 to 64.6±1.2 and 64.8±0.6 mN m$^{-1}$, respectively. Although the addition of PEO and thymol increased surface tension of the polymer solutions, which was undesirable in majority of electrospinning process, the SEM images demonstrate that PEO and thymol could facilitate the electrospinning of EC solution, suggesting that surface tension may not be the dominant factor, especially when the solution viscosity was sufficient high and that viscoelastic forces were dominant.

TABLE 11

Mean electrical conductivity and surface tension values of different polymer solutions at 21 ± 2° C.

| Polymer | Electrical Conductivity (µs cm$^{-1}$) | Surface Tension (mN m$^{-1}$) |
|---|---|---|
| 10% EC | 61.07 ± 0.35 | 52.0 ± 0.4 |
| 10% EC 1% PEO300 | 53.25 ± 0.31 | 55.1 ± 0.4 |
| 10% EC 1% PEO900 | 55.56 ± 0.32 | 68.2 ± 1.0 |
| 10% EC 2% PEO300 | 52.17 ± 0.62 | 90.6 ± 4.3 |
| 10% EC 1% PEO300 1% Thymol | 53.89 ± 0.42 | 64.6 ± 1.2 |
| 10% EC 1% PEO300 5% Thymol | 46.91 ± 0.26 | 64.8 ± 0.6 |

Figure 31:
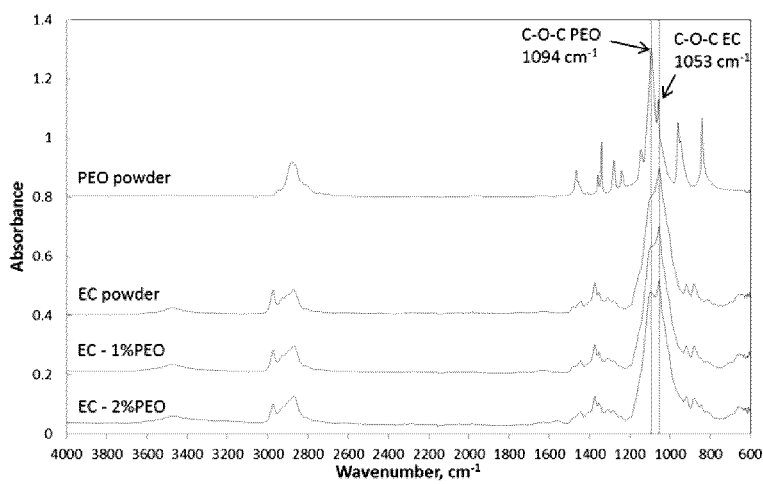
FIG. 31 illustrates the ATR-FTIR spectra for electrospun EC-PEO nonwovens, EC and PEO powder.
Figure 32:
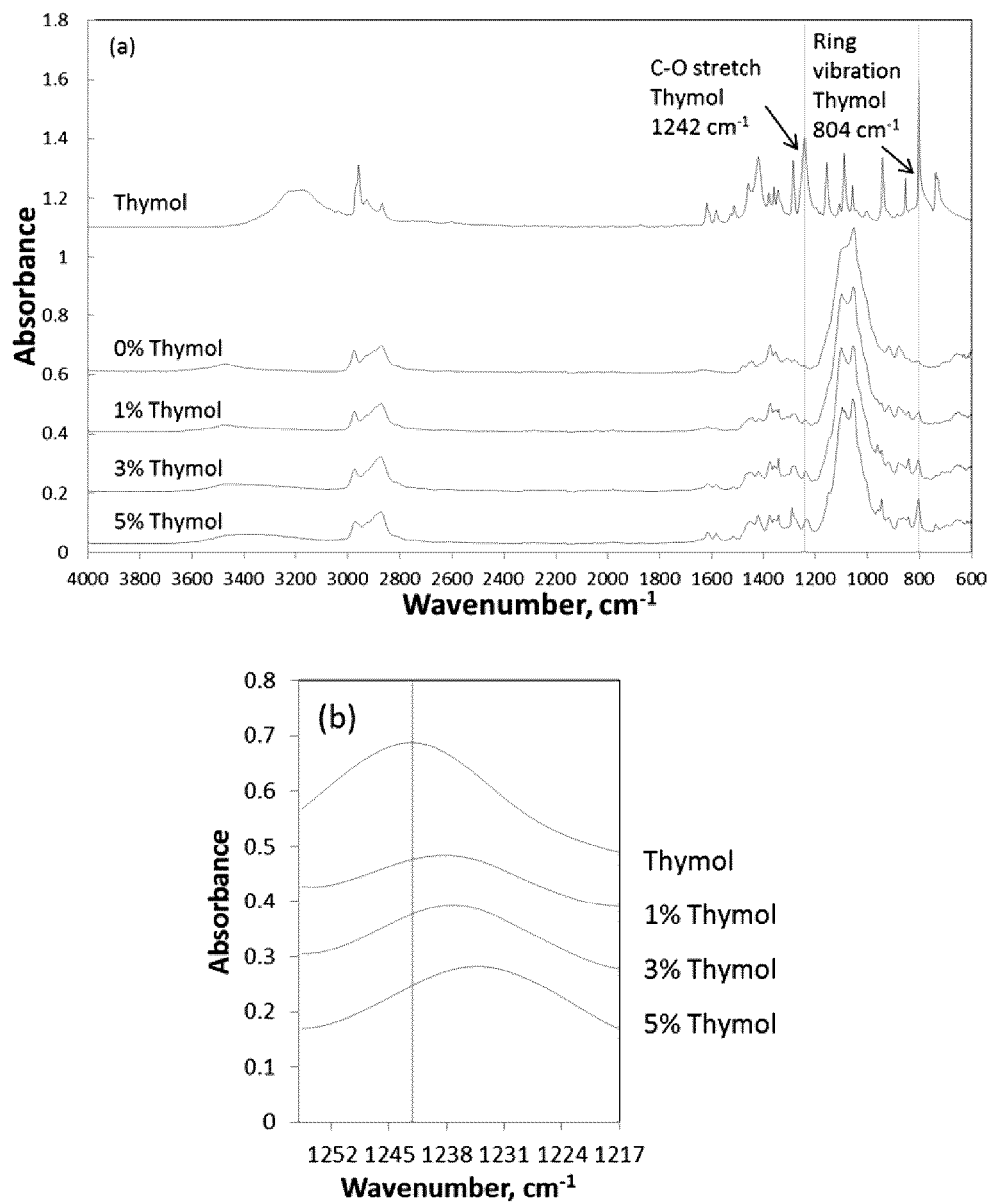
FIG. 32 illustrates the ATR-FTIR spectra for electrospun EC-PEO-thymol nonwovens: (a) full spectra for thymol and EC-PEO nonwovens electrospun from dopes with different thymol loadings; and (b) spectra near C—O stretching regions.

FIG. 31 shows the ATR-FTIR spectra of electrospun EC-PEO nonwovens, EC and PEO powders. The broad band at 3470 cm$^{-1}$ is assigned to hydrogen-bonded OH stretching. The C—H stretching and bending vibrations are located at 3000-2850 and 1500-1250 cm$^{-1}$, respectively. The characteristic C—O—C stretching band appears at 1053 cm$^{-1}$. For PEO spectrum, a characteristic absorption band located at 1094 cm$^{-1}$ was observed, which is assigned to C—O—C stretching. The ATR-FTIR spectra of electrospun EC-PEO nonwovens show peaks that were a summation of the characteristic peaks obtained with pure PEO and pure EC. No significant wavenumber shift was observed for peaks as EC and PEO were incorporated together. Therefore, the ATR-FTIR analysis did not reveal any specific interactions between EC and PEO polymers. FIG. 32(a) shows the ATR-FTIR spectra of thymol and EC-PEO nonwovens electrospun from dopes with different thymol loadings. The peak at 804 cm$^{-1}$ is attributed to out-of-plane aromatic C—H wagging vibration of thymol. The peak located at 1242 cm$^{-1}$ in spectrum of thymol, which is attributed to C—O stretching in phenol, shifted to 1232 cm$^{-1}$ (FIG. 32(b)), implying possible interactions between thymol and the polymers.

Figure 33:
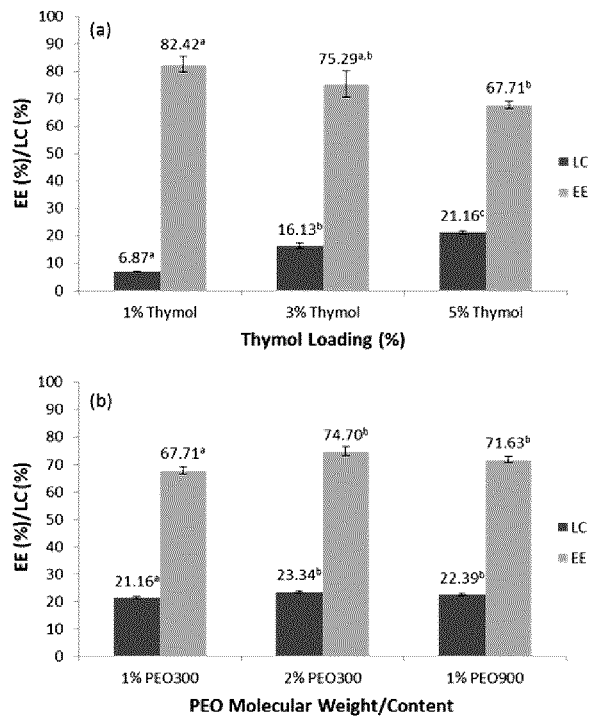
FIG. 33 illustrates loading capacity (LC) and encapsulation efficiency (EE) of EC-PEO nonwovens: (a) EC-1% PEO300 nonwovens electrospun from dopes with different thymol loadings; and (b) EC-1% PEO300, EC-2% PEO300, EC-1% PEO900 nonwovens electropsun from dopes with 5% (w/w) thymol loading, wherein means with different superscript letters indicate statistical significant difference ($p<0.05$).
Figure 34:
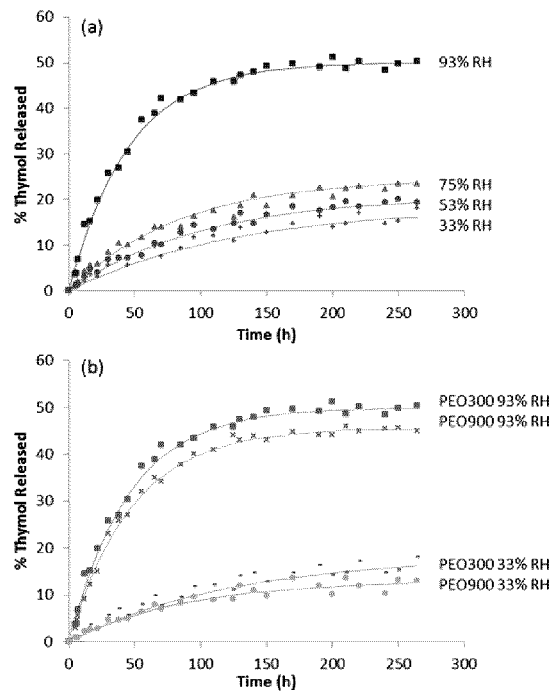
FIG. 34 illustrates the release profile of thymol-loaded EC-PEO nonwovens exposed to different RH conditions at 25° C. for 11 days: (a) effect of RH, and (b) effect of PEO molecular weight.

FIG. 33 summarizes the LC and EE of electrospun EC-PEO nonwovens as affected by PEO and thymol. Increasing thymol loading resulted in increased LC, but lowered EE values (FIG. 33(a)). This finding can be attributed to the reduced availability of polymer to encapsulate thymol, consistent with the observation that both LC and EE increased as PEO content increased (FIG. 33(b)). The significant increases in LC and EE as PEO molecular weight increased can be related to the stronger barrier properties, and therefore higher thymol entrapment of PEO900 than PEO300. This observation agreed with finding that lower amounts of thymol was released for PEO900 than PEO300 at any given time and RH conditions (FIG. 34).

Figure 35:
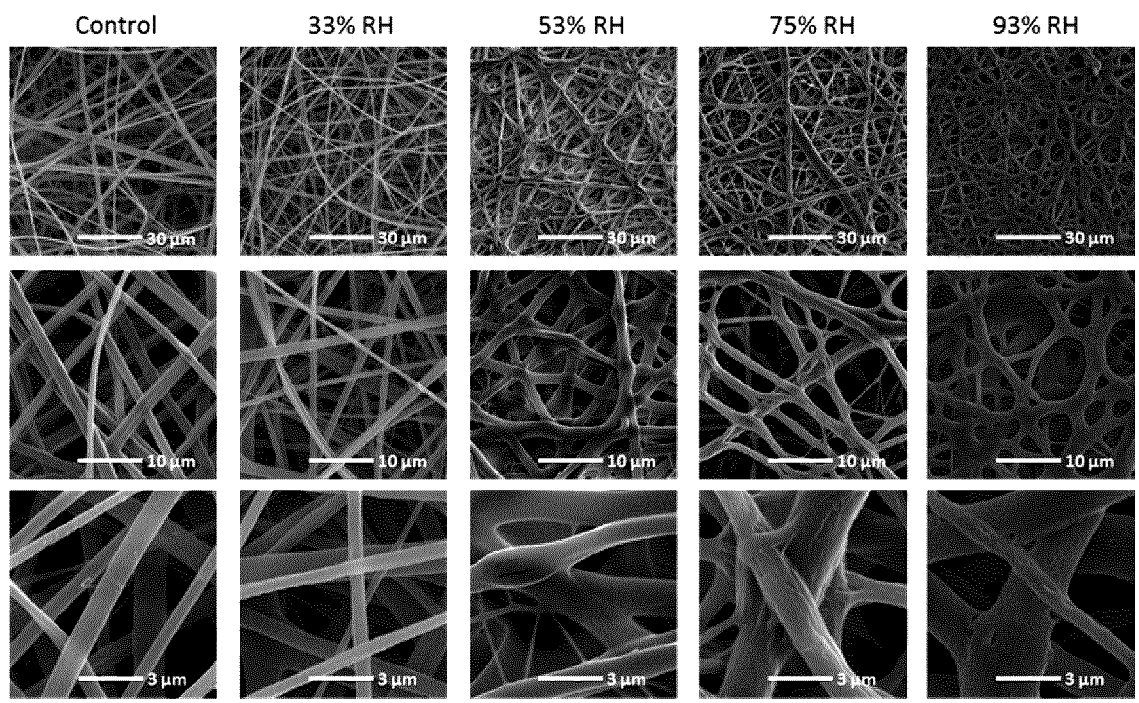
FIG. 35 illustrates scanning electron micrographs of EC-1% PEO300 nonwovens electrospun from dope with 5% (w/w) thymol loading before (control; freshly prepared nonwovens) and after exposing the samples to 33, 53, 75, and 93% RH conditions for 11 days.

Table 12 summarizes the release rate constant (k) and equilibrium percentage of released thymol ($C_e$) for the EC-1% PEO nonwovens electrospun from spin dope with 5% (w/w) thymol loading. Approximately 20% (w/w) of thymol was released when the nonwovens were exposed to 33 to 75% RH conditions, while about 50% (w/w) thymol was released when RH was elevated to 93%, with concomitant increase in diffusion rate constant (FIG. 34(a)). The RH-dependent behaviors are caused by the plasticization effect of water molecules on EC and PEO polymers, increasing the molecular motions in the fiber matrix that triggered the release of thymol. The plasticization effects of moisture are evident from the SEM analysis. The nonwovens exhibited different morphologies after the exposure to different RH conditions for 11 days (FIG. 35). At 33% RH, no detectable changes were observed in the fibers when compared with the control, which was the freshly prepared nonwoven sample before the exposure to different RH conditions. However, as RH increased to 53% level, the taut fibers observed at 0 and 33% RH were transformed into fibers with wavy morphologies, with top fibers appeared to droop over the fibers underneath, indicative of extensively plasticization of materials. As RH increased further to 75%, increased fiber surface roughness was observed with concomitant fusion of materials where the fibers were contacting with each other. At 93% RH, contact points among fibers tended to fuse together, creating a mesh-like network. These results show that the nonwovens are moisture-sensitive. Although EC is insoluble in water, this cellulose derivative is known to be capable of absorbing 4-5%/d.b. moisture at 90% RH. The incorporation of PEO into the EC fiber is expected to enhance the hydrophilic nature of the nonwovens. At higher magnification, pores were detected on the surface for the fibers exposed to 93% RH, which were not detected at lower RH conditions. The formation of pores may be related to the phase separation of hydrophilic PEO from the relatively more hydrophobic EC as the PEO absorbed large quantity of water.

TABLE 12

Averaged values of $C_e$ and k for Equation 4. 12 estimated from Solver function for fitting the release profiles of thymol at different RH conditions.

| EC-PEO nonwovens | RH | $C_e$ (%) | k ($h^{-1}$) |
|---|---|---|---|
| PEO300 | 33% | 18.476 ± 0.527 | 0.008 ± 0.001 |
|  | 53% | 20.861 ± 0.369 | 0.010 ± 0.002 |
|  | 75% | 24.725 ± 0.064 | 0.012 ± 0.003 |
|  | 93% | 50.023 ± 0.703 | 0.022 ± 0.002 |
| PEO900 | 33% | 13.305 ± 0.068 | 0.011 ± 0.004 |
|  | 93% | 45.666 ± 0.646 | 0.021 ± 0.001 |

The PEO molecular weight shows limited effect on the release rate (Table 13). However, other study found that the increase in PEO molecular weight may increase the degree of chain entanglement so that hampered the diffusion of thymol and slowed drug release. The possible explanation is that the PEO content was low (1% w/w) in electrospun nonwovens compared to 5%-70% (w/w) in the literature so that the change on PEO molecular weight may have limited effect on the diffusion rate. However, increasing PEO molecular weight decreased the equilibrium percentage of thymol released. Polymer with long chain length may have more interaction sites to bind with thymol and therefore, limited the amount of thymol that diffused out of nonwovens.

TABLE 13

HSP values of solvents and polymers and the solubility of polymers in solvents, the compatibility between polymers and the affinity of thymol to polymers and solvents.

| | HSP Values ($MPa^{1/2}$) | | | | | |
|---|---|---|---|---|---|---|
| Solvents/Polymers | $\delta_D$ | $\delta_P$ | $\delta_H$ | $R_a$ (thymol) | $R_a$ (EC) | $R_a$ (PEO) |
| Ethanol | 15.8[a] | 8.8[a] | 19.4[a] | 11.6 | 16.1 | 14.6 |
| $H_2O$ | 15.5[a] | 16[a] | 42.3[a] | 34.3 | 38.6 | 32.4 |
| 80% (v/v) Ethanol | 15.7 | 10.2 | 24.0 | 15.8 | 20.3 | 19.1 |
| EC | 20.1[a] | 6.9[a] | 5.9[a] | 5.9 | — | 9.5 |
| PEO | 22.2[a] | 11.2[a] | 13.20[a] | 9.6 | 9.5 | — |

[a]Values were obtained from Hansen (2007, Hansen solubility parameters: a user's handbook, CRC press).

The entrapment and release behaviors of thymol in the EC-PEO nonwovens could be explained using the $R_a$ value derived from Hansen Solubility Parameters (HSP) (Table 13). A low $R_a$ value indicates high affinity between the two components and vice versa. During electrospinning, because ethanol is more volatile than water, the alcohol would migrate to the surface and evaporate more quickly than water. This resulted in ethanol-rich surface and water-rich sub-surface regions. EC is insoluble in water (38.6 $MPa^{1/2}$), while PEO is water soluble (32.4 $MPa^{1/2}$). Thus, EC would tend to form a skin layer on the surface in the ethanol region, but PEO would tend to partition below the surface in the water-rich region. Because the flight time of the polymer jets was very short, some PEO chains would remain physically entrapped in the EC skin matrix, considering that the $R_a$ value between PEO and EC is quite small (9.5-9.6 $MPa^{1/2}$). $R_a$ of thymol in ethanol (11.6 $MPa^{1/2}$) is lower than in 80% (v/v) aqueous ethanol (15.8 $MPa^{1/2}$). Thus, a fraction of thymol would remain dissolved in the ethanol-rich surface and evaporated with the solvent, causing encapsulation loss. However, the fraction of thymol that entrapped below the water-rich layer would tend to be trapped in the core because of the presence water-rich barrier layer, due to the poor solubility of thymol in water (34.3 $MPa^{1/2}$). When the majority of ethanol and water was evaporated, both EC and PEO have lower $R_a$ values to thymol, i.e., higher affinity towards thymol, implying that the polymers are not a good barrier to thymol, in which case, the wall material would not encapsulate the thymol properly. However, the mobility of thymol in the polymer matrices, under dry condition, was limited because EC was in glassy state ($T_g$ value for EC is ~130° C.), effectively entrapping the thymol within the fiber matrices. As the nonwovens were exposed to elevated RH, substantial plasticization of the fibers occurred, as illustrated by the micrographs from SEM analysis, thereby facilitating the diffusion of thymol through the fibers and releasing into the air. As moisture sorption progressed, water molecules are expected to displace thymol molecules from the EC-PEO nonwovens. Since EC (5.9 $MPa^{1/2}$) has higher affinity to thymol than PEO (9.6 $MPa^{1/2}$), the thymol that bond to PEO may be displaced first by water molecules and then followed by EC. However, hydrophobic interaction between EC and thymol may prevent the latter from being displaced by water. This reasoning may explain why only 50% (w/w) of thymol was released at 93% RH environment.

Cellulose acetate is an acetyl ester cellulose that has a wide application in industries for the manufacturing of fibers, coating, and membrane. It is synthesized from acid-catalyzed esterification of cellulose with acid anhydride, and then partial hydrolysis to achieve different DS. Cellulose acetate is insoluble in water but soluble in a variety of organic solvents, such as acetone, acetic acid, dioxane, and DMAc.

Carvacrol (5-isopropyl-2-methylphenol) is a phenolic monoterpenoid. It is an approved food additive with a GRAS status. Carvacrol is an effective antimicrobial against several spoilage microorganisms, such as P. fluorescens, E. amylovora, and C. albicans. In addition, previous studies have shown that carvacrol vapor not only was effective in preventing table grapes decay by controlling the growth of B. cinerea that causes grey mold, but also had an effect on reducing ethylene production and lowering respiration rate.

Carvacrol has a low solubility in water. As a result, treating food products with carvacrol vapor would be more efficient than directly incorporating the antimicrobial into the products, especially those with relatively high moisture content. Moreover, the use of carvacrol vapor would likely result in more even exposure of carvacrol to microorganisms on food surface, where microbial contamination tends to occur, and therefore reducing the required dosage. However, carvacrol has a limited volatility. For comparisons, at 25° C., the vapor pressures of carvacrol and water are 0.0087 and 3.1579 kPa, respectively. The slow buildup of concentration in the packaging headspace may not reach a level adequate to inhibit the microorganisms.

As provided herein, electrospun cellulose acetate-PEO nonwoven was used as a carrier to encapsulate and control the release of carvacrol using free surface electrospinning method under different RH conditions. Acetic acid:acetone solvent mixture and PEO were adjusted to tweak the characteristics of the resulting electrospun fibers.

Figure 36:
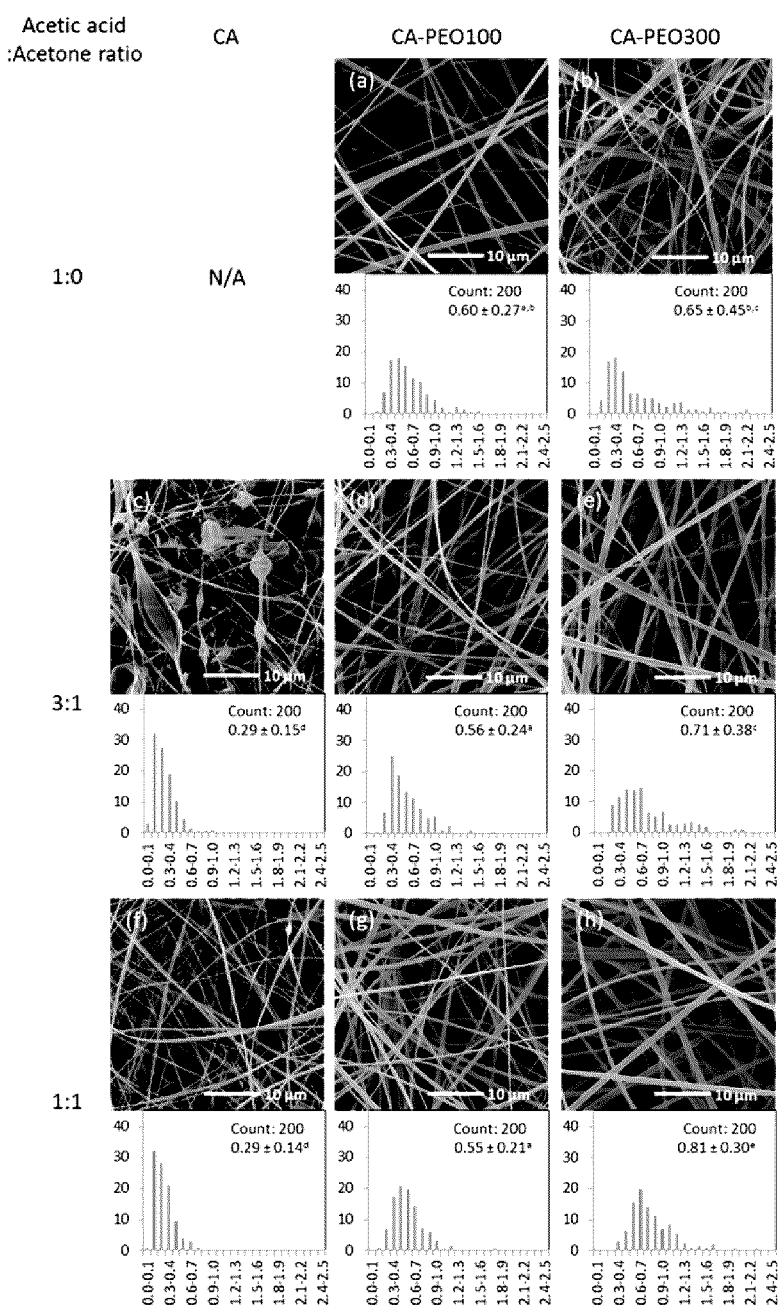
FIG. 36 illustrates scanning electron micrographs of cellulose acetate (CA) and cellulose acetate-PEO nonwovens electrospun from solution prepared in acetic acid:acetone mixture blended in 1:0, 3:1 and 1:1 weight ratios respectively, wherein the histograms show the distribution of fibers (y-axis; frequency (%)) in different diameter intervals (x-axis; µm), and fiber diameter values are means±standard deviations, and means with different superscript letters indicate statistical significant difference ($p<0.05$).

FIG. 36 summarizes the SEM images of cellulose acetate and cellulose acetate-PEO nonwovens electrospun from solutions prepared in 1:0, 3:1, and 1:1 acetic acid:acetone solvents. Cellulose acetate solution prepared in glacial acetic acid (cellulose acetate-acetic acid solution) alone could not be electrospun, i.e., few jetting was observed on the wire electrode. However, blending acetic acid with acetone did enhance the electrospinnability of the spin dope. As shown in FIG. 36(c), spin dope prepared using 3:1 acetic acid:acetone solvent resulted in ultrathin fibers (0.29±0.15 µm) with beads. As acetic acid:acetone ratio decreased to 1:1, bead-free fibers were generated with similar average diameters (0.29 µm±0.14 µm) as fibers prepared from 3:1 acetic acid:acetone solvent, although more uniform in fiber size distribution was observed in the former (FIG. 36(f)). Similarly, overall improved in thickness uniformity was observed as the acetone content increased for cellulose acetate-PEO100 (FIGS. 36(a), (d) and (g)) and CA-PEO300 (FIGS. 36(b), (e) and (h)).

The effect of PEO on fiber morphology is also evident in FIG. 36. The addition of PEO (100 or 300 kDa) enabled the electrospinning of cellulose acetate dissolved in glacial acetic acid alone, which can be attributed to the increase in the elasticity of the spin dope. Moreover, increasing PEO molecular weight from 100 to 300 kDa increased the overall fiber diameter but decreased fiber uniformity.

HSP value was calculated to elucidate the affinity of cellulose acetate and PEO to the different solvents tested (Table 14). The $R_a$ values of cellulose acetate to acetic acid and acetone solvents are 2.7 and 5.4 $MPa^{1/2}$, respectively, implying that cellulose acetate is thermodynamically more compatible to acetic acid than acetone. On the contrary, PEO has a higher $R_a$ value with acetic acid (10.1 $MPa^{1/2}$) than acetone (3.6 $MPa^{1/2}$), indicating that PEO has a higher affinity with the latter. Therefore, in theory, by adjusting the solubility of cellulose acetate and PEO in the blend solvent through changing acetic acid and acetone ratio, the characteristics of electrospun cellulose acetate and cellulose acetate-PEO fibers can be manipulated. The observed electrospinning behaviors of cellulose acetate and cellulose acetate-PEO fibers can be explained on the basis of polymer-solvent and polymer-polymer compatibilities, as well as the properties of the solvents and spin dopes, as discussed below.

TABLE 14

HSP and Ra values of acetic acid:acetone solvents and cellulose acetate (CA) and poly(ethylene oxide) (PEO)

| HSP Values | Acetic acid:Acetone | | | | Polymer | |
|---|---|---|---|---|---|---|
| $(MPa^{1/2})$ | 1:0 | 3:1 | 1:1 | 0:1 | CA | PEO |
| $\delta_D$ | 14.5[a] | 14.8 | 15.1 | 15.5[a] | 17.0[a] | 14.9[a] |
| $\delta_P$ | 8.0[a] | 8.7 | 9.4 | 10.4[a] | 10.0[a] | 7.1[a] |

TABLE 14-continued

HSP and Ra values of acetic acid:acetone solvents and cellulose acetate (CA) and poly(ethylene oxide) (PEO)

| HSP Values | Acetic acid:Acetone | | | | Polymer | |
|---|---|---|---|---|---|---|
| $(MPa^{1/2})$ | 1:0 | 3:1 | 1:1 | 0:1 | CA | PEO |
| $\delta_H$ | 13.5[a] | 11.5 | 9.8 | 7.0[a] | 5.0[a] | 11.1[a] |
| $R_a$ (CA) | 2.7 | 1.7 | 2.6 | 5.4 | — | 8.0 |
| $R_a$ (PEO) | 10.1 | 7.9 | 6.2 | 3.6 | 8.0 | — |
| $R_a$ (Carvacrol) | 10.0 | 9.4 | 9.3 | 9.9 | 8.6 | 8.9 |

[a]Values were obtained from Hansen (2007, Hansen solubility parameters: a user's handbook, CRC press).

The vapor pressure of acetone is considerably higher than acetic acid (Table 15), implying that the former is more volatile. Therefore, during the electrospinning process, acetone would evaporate from the polymer jet surface more rapidly than acetic acid. From HSP analysis above (Table 15), because PEO has a greater affinity to acetone than cellulose acetate, PEO would have a tendency to migrate to the surface with acetone while cellulose acetate would tend to partition towards the core, forming cellulose acetate core and PEO shell structure.

TABLE 15

Vapor pressure and dielectric constant values of solvents at 20° C.

| Acetic acid:Acetone | Vapor Pressure (kPa) | Dielectric Constant |
|---|---|---|
| 1:0 | 1.7[a] | 6.2[a] |
| 3:1 | 8.2 | 10.8 |
| 1:1 | 14.6 | 14.7 |
| 1:3 | 20.9 | 18.0 |
| 0:1 | 27.0[a] | 21.0[a] |

[a]Values were obtained from Dean (1999, Lange's handbook of chemistry. New York: McGraw-Hill)

To prevent fusion of wet fibers, the majority of solvent must be evaporated as the polymer jets are being drawn towards the target. However, the use of solvent with high vapor pressure and low boiling point should be avoided as rapid solidification of polymer on the wire electrode would prevent jetting. Spin dopes prepared in pure acetone and 1:3 acetic acid:acetone blend were not electrospinnable due to the high vapor pressure of solvents (27.0 and 20.9 kPa respectively at 22° C.) (Table 15). The rapid evaporation of solvent caused the solidification of polymer on the wire electrode, hindering the jetting process. Since acetic acid has a lower vapor pressure (1.7 kPa at 22° C.) compared to acetone, the blend of acetic acid with acetone suppressed the vapor pressure of the solvent mixture down to 14.6 (1:1 acetic acid:acetone) and 8.2 kPa (3:1 acetic acid:acetone) at 22° C., respectively, allowing the electrospinning of cellulose acetate. As shown in FIGS. 5.1b, e and h, the diameter of electrospun cellulose acetate-PEO300 fibers decreased from 0.810 to 0.654 µm as the acetic acid content increased in the solvents, from 1:1 to 1:0 acetic acid:acetone blend ratios. The decrease in vapor pressure as acetic acid content increased slowed down the solvent vaporization and polymer solidification, enhancing the stretching of polymer jets during electrospinning process and therefore generating thinner fibers.

Figure 37:
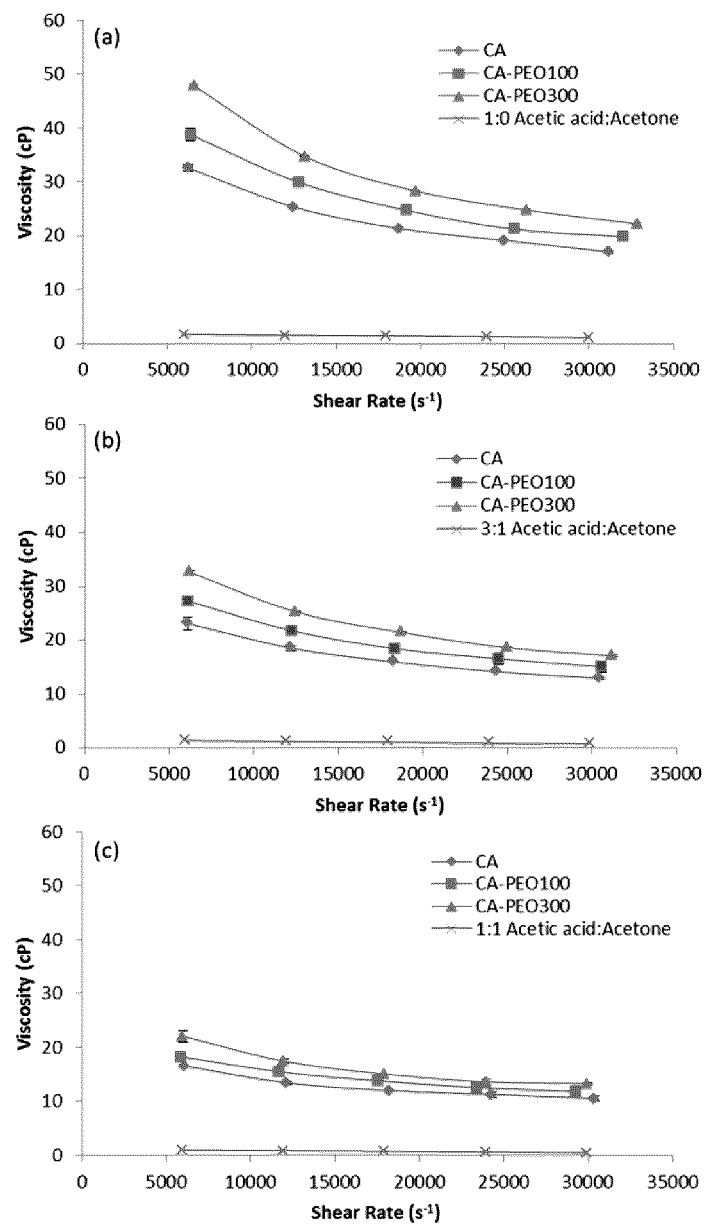
FIG. 37 illustrates a viscosity values of cellulose acetate (CA) and CA-PEO solutions in different solvents as a function of shear rate: (a) 1:0 acetic acid:acetone; (b) 3:1 acetic acid:acetone; and (c) 1:1 acetic acid:acetone.

The viscosity values of the polymer solutions, along with the solvents, are summarized in FIG. 37, showing that there is an overall decrease in viscosity in the spin dopes as the acetic acid content decreased. In comparison, since the extent of viscosity decrease for the solvent was substantially lower in magnitude as the acetic acid content decreased, the changes in viscosity observed in the spin dopes therefore cannot be solely attributed to the rheology of the solvent, but rather the polymer-solvent affinity. Since cellulose acetate is thermodynamically more miscible with acetic acid than acetone, the polymer tend to adopt more extended chain structure and exhibit greater chain entanglement when dissolved in acetic acid than in acetic acid:acetone mixtures, leading to higher viscosity than in acetic acid:acetone blend solvents. Besides solvent mixture ratios, blending cellulose acetate with PEO also increased the viscosity of spin dope. Not surprisingly, the viscosity of the spin dope increased further as PEO molecular weight increased from 100 to 300 kDa due to enhanced chain entanglement. The resulting increase in viscoelasticity of the polymer jets reduced the extent of stretching, producing thicker fibers as shown in FIG. 36.

All the polymer solutions have n value less than 1, implying that they all exhibit Non-Newtonian shear-thinning behavior (Table 15). Increasing acetic acid content in the solvent resulted in a decrease in n value for both cellulose acetate and cellulose acetate-PEO spin dopes, showing that the polymer solutions prepared in acetic acid solvent are more sensitivity to shear as compared with solutions prepared in the acetic acid:acetone binary solvents. This phenomenon can be explained on the basis of HSP values. Due to higher affinity of cellulose acetate to acetic acid than acetone, the polymer-solvent interactions between cellulose acetate and acetic acid is expected to be stronger than cellulose acetate and acetone, resulting in weaker polymer-polymer interactions in the cellulose acetate-acetic acid solutions. Therefore, the polymer solution may become more sensitive to shear as acetic acid content increased. The incorporation of PEO into cellulose acetate resulted in a decrease in n value, which further decreased as PEO molecular weight increased from 100 to 300 kDa. This result implies that cellulose acetate-PEO solutions exhibited more shear thinning behavior and greater viscosity drop as shear rate increased compared with cellulose acetate solutions. This shear-sensitive behavior may be caused by the weak cellulose acetate-PEO chain-chain interactions, as revealed by ATR-FTIR analysis discussed above.

TABLE 15

Flow behavior index of cellulose acetate (CA) and poly(ethylene oxide) (PEO) blend solutions at 22 ± 2° C.

| Acetic acid:Acetone | Polymers | Flow Behavior Index n |
|---|---|---|
| 1:0 | CA | 0.605 ± 0.010 |
| | CA-PEO100 | 0.572 ± 0.005 |
| | CA-PEO300 | 0.521 ± 0.001 |
| 3:1 | CA | 0.639 ± 0.001 |
| | CA-PEO100 | 0.632 ± 0.002 |
| | CA-PEO300 | 0.595 ± 0.001 |
| 1:1 | CA | 0.718 ± 0.024 |
| | CA-PEO100 | 0.725 ± 0.024 |
| | CA-PEO300 | 0.673 ± 0.030 |

Figure 38:
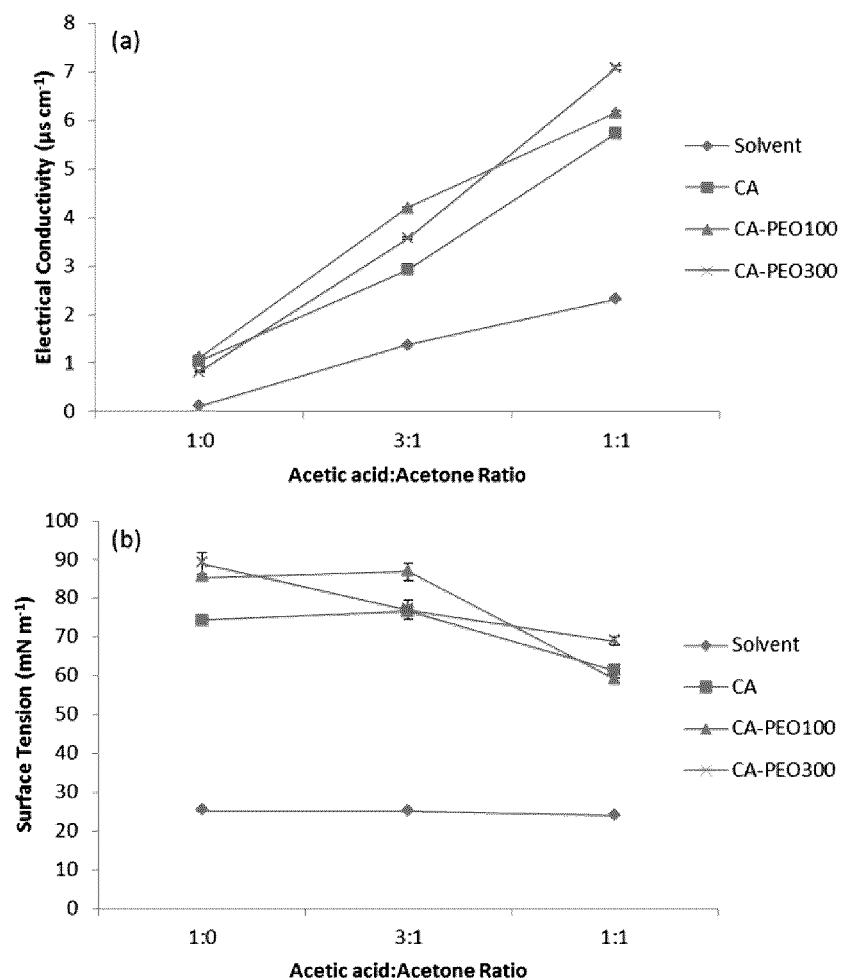
FIG. 38 illustrates the electrical conductivity (a) and surface tension (b) values of cellulose acetate (CA) and CA-PEO solutions prepared in different solvents.

The electrical conductivity of both polymer solutions and solvents increased as the acetone content increased (FIG. 38($a$)), consistent with the fact that acetone has a higher electrical conductivity (0.06 µs cm$^{-1}$ at 25° C.) than acetic acid (0.01 µs cm$^{-1}$ at 25° C.). Increase in electrical conductivity would facilitate the charges transfer to the surface of the spin dope to initiate jetting. However, increasing electrical conductivity would also weaken the Coulombic force acting on the polymer that is responsible for bending instability, which stretches the fibers, due to the movement of excess charge on the jet surface. The reduction in the pulling of the jets tends to result in thicker fibers. The increase in electrical conductivity from 0.81 to 7.08 µs cm$^{-1}$ resulted in an increase in fiber diameter from 0.65 to 0.81 µm (FIGS. 39($b$), ($e$) and ($h$)) for CA-PEO300 fibers. This trend was not observed for CA-PEO100 probably due to the lower viscoelastic properties as compared to CA-PEO300.

The dielectric constant reflects the ability of a medium to store electric energy (i.e., ability to hold charges) and thus, a solvent with high dielectric constant may improve the electrospinnability of spin dope and generate thin fibers. Acetic acid has a low dielectric constant of 6.2 (20° C.), while acetone has a higher dielectric constant of 21.0 (20° C.) (Table 15). The low dielectric constant of acetic acid indicates that the ability of acetic acid to hold electric energy is low, resulting in the leakage of charges. This phenomenon may explain why no fibers was generated from cellulose acetate-acetic acid solution even though cellulose acetate is compatible with acetic acid based on HSP value and a clear and transparent polymer solution was formed during sample preparation. The leakage on charges caused the jets vibrating vigorously, hindering continuous fiber formation. The addition of acetone to acetic acid, at 3:1 acetic acid:acetone blend ratio, increased the dielectric constant of the resulting solvent to 10.8 (Table 15), which might have enhanced the electrospinnability of cellulose acetate solutions and allowed the generation of ultrafine fibers with beads. As acetic acid:acetone ratio further decreased to 1:1, the dielectric constant of solvent mixture increased to 14.7 and the fiber morphology became smooth and uniform. Adding dioxane (dielectric constant of 2.2) to DMF (dielectric constant of 38.3) decreased the dielectric constant of solvent mixture and reduced electrical stretching force, leading to increased cellulose acetate fiber diameter.

The electrostatic force established on the spin dope surface must overcome the surface tension in order to initiate the jetting phenomenon, as well as to prevent the formation of beads. Therefore, low surface tension is favorable in electrospinning process. FIG. 38($b$) shows that the surface tension of solvents did not change significantly, while the surface tension of polymer solutions decreased as the acetone content increased. Since cellulose acetate is thermodynamically more compatible with acetic acid than acetone, the polymer chains may exhibit a more opened morphology, adsorb and entangle at the bubble surface in acetic acid than acetic acid:acetone mixture. This phenomenon would strengthen bubble surface, resulting in higher surface tension for polymer solutions prepared in pure acetic acid than acetic acid:acetone mixture. The increase in surface tension as acetic acid content increased from 50% to 75% (w/w) may explain why smooth cellulose acetate fibers were generated from solution prepared in 1:1 acetic acid:acetone solvent, while beads were observed in cellulose acetate fibers electrospun from solution prepared in 3:1 acetic acid:acetone solvent.

Figure 39:
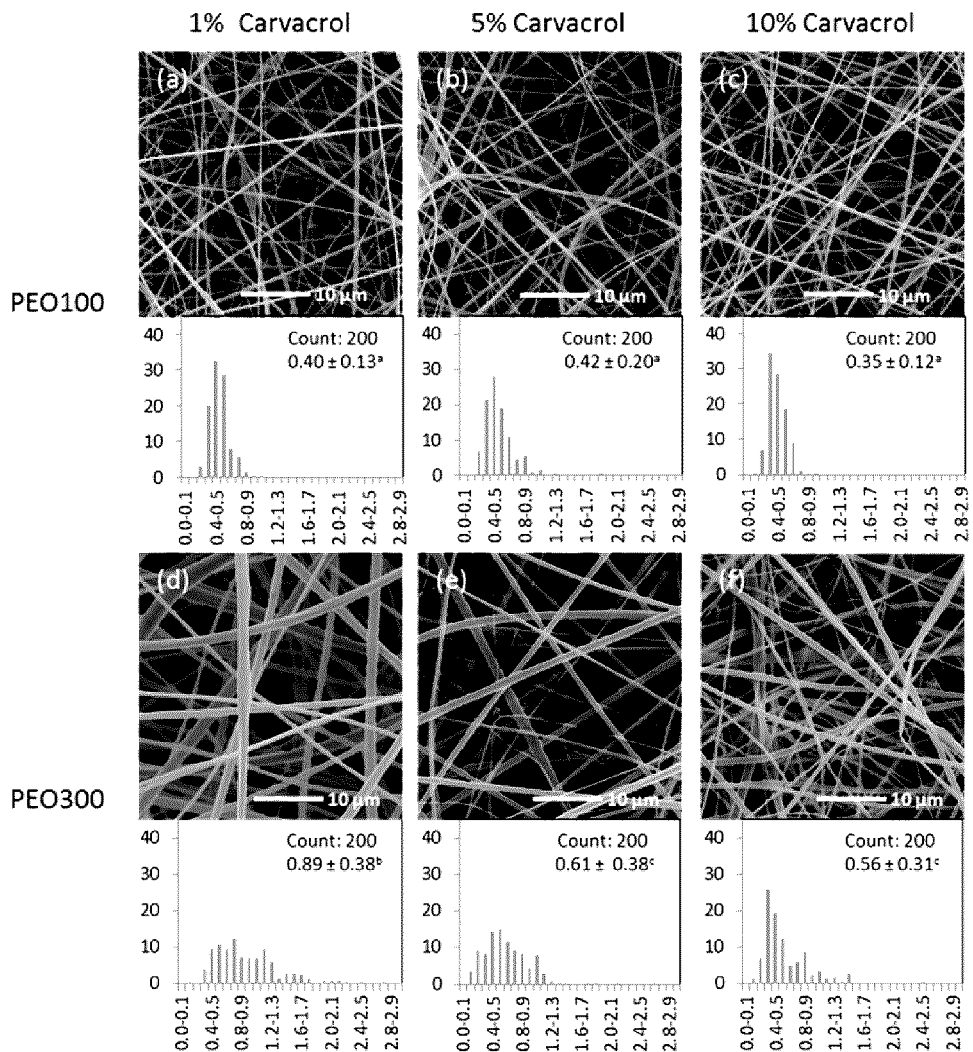
FIG. 39 illustrates scanning electron micrographs of cellulose acetate (CA)-PEO nonwovens electrospun from spin dopes with 1, 5, and 10% (w/w) carvacrol loadings respectively, wherein the histograms show the distribution of fiber (y-axis; frequency (%)) in different diameter intervals (x-axis; µm), fiber diameter values are means±standard deviations, and means with different superscript letters indicate statistical significant difference ($p<0.05$).

FIG. 39 shows the morphology of CA-PEO100 and CA-PEO300 fibers electrospun from dopes with different carvacrol loadings (1, 5, and 10% (w/w) respectively). The diameters decreased from 0.40 to 0.35 µm for CA-PEO100 fibers and from 0.89 to 0.56 µm for CA-PEO300 fibers as carvacrol loading in spin dope increased from 1 to 10% (w/w). Due to the low vapor pressure of carvacrol (0.0042 kPa at 22° C.), the incorporation of carvacrol into spin dope suppressed the vapor pressure of solvent mixture and slowed down the solvent evaporation and polymer solidification rate, leading to increased stretching of polymer jets and producing thinner fibers.

Figure 40:
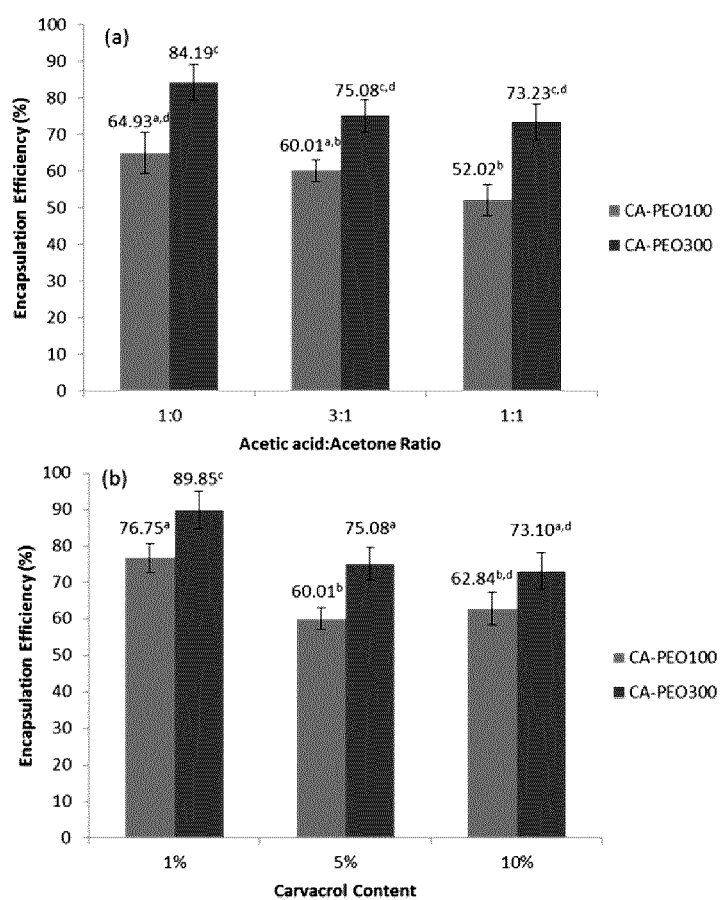
FIG. 40 illustrates EE values of carvacrol-incorporated cellulose acetate (CA)-PEO nonwovens electrospun from (a) spin dopes prepared in different solvents with 5% (w/w) carvacrol loading and (b) spin dopes prepared in 3:1 acetic acid:acetone solvent mixture with different carvacrol loadings, wherein means with different superscript letters indicate statistical significant difference ($p<0.05$) in each figure.

The EE of carvacrol-incorporated electrospun CA-PEO nonwovens decreased as the acetone content increased (FIG. 40a), which could be explained by HSP values. As the acetic acid:acetone mixture ratio changed from 1:0 to 1:1, the $R_a$ value of carvacrol to solvents decreased from 10.0 to 9.3 MPa$^{1/2}$, indicating increased affinity between carvacrol and solvents. Therefore, increased degree of carvacrol loss during electrospinning process when solvent evaporated is expected as acetone content increased, leading to decreased EE of electrospun nonwovens. However, since the $R_a$ values of carvacrol to cellulose acetate and PEO are 8.6 and 8.9 MPa$^{1/2}$ respectively, which are lower than the $R_a$ values of cellulose acetate to solvents, the majority of carvacrol tended to be entrapped within the cellulose acetate-PEO matrix, rather than partitioning into the solvent. FIG. 40(b) summarizes the EE of electrospun cellulose acetate-PEO nonwovens as affected by carvacrol loading in spin dope. The increase of carvacrol content in spin dope from 1% to 10% (w/w) resulted in the decrease in EE of cellulose acetate-PEO nonwovens, which can be attributed to the decreased availability of polymers to encapsulate the loaded carvacrol.

Figure 41:
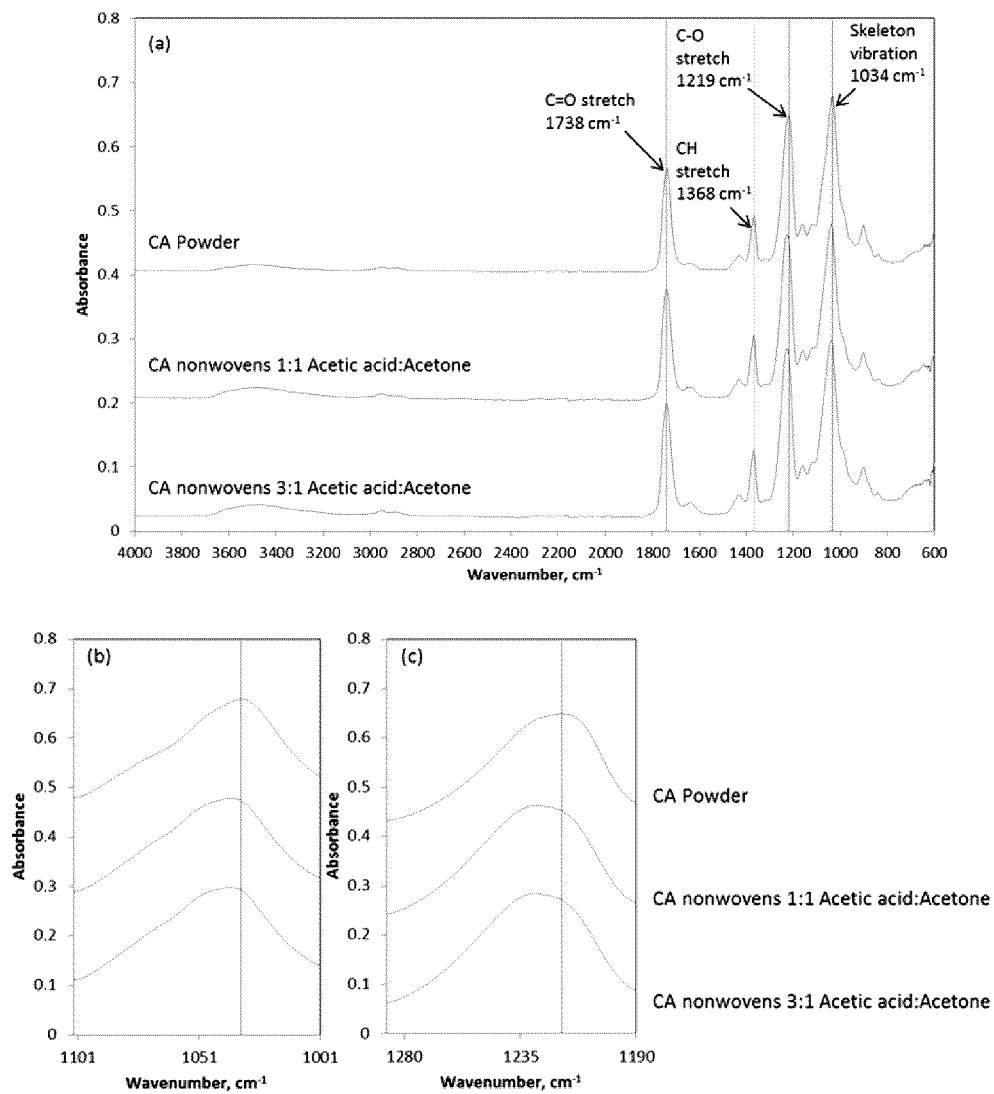
FIG. 41 illustrates ATR-FTIR spectra for electrospun cellulose acetate (CA) nonwovens: (a) full spectra for CA powder and CA nonwovens; (b) spectra near C—O stretch regions; and (c) spectra near skeleton vibration regions.

FIG. 41(a) shows the ATR-FTIR spectra of cellulose acetate powder and cellulose acetate nonwovens electrospun from solutions prepared in 1:1 and 3:1 acetic acid:acetone solvents. The characteristic peaks of cellulose acetate powder were located at around 1738, 1368, 1219, and 1034 cm$^{-1}$, which are attributed to C═O ester stretching, C—H stretching in —OOC—CH$_3$, C—O stretching of acetyl group, and skeletal vibration of C—O—C pyranose ring respectively. The electrospinning process affected the molecular structure of cellulose acetate and resulted in the skeleton vibration shifts from 1034 to 1038 cm$^{-1}$ and C—O stretch shifts from 1219 to 1229 cm$^{-1}$ (FIGS. 41(b) and (c)). There was no significant peak shift observed comparing cellulose acetate nonwovens spun from solutions prepared in different solvents, indicating that the modification on acetic acid:acetone ratio had little or no effect on the structure of cellulose acetate.

Figure 42:
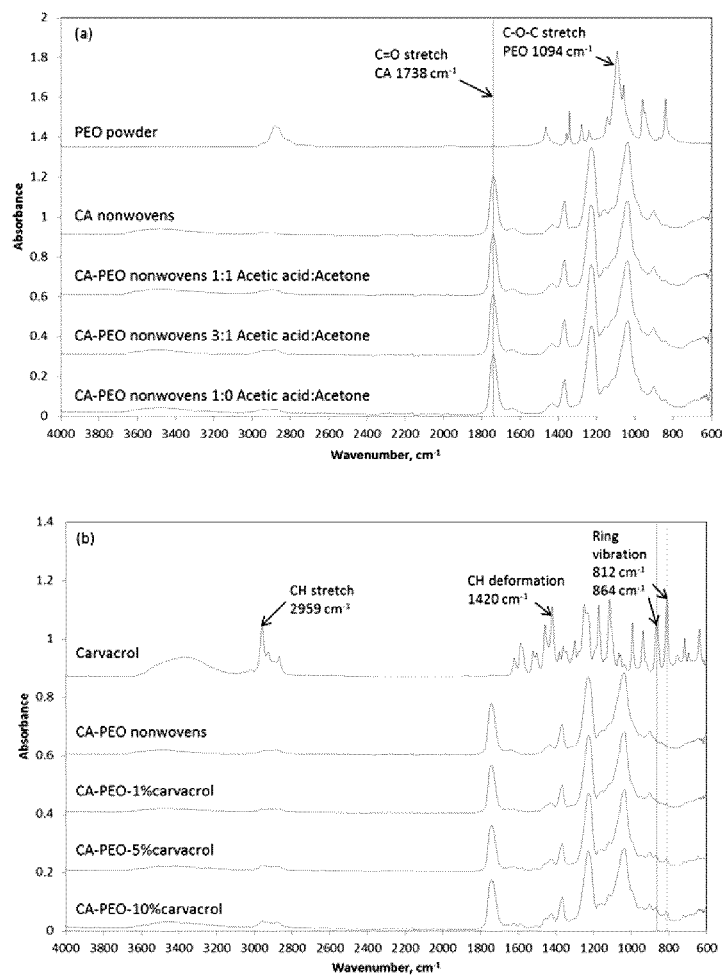
FIG. 42 illustrates ATR-FTIR spectra for electrospun cellulose acetate (CA)-PEO nonwovens with or without the incorporation of carvacrol: (a) full spectra for PEO powder, electrospun CA and CA-PEO nonwovens; and (b) full spectra for carvacrol and CA-PEO nonwovens electrospun from spin dopes with different carvacrol loadings.

FIG. 42(a) summarizes the ATR-FTIR spectra of PEO powder, cellulose acetate nonwovens, and cellulose acetate-PEO nonwovens. PEO has a characteristic peak located at 1094 cm$^{-1}$, which is attributed to C—O—C stretching. The spectra of cellulose acetate-PEO electrospun from solution prepared in different solvents all show a summation of characteristic peaks of cellulose acetate and PEO and no significant peak shift was observed, implying that ATR-FTIR analysis did not reveal any interactions between cellulose acetate and PEO. The weak or absence of interactions between PEO and cellulose acetate may be caused by the replacement of hydroxyl group by acetate on cellulose acetate, which may have hindered the formation of intermolecular hydrogen bonds between cellulose acetate and PEO. Taken these results altogether, phase separation between the two polymers might have occurred during the electrospinning process as the solvent was evaporated.

Carvacrol shows characteristic peaks at 2959, 1420, 864 and 812 cm$^{-1}$ (FIG. 42(b)), which are assigned to CH stretching, CH deformation and ring vibration respectively. The spectra of carvacrol-incorporated cellulose acetate-PEO electrospun nonwovens show a summation of characteristic peaks of cellulose acetate-PEO nonwovens and carvacrol. The appearance of peaks at 812 and 864 cm$^{-1}$ in the spectra of carvacrol-incorporated cellulose acetate-PEO nonwovens indicates the presence of carvacrol in the nonwovens. However, no significant peak shift was observed when comparing cellulose acetate-PEO with carvacrol-incorporated cellulose acetate-PEO nonwovens. Therefore, ATR-FTIR analysis did not disclose any interactions between carvacrol and cellulose acetate-PEO nonwovens.

Figure 43:
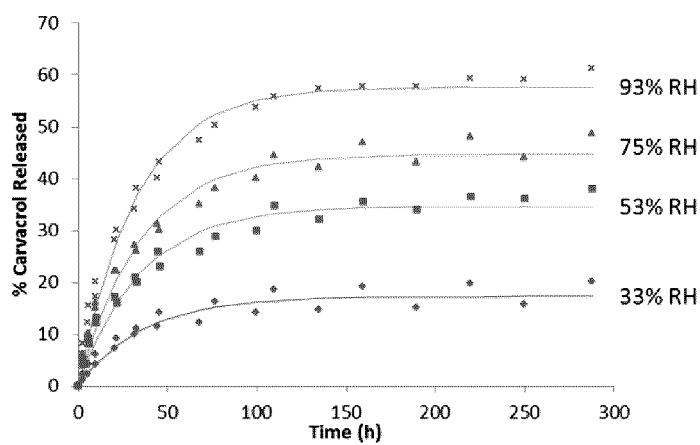
FIG. 43 illustrates the release profiles of carvacrol from cellulose acetate (CA)-PEO nonwovens at different RH conditions (33, 53, 75, and 93% RH) at 25° C. for 12 days.

Because spin dope that prepared in 3:1 acetic acid:acetone solvent demonstrates more stable and continuous electrospinning behavior than dope prepared in pure acetic acid and the EE of resulting carvacrol-incorporated nonwovens is higher than nonwovens spun from solutions prepared in 1:1 acetic acid:acetone, CA-PEO100 nonwovens electrospun from spin dopes containing 5% (w/w) carvacrol in 3:1 acetic acid:acetone solvent were used for the release study. FIG. 43 summarizes the release behavior of carvacrol from electrospun cellulose acetate-PEO nonwovens at different RH conditions (33, 53, 75, and 93% RH) at 25° C. up to 12 days. Corresponding release rate and equilibrium concentrations data are presented in Table 17. As shown, the release rate of carvacrol increased from 0.0278±0.0011 to 0.0309±0.0003 h$^{-1}$ and equilibrium concentration increased from 17.30±0.24 to 57.75±0.20% (w/w) as RH increased from 33 to 93%. The RH-activated release behavior can be attributed to the moisture absorbed by cellulose acetate that plasticizes the fibers, increasing the polymer chain mobility and enhancing the diffusion of carvacrol in the fiber matrices. Moreover, the incorporation of hydrophilic PEO into a relatively more hydrophobic cellulose acetate further enhanced the moisture uptake.

TABLE 17

Averaged values of $C_e$ and k estimated from Solver function.

| RH | $C_e$ (%) | k (h$^{-1}$) |
|---|---|---|
| 33% | 17.30 ± 0.24 | 0.0278 ± 0.0011 |
| 53% | 34.72 ± 0.20 | 0.0289 ± 0.0005 |
| 75% | 44.78 ± 0.34 | 0.0290 ± 0.0005 |
| 93% | 57.75 ± 0.20 | 0.0309 ± 0.0003 |

FIG. 43 shows that the maximal amount of carvacrol released from the cellulose acetate-PEO nonwovens increased with increasing RH. This observation suggests that the release of carvacrol was not strictly controlled by diffusion, in which case, the maximal amounts of carvacrol release under different RH conditions should converge to a similar value. Rather, the sorption of moisture is required to displace the carvacrol molecules from the fiber carrier, triggering their release. On the basis that peak shift was not detected on the ATR-FTIR spectra, the interactions between carvacrol and the polymers were more attributable to physical entrapment than chemo-adsorption.

Example I

Controlled Release of AITC and Diacetyl Vapors from PEG Blends

PEG with a molecular weight of ~400 Da (PEG400, Carbowax®) was purchased from Fisher Scientific Company (Ottawa, ON, Canada). PEG of ~10,000 Da (PEG10K), AITC (≥93%) and diacetyl (≥97%) were all purchased from Sigma-Aldrich (Oakville, ON, Canada).

PEG400 and PEG10K were blended at 1:4, 2:3, 3:2 and 4:1 (w/w) ratios. All PEG blends (20±1 g) were heated to 90° C. in a 20 mL glass vial for 20 min to ensure the polymers were melted and thoroughly mixed with the aid of a magnetic stir bar. Diacetyl and AITC, pre-mixed at 10 to 1 (w/w) ratio, were added to molten PEG blends at 1% (w/w) of the PEG blend. The vials were capped, kept in a 75° C. oven and continuously being stirred with the magnetic stir bar for 15 min. The molten mixtures were injected into a mould fabricated from glass (2 cm×1.5 cm×0.1 cm) and allowed to set. One face of the mould was lined with aluminum tape (adhesive side facing away from PEG), which acted as a baking material for the solidified PEG. Upon solidification, diacetyl/AITC impregnated PEG sheeting was formed.

The release properties of diacetyl and AITC vapours from the PEG matrices were studied by using an automatic headspace sampling system accordingly to Vega-Lugo & Lim (2009, Food Research International, 42: 933-940) and Dai & Lim (2015, Food Research International, 77: 467-475). Briefly, the diacetyl/AITC impregnated PEG samples were enclosed in hermetically sealed glass jars (965 mL) and maintained at 25° C. or 5° C. in environmental chambers (Model MLR-350H, Sanyo Corp., Japan). With the aid of a controller (SRI Instruments Inc., Las Vegas, Nev., USA), the headspace air in the glass jar was sampled automatically by means of a vacuum pump and two stream selection valves (Model EMTCA-CE, VICI Valco Instruments Co. Inc., Houston, Texax, USA), and injected into a gas chromatograph equipped with flame ionization detector (GC 6890, Agilent Technologies Inc., Santa Clara, Calif., USA.). Both the detector and oven temperatures were set at 150° C. The flow rates of the carrier gas ($N_2$), compressed air and hydrogen were 30 mL/min, 200 mL/min and 30 mL/min, respectively. Retention time and peak area were analyzed by using chromatographic software (Peak Simple 393-32 bit, SRI Instruments, Torrance, Calif., USA). After each sampling, an equal amount of dry air was injected back into the jar to maintain the interior pressure at one atmosphere. Calibration of the flame ionization detector was performed by injecting diacetyl and AITC standard into the jar to provide headspace concentration ranging from 0.1 to 5.0 mg/L.

The quantities of diacetyl and AITC released into the headspace of a jar were calculated by adding the recorded mass at any given sampling point to the accumulated mass released up to the previous sampling point (Eq. 1):

$$M_n = C_n V_b + \Sigma_{i=1}^{n-1}(C_i V_e) \qquad (Eq.\ 1)$$

where $M_n$ (mg) is the total amount of diacetyl or AITC released for the present sampling, $C_n$ (mg/L) is the diacetyl or AITC concentration for the present sampling, $C_t$ (mg/L) is the diacetyl or AITC concentration at sampling time i, $V_e$ (mL) is the volume extracted during sampling, $V_b$ (mL) is the volume of the bottle. Diacetyl or AITC release profiles were generated by plotting $M_n$ versus time.

The thermal properties of PEG blends with and without antimicrobial compounds were studied using a differential scanning calorimeter (DSC Q2000, TA Inc. New Castle, Del., USA). The PEG samples prepared were transferred into alod-aluminum pans, weighed accurately to 10±1 mg, and sealed with lids. The pans were purged with dry nitrogen at a flow rate of 18 mL/min. Specimens were heated to 90° C. at a heating rate of 10° C./min, equilibrated for 3 minutes, and then cooled down to 25° C. at a cooling rate of 10° C./min. Indium was used for calibration. Both melting and crystallization data were collected and were analyzed using TA Universal Analysis software (TA Inc. New Castle, Del., USA).

Microstructures of the PEG blends were examined using a light microscope (BX60, Olympus America Inc., Center Valley, Pa., USA). The PEG blends were melted and applied on glass slides, and allowed to cool down to room temperature before observing under the microscope. The average sizes of the crystals (n=40) were analyzed by measuring the distance between two nearby crystal cores, using an ImagePro Plus 6.0 software package (Media Cybernetics Inc., Rockville, Md., USA).

Scanning electron microscopy (SEM) (Model S-570, Hitachi High Technologies Corp., Tokyo, Japan) was used to further observe the grain boundaries between PEG crystals. Diacetyl/AITC impregnated PEG sheeting was bent to break and the cross section of the sample were attached on metal stubs with double-adhesive carbon tape and coated with an ultrathin (20 nm) layer of gold using a sputter coater (Model K550, Emitech, Ashford, Kent, UK). An accelerating voltage of 10 kV was applied during the analysis.

Water sorption capacity of PEG blends was evaluated gravimetrically. A thin layer of molten PEG blend (0.5±0.1 g) was applied onto the bottom of a small beaker (diameter of 2.1 cm) and allowed to cool down to room temperature. The beaker was allowed to equilibrate in a sealed 250 mL glass jar containing an excess amount of water (>10 mL). The weight change of the small beaker was monitored periodically for 7 days.

The antimicrobial activity of the PEG blends was evaluated on two spoilage microorganisms, *Pseudomonas fluorescens* P33 purchased from ATCC, and *Pythium aphanidermatum* isolated from mung bean sprout. *P. fluorescens* stock was cultivated in trypticase soy broth (TSB) at 30° C. for 24 h and diluted with sterile saline solution (NaCl, 8.5 g/L water) to $10^6$ CFU/L. An aliquot of 50 μL of the prepared suspension was spread on trypticase soy agar (TSA) in 5 cm diameter petri dish (Fisher Scientific, Ottawa, ON, Canada). Mycelium of *P. aphanidermatum* was spot inoculated at the center of potato dextrose agar (PDA). The freshly prepared *P. fluorescens* and *P. aphanidermatum* petri dishes, with the lid removed, was placed in a one-liter glass jar. A piece of test PEG was placed in the middle of the jar and the jar was sealed immediately. The jar was incubated at 25° C. and the growth of the pathogens was monitored every 24 h for 4 days.

The degree of crystallinity ($X_c$) of PEG10K fraction is calculated by equation (Eq. 2):

$$X_c = \frac{\Delta H_m}{\omega \times \Delta H_m^c} \qquad (Eq.\ 2)$$

where $\Delta H_m^\circ$ is the heat of melting of 100% crystalline PEG, =188.4 J/g (Melnyk et al., 2015); $\Delta H_m$ is the heat of melting determined from DSC analysis for the PEG10K fraction; ω is the weight fraction of PEG10K in the blends.

The release profiles of the antimicrobial compounds were fitted in a model which combines first order kinetics and zero order kinetics:

$$C = C_e \times (1 - e^{-kt}) + \alpha t \qquad (Eq.\ 3)$$

where C is the compound concentration at time t; $C_e$ is the equilibrium concentration for diffusion; k is the diffusion rate constant; α is the rate of zero order kinetics. Models are fitted to the data before reaching the equilibrium.

Results were expressed as the mean values±standard deviations. Significant differences among treatment samples were analyzed with analysis of variance (one-way ANOVA with Tukey's post hoc test), using the statistical software R version 3.2.2. The probability of test statistic (p) was set at 0.05.

Example II

Encapsulation of Cinnamaldehyde by PLA-PEO Nonwoven

PLA (6201 D) was donated by NatureWorks LLC. (Minnetonka, Minn., USA). PEO (Mn~300k Da) and cinnamaldehyde (>99%) were purchased from Sigma Aldrich (Oakville, ON, Canada). Tetrahydrofuran (THF) was purchased from Fisher Scientific Company (Ottawa, ON, Canada).

PLA resins and PEO powder were dissolved in THF to make 9% (w/w) and 3% (w/w) stock solutions, respectively. All stock solutions were prepared with minimum headspace and stirred for 2 h at 65° C. using a magnetic stirrer. PLA and PEO stock solutions were blended in 10:0, 7:3, 5:5, 3:7 and 0:10 weight ratios (w/w), followed by the additional of CA at 33% (w/w) concentration. The solutions were stirred with magnetic stirrer for 10 min to ensure homogeneity. To evaluate the effect of CA loading, the concentration of CA in the 7:3 PLA:PEO solution was varied from 0, 20, 33 to 42% (w/w). All solutions were electrospun immediately after preparation.

The solutions prepared were electrospun using an inverted setup. Solutions were drawn into a 5 mL plastic syringe (Fisher Scientific, Ottawa, ON, Canada) and pumped at 17 mL/h via a piston assembled using a syringe pump (Orion M361, Thermo Scientific, Oakville, ON, Canada). An 18-gauge blunt tip stainless steel needle spinneret was attached to the syringe. The spinneret was connected to the positive electrode of a direct current power supply (DC model ES50P-50W/DAM, Gamma High Voltage, Ormond Beach, Fla., USA), operating at a constant voltage of 9 kV. An electrically grounded circular stainless steel collector plate, covered with a layer of smoothened aluminum foil, was positioned at 21 cm from the spinneret tip to collect the fiber. The electrospinning process was allowed to continue for 30 min to produce a nonwoven mat on the collector. Electrospinning was conducted in an environmental chamber (Model MLR-350H, Sanyo Corp., Japan) maintained at 25±0.5° C. and 20±1% RH.

The nonwovens samples (10±1 mg) were submerged in 3 mL methanol for 2 h at room temperature to extract CA from the fibers. The solution was diluted until the absorbance of the liquid falls in the range of 0.2-0.9. The absorbance of the liquid was measured using an Rvolution™ 60s UV-Visible spectrophotometer (Fisher Scientific, Ottawa, ON, Canada) at 285.5 nm. The amount of CA in the solution was determined from a calibration curve ($R^2$=0.98) prepared using standard solutions of known CA in methanol. The encapsulation efficiency (EE) was calculated using equation (Eq. 4):

$$EE\ (\%) = \left(\frac{W_c}{W_f}\right) / L \times 100\% \tag{Eq. 4}$$

where $W_c$ is the amount of CA in nonwoven samples, $W_f$ is the weight of the sample, L is theoretical loading of CA.

Microstructures of the nonwoven were evaluated using scanning electron microscopy (SEM) (Model S-570, Hitachi High Technologies Corp., Tokyo, Japan). Electrospun samples were attached on metal stubs with double-adhesive carbon tape and coated with an ultrathin (20 nm) layer of gold using a sputter coater (Model K550, Emitech, Ashford, Kent, UK). An accelerating voltage of 10 kV was applied during the analysis. Three points were randomly selected from each nonwoven sample for analysis. Fiber diameter was analyzed with image processing software (Image Pro-Plus 6.0, Media Cybernetics Inc., Bethesda, Md., USA).

Thermal properties of the nonwovens were analyzed by differential scanning calorimeter (DSC Q2000, TA Inc. New Castle, Del., USA). Samples (10±1 mg) were cut into small pieces and sealed in alodined-aluminum pans. Samples were heated from 10 to 210° C. with a ramp rate of 10° C./min, purged with dry nitrogen at a flow rate of 18 mL/min. Indium was used for calibration; data were analyzed using TA Universal Analysis software (TA Inc. New Castle, Del., USA). From the thermographs, melting temperature ($T_m$) and heat of fusion ($\Delta H$) were determined. $T_m$ and $\Delta H$ were average values of three determinations. The crystallinity ($X_c$) of PLA was calculated by equation (Eq. 5.):

$$X_c = \frac{\Delta H_m}{\omega \times \Delta H_m^0} \tag{Eq. 5}$$

where $\Delta H_m^0$ is the heat of melting of

100% crystalline PLA, $\Delta H_m^0 = 93.1\ J/g$;

$\Delta H_m$ is the heat of melting observed from the PLA fraction;

$\omega$ is weight fraction of PLA in the fibers, calculated by Eq. 6:

where $\Delta H_m^0$ is the heat of melting of 100% crystalline PLA, $\Delta H_m^0$=93.1 J/g; $\Delta H_m$ is the heat of melting observed from the PLA fraction; $\omega$ is the weight fraction of PLA in the fibers, calculated by Eq. 6:

$$\omega = \frac{0.09a}{0.09a + 0.03b + \frac{L\{a\mid b\}}{1-L} \times EE} \tag{Eq. 6}$$

where $a$ is the blend ratio of 9% PLA stock solution;

$b$ is the blend ratio of 3% PEO stock solution;

$L$ is the theoretical of CA;

$EE$ is the encapsulation efficiency at specific blend ratio.

where a is the blend ratio of 9% PLA stock solution; b is the blend ratio of 3% PEO stock solution; L is the theoretical loading of CA; EE is the encapsulation efficiency at specific blend ratio.

FTIR spectra of electrospun nonwoven samples were analyzed using a FTIR spectrometer (IRPrestige21, Shimadzu Corp., Kyoto, Japan), equipped with an ATR cell (Pike Technologies, Fitchburg, Wis., USA). Spectra were taken by averaging 40 scans for each sample at 4 cm$^{-1}$ resolution. Samples were pressed on the ATR sapphire crystal and scanned from 700 to 3900 cm$^{-1}$. Spectra were analyzed using IR solution software (Shimadzu Corp., Kyoto, Japan).

The release properties of CA were studied by using an automatic headspace sampling system previously described. Calibration of the flame ionization detector was performed by injecting CA standards into jars which pre-purged with nitrogen to provide headspace concentration ranging from 0.05 to 0.2 mg/L.

The quantities of CA released into the headspace of the jar were calculated by adding the recorded mass at any given sampling point to the accumulated mass released up to the previous sampling point (Eq. 7):

$$M_n = C_n V_b + \Sigma_{i=1}^{n-1}(C_i V_e) \quad \text{(Eq. 7)}$$

where $M_n$ (mg) is the total amount of CA released for the present sampling, $C_n$ (mg/L) is the CA concentration for the present sampling, $C_i$ (mg/L) is the CA concentration at sampling time i, $V_e$ (mL) is the volume extracted during sampling, $V_b$ (mL) is the volume of the bottle. The CA release profiles were generated by plotting $M_n$ versus time.

The antimicrobial activity of PLA-PEO-CA nonwoven was tested on two spoilage microorganisms, *P. fluorescens* and *P. aphanidermatum*. One of each freshly inoculated *P. fluorescens* and *P. aphanidermatum* petri dishes, with the lid removed, were placed in a one-liter glass jar. A piece of PLA-PEO-CA nonwoven or a certain amount of liquid CA was placed in the middle of the jar without touching the petri dishes and the lid was closed immediately. The jar was incubated at 25° C. The growth of the microorganisms was monitored every 24 h for 4 d.

Results were expressed as the mean values±standard deviations. Significant differences among treatment samples were analyzed with analysis of variance (one-way ANOVA with Tukey's post hoc test), using the statistical software R version 3.2.2. The probability of test statistic (p) was set at 0.05.

Example III

Antimicrobial Properties of AITC/Diacetyl in PEG Blend and Cinnamaldehyde in Electrospun PLA-PEO Nonwoven Carriers AITC (≥93%), diacetyl (≥97%) and cinnamaldehyde (>99%) were all purchased from Sigma-Aldrich (Oakville, ON, Canada). *Pseudomonas fluorescens* P33 was purchased from ATCC. Mould and yeast were isolated from mung bean sprouts cultivated in lab.

The inhibitory effects of AITC, diacetyl and cinnamaldehyde were tested against bacteria, mould and yeast. *P. fluorescens* was selected as a model spoilage bacteria, while mould and yeast were isolated from spoiled mung bean sprouts with bacteria excluded by cultivating in potato dextrose broth (PDB) (Sigma, Oakville, ON, Canada) at pH 5.6±0.2. Yeast and *P. fluorescens* stocks were cultivated in PDB and trypticase soy broth (TSB) (Bacto, BD, Sparks, USA), respectively, at 30° C. for 24 h and diluted with sterile saline solution (NaCl, 8.5 g/L water) to a concentration of $10^6$ CFU/mL. An aliquot of 50 μL of the prepared yeast or bacteria suspension was spread on potato dextrose agar (PDA) (Difco, BD, Sparks, USA) or trypticase soy agar (TSA) (Bacto, BD, Sparks, USA), respectively, in 5 cm diameter petri dishes (Fisher Scientific, Ottawa, ON, Canada). Mycelium of mould was inoculated as one spot at the center of the PDA dishes. Two freshly inoculated petri dishes of same microorganism, with their lids removed, were placed in a one-liter glass jar. Predetermined amounts of antimicrobial compounds were injected into the jar without contacting the petri dishes, to achieve the calculated headspace concentrations: (1) AITC 0.1-5.0 mg/L; (2) diacetyl, 1-10 mg/L; and (3) cinnamaldehyde, 2-100 mg/L. The jar was enclosed immediately and incubated at 25° C. The growth of the microorganisms was monitored by the colony formation for 3 days.

The combination of the antimicrobial compounds were tested against yeast and mould using the same method described previously. The antimicrobial compounds were mixed at predetermined ratios (Table 18) and injected into the jars where the inoculated petri dishes were placed in. The jars were enclosed and incubated at 25° C. for three days.

TABLE 18

Experimental design for antimicrobial compounds array.

| Sample number | Cinnamaldehyde (mg) | Diacetyl (mg) | AITC (mg) |
|---|---|---|---|
| 1 | 6 | 0.8 | 0.1 |
| 2 | 6 | 0.8 | 0.05 |
| 3 | 6 | 0.8 | 0 |
| 4 | 6 | 0.4 | 0.1 |
| 5 | 6 | 0.4 | 0.05 |
| 6 | 6 | 0.4 | 0 |
| 7 | 6 | 0 | 0.1 |
| 8 | 6 | 0 | 0.05 |
| 9 | 0 | 0 | 0 |
| 10 | 3 | 0.8 | 0.1 |
| 11 | 3 | 0.8 | 0.05 |
| 12 | 3 | 0.8 | 0 |
| 13 | 3 | 0.4 | 0.1 |
| 14 | 3 | 0.4 | 0.05 |
| 15 | 3 | 0.4 | 0 |
| 16 | 3 | 0 | 0.1 |
| 17 | 3 | 0 | 0.05 |
| 18 | 0 | 0.8 | 0.1 |
| 19 | 0 | 0.8 | 0.05 |
| 20 | 0 | 0.4 | 0.1 |
| 21 | 0 | 0.4 | 0.05 |
| 22 | 0 | 0.8 | 0 |
| 23 | 0 | 0 | 0.1 |
| 24 | 6 | 0 | 0 |
| 25 | 30 | 0 | 0 |
| 26 | 0 | 4 | 0 |
| 27 | 0 | 0 | 0.5 |

Dry mung bean seeds were purchased from Bulk Barn store (Guelph, ON, Canada). The seeds were soaked in distilled water for 12 h before germination. The pre-soaked seeds were then washed with distilled water and placed in a flat, perforated container. The seeds were covered with moist paper towels to provide 100% RH conditions and aluminum foil to protect the seeds from light. The whole setup was kept at 25° C. in an environmental chamber (Model MLR-350H, Sanyo Corp., Japan). The seeds were sprayed with distilled water every 8 h and the excess water were drained through the container. The mung bean seeds were allowed to germinate for five days. Then, the sprouts were washed with distilled water and kept at 4° C. before the shelf life experiment.

About 100 g of freshly prepared mung bean sprouts were sealed in a 1 L glass jar with or without antimicrobial compounds (Table 19) at 4° C. In this experiment, only AITC and diacetyl were tested, since no significant change on sprouts treated with cinnamaldehyde (0.1 to 50 mg/L) was found during preliminary experiment.

The headspace oxygen and carbon dioxide concentration was analyzed using a headspace gas analyzer (Model GS3M, Gaspace Advance, Illinois Instruments Inc., Johnsburg, Ill., USA). The sensor probe was attached to a 20 gauge needle (Fisher Scientific, Ottawa, ON, Canada) and inserted into the 1 L jar equipped with a septum. The gas analyzer extracts less than 1 mL of headspace gas and detects the oxygen and carbon dioxide concentration using electrochemical and infrared sensor, respectively. The percentage of oxygen and carbon dioxide content in the jar can be directly read on the digital display panel of the analyzer.

TABLE 19

Experimental design for mung bean sprouts treated with different concentration of antimicrobial compounds.

| Sample number | Amount of AITC (mg) | Amount of diacetyl (mg) |
|---|---|---|
| 1, 12 | 2.5 | 0 |
| 2, 13 | 2.0 | 0 |
| 3, 14 | 1.5 | 0 |
| 4, 15 | 1.0 | 0 |
| 5, 16 | 0.5 | 0 |
| 6, 17 | 0 | 10 |
| 7, 18 | 0 | 8 |
| 8, 19 | 0 | 6 |
| 9, 20 | 0 | 4 |
| 10, 21 | 0 | 2 |
| 11, 22 | 0 | 0 |

As a key quality attribute of mung bean sprout, the weight loss during storage was measured. The weights of the sprout samples were carefully measured with an analytical scale (Fisher Scientific, Ottawa, ON, Canada) down to two decimal places, at the beginning and end of the storage period. The percentage of weight loss ($W_l$) was calculated as equation (Eq. 8):

$$W_l(\%) = \frac{W_f - W_i}{W_i} \times 100\% \qquad (Eq.\ 8)$$

where $W_f$ is the final weight of the sprout sample; $W_i$ is the initial weight of the sample.

After 7 d storage, 10±0.1 g of sprout sample were mashed with 20 mL of sterile saline solution in a stomacher bag (Fisher Scientific, Ottawa, ON, Canada) for 5 min. The suspension was diluted till $10^{-5}$ or $10^{-6}$ with sterile saline solution. Then 0.1 mL of each dilution was spread on plate count agar (PCA) (Sigma, Oakville, ON, Canada). CFU were determined from plates bearing 30-300 colonies.

Freshly-grew mung bean sprout (stored at 4° C. for less than one day) were carefully weighted (25±0.50 g) and sealed in PLA salad bowls (8 oz, NaturalWorks, Minnetonka, Minn., USA). A 10 mL beaker (Fisher Scientific, Ottawa, ON, Canada) was set in the middle of the bowl in order to hold the liquid mix of antimicrobial compounds (0.1 mg AITC, 0.4 mg diacetyl and 6.0 mg cinnamaldehyde) or the antimicrobial carriers. The antimicrobial carriers were prepared as previously described. The PEG and nonwovens carriers were cut into different sizes and weights in order to provide approximately 0.1 mg AITC, 0.4 mg diacetyl and 6.0 mg cinnamaldehyde. Packages of sprouts without antimicrobial treatments were marked as controls. Sprout samples treated with liquid antimicrobial compounds were marked as Treatment 1; those treated with antimicrobial carriers were marked as Treatment 2. A total of 18 samples were prepared for each treatment. Three samples from each group were drawn out for testing at day 0, 3, 5, 7 and 9. All samples were stored at 10° C. for the shelf life testing.

At the end of each storage period, three samples from each group were weighted. The percentage of weight loss was determined as described herein.

At storage time of 0, 3, 5, 7 and 9 days, sprout samples (10±0.1 g) from each group were drawn and mashed with 20 mL of sterile saline solution in a stomacher bag for 5 min. The total microbial loads of samples were measured via total plate count, as described herein.

An aliquot of 5 mL of sprout suspension obtained was used to determine the total titratable acid by titrating the suspension with 0.01 N NaOH to pH 7.0. The volume (mL) of NaOH required for neutralization was recorded as $V_c$. Titration of 5 mL of saline solution was conducted as blank. The volume (mL) of NaOH consumed for titrating the blank was recorded as $V_b$. The total titrable acid was calculated as equation (Eq. 9):

$$n(H^+) = \left(\frac{V_c - V_b}{1000}\right) L \times 0.01 \text{ mol/L} \qquad (Eq.\ 9)$$

To measure the hardness of mung bean sprouts, a three-point bending test was conducted using an Instron Universal Testing Machine (Model 1122; Instron, Norwood, Mass., USA) at room temperature (22±2° C.). The hypocotyl of the sprout sample was held on two stationary bending supports 0.5 mm apart, and the crosshead travels at central axis with a displacement rate of 200 mm/min. The diameter of the sprout and the maximum compression force were derived from the test. Hardness of the mung bean sprouts were calculated by averaging 60 sprout samples each group, and the data were expressed in N/mm.

Example IV

Encapsulation and Release of Thymol Using Ethyl Cellulose-PEO Electrospun Nonwovens Thymol, magnesium chloride, magnesium nitrate, sodium chloride, and potassium nitrate were purchased from Fisher Scientific Company (Ottawa, ON, Canada). PEO (PEO900, $M_w$=900 kDa; and PEO300, $M_w$=300 kDa) and EC (22 cP, 46-48% ethoxy content), were purchased from Sigma Aldrich (Oakville, ON, Canada). Anhydrous ethanol was supplied by Commercial Alcohols (Brampton, ON, Canada).

10% (w/w) EC was mixed with 1% (w/w) PEO300, 1% (w/w) PEO900 and 2% (w/w) PEO300 respectively and dissolved in 80% (v/v) aqueous ethanol solution. Thymol was then added into the polymer solutions, at loading levels of 1, 3, and 5% (w/w) respectively, and stirred for 12 h using a magnetic stirrer. All the solutions were prepared at 21±2° C. in a 15 mL capped vial to prevent solvent evaporation.

Solution viscosity was determined using a shear capillary rheometer mounted on an Instron Universal Testing Machine (Model 1122, Instron, Norwood, Mass., USA). Tests were conducted at different crosshead speeds (200, 400, 600, 800, and 1000 mm min$^{-1}$) at 21±2° C. The length of the capillary was 150 mm and the inner diameter was 1.5 mm. The area of the plunger was 5.3 cm$^2$. The viscosity was measured from the pressure drop (related to shear stress) and the flow rate (related to shear rate), considering the polymer solution as non-Newtonian fluid. The shear stress, σ (Pa), was calculated as follow:

$$\sigma = \frac{F}{4A_p\left(\frac{L_c}{D_c}\right)} \qquad (Eq.\ 10)$$

where $F$ is the force on plunger $(kgF)$, $A_p$ is the plunger area $(m^2)$, $L_c$ is the length of the capillary $(m)$, and $D_c$ is the capillary diameter $(m)$. Rabinowitsch correction was applied as follows for calculating the shear rate, $\gamma(s^{-1})$:

where F is the force on plunger (kgF), $A_p$ is the plunger area (m$^2$), $L_c$ is the length of the capillary (m), and $D_c$ is the capillary diameter (m). Rabinowitsch correction was applied as follows for calculating the shear rate, $\gamma$ (s$^{-1}$):

$$\gamma = \frac{3n+1}{4n} \times \frac{8VD_p^2}{D_c^3} \quad \text{(Eq. 11)}$$

where $n$ is the flow behavior index (dimensionless), $V$ is the crosshead speed (m s$^{-1}$), and $D_p$ is the diameter of plunger (m). The slope of the log($\sigma$) versus ($\gamma$) was used to determine the $n$ value. Subsequently, the apparent viscosity, $\mu$ (cP), was calculated as follow:

where n is the flow behavior index (dimensionless), V is the crosshead speed (m s$^{-1}$), and $D_p$ is the diameter of plunger (m). The slope of the log ($\sigma$) versus log ($\gamma$) was used to determine the n value. Subsequently, the apparent viscosity, $\mu$ (cP), was calculated as follow:

$$\mu = \frac{\sigma}{\gamma} \times 1000 \quad \text{(Eq. 13)}$$

The electrical conductivity of polymer solution was determined using a conductivity meter (Accumet® XL20, Fisher Scientific, Ottawa, ON, Canada). The dynamic surface tension of polymer solution was determined using a bubble pressure tensiometer (SITA pro line f10, SITA Messtechnik GmbH, Dresden, Germany). The tensiometer was equipped with a capillary and air was bubbled continuously into the polymer solution at a fixed bubbling frequency 1 Hz. All tests were conducted at 21±2° C.

The polymer solution prepared above was electrospun using a free surface wire electrospinner (NS LAB, Elmarco, Czech Republic). A constant voltage 35 kV was applied to the wire electrode. The electrospinning solution was loaded into a 10 mL carriage, which glided back and forth along the wire electrode, coating the spin dope evenly onto the wire electrode. The carriage moving speed and distance between wire electrode and substrate were set to 100 mm s$^{-1}$ and 240 mm respectively. All the spinning experiments were conducted at 25±2° C. and 45% RH. The electrospun fibers were deposited on a spun-bound polypropylene nonwoven substrate.

A scanning electron microscope (SEM) (Model S-570, Hitachi High Technologies Corp., Tokyo, Japan), at an accelerating voltage of 10 kV, was used to evaluate the morphology and diameter of the electrospun fibers. Fibers were coated with 20 nm of gold using a sputter coater (Model K550, Emitech, Ashford, Kent, England). Image analysis software (Image Pro-Premier 9.1, Media Cybernetics Inc., Rockville, Md., USA) was used to determine the average diameter of electrospun fibers by measuring them at 200 different points for each image.

Electrospun EC-PEO nonwovens were analyzed using a FTIR spectrometer (IRPrestige21, Shimadzu Corp., Kyoto, Japan), equipped with an ATR cell (Pike Technologies, Madison, Wis., USA). Prior to testing each sample, a measurement was taken using air as the background. Samples were then mounted on the ATR sapphire crystal, compressed with a press, and scanned between 600 and 4000 cm$^{-1}$ at 4 cm$^{-1}$ resolution. An average of 40 scans was taken for each spectrum. Three spots were randomly selected from each sample for analysis. Spectra were analyzed using the IRsolution software (Shimadzu Corp., Kyoto, Japan).

Electrospun nonwovens (20±1 mg) were submerged in 80% (v/v) aqueous ethanol solution for 24 h at room temperature to dissolve the polymers and thymol. The thymol content was quantified by UV absorption spectrophotometry (Evolution 60s, Thermo Fisher Scientific, MA, USA), measuring the absorbance at a wavelength of 276 nm, and quantified using a calibration curve ($R^2$=0.99). The calibration curve was prepared by dissolving various quantities of thymol and an equivalent of electrospun EC-PEO nonwovens to account for any matrix effects. The LC and EE of thymol were calculated:

$$LC\ (\%) = \frac{m_t}{m_f} \times 100\% \quad \text{(Eq. 13)}$$

$$EE\ (\%) = \frac{m_t}{m_l} \times 100\% \quad \text{(Eq. 14)}$$

where $m_t$ is the measured thymol weight in nonwovens, $m_f$ is the weight of electrospun nonwovens, and $m_l$ is the theoretical thymol loading in spin dope that is used for electrospinning where $m_t$ is the measured thymol weight in nonwovens, $m_f$ is the weight of electrospun nonwovens, and $m_l$ is the theoretical thymol loading in spin dope that is used for electrospinning.

Hansen Solubility Parameters (HSP) values were determined to predict the affinity of thymol to solvent and polymers, the compatibility between polymers, and the solubility of polymers in solvents. HSP was calculated based on the total energy of vaporization, $\delta^2$, which is equaled to the sum of the squares of the Hansen dispersion ($\delta_D$), polar interaction ($\delta_P$), and hydrogen bonding ($\delta_H$) parameters:

$$\delta^2 = \delta_D^2 + \delta_P^2 + \delta_H^2 \quad \text{(Eq. 15)}$$

The unit of solubility parameters is (MPa)$^{1/2}$ and those for a binary mixture were calculated according to:

$$\delta_{blend} = \varphi_1 \sigma_1 + \varphi_2 \sigma_2 \quad \text{(Eq. 16)}$$

where $\varphi$ is the volume fraction of specific solvent, i, components. The solubility parameter "distance" in Hansen space ($R_a$) between two materials was calculated based on their respective partial solubility parameter components:

$$R_a = \sqrt{4(\delta D_1 - \delta D_2)^2 + (\delta P_1 - \delta P_2)^2 + (\delta H_1 - \delta H_2)^2} \quad \text{(Eq. 17)}$$

The unit of $R_a$ is (MPa)$^{1/2}$. Low $R_a$ value indicates high affinity between two components, while progressively higher $R_a$ indicates progressively lower affinity.

The thymol release behavior of electrospun nonwovens was evaluated under different RH conditions. The electrospun sample (150-200 mg) was placed in a sealed glass jar (946 mL, Piramal Glass USA Inc., Marlton, N.J., U.S.A) in which the RH values were adjusted to 33, 53, 75, and 93% respectively by binary saturated aqueous salt solution (magnesium chloride, magnesium nitrate, sodium chloride, and potassium nitrate respectively) and then stored at 25° C. for 11 days. At pre-determined time intervals, a sample of 15 mg was withdrawn from the glass jar and the thymol residue was measured according to method described in Section 2.8. The amount of thymol released was calculated by subtracting the thymol residue from the total amount of encapsulated thymol within sample:

$$(m_{ft} - m_{rt}) \times LC_1 = m_{ti} - m_{ri} \quad \text{(Eq. 18)}$$

$$m_{rt} = \frac{m_{fi} \times LC_{i-m_{ti}}}{1 - LC_1} \quad \text{(Eq. 19)}$$

$$\% \text{ release} = \frac{m_{ri}}{m_{ri} - m_{ri}} \times 100\% \quad \text{(Eq. 20)}$$

where $m_{fi}$, $m_{ri}$ and $m_{ti}$ are the weights of electrospun nonwovens, the amount of thymol released and the amount of thymol residue measured in the electrospun sample after being stored at tested RH for pre-determined time. $LC_1$ is the $LC$ of freshly prepared thymol-incorporated EC-PEO nonwovens before exposure to different RH conditions.

where $m_{fi}$, $m_{ri}$ and $m_{ti}$ are the weights of electrospun nonwovens, the amount of thymol released and the amount of thymol residue measured in the electrospun sample after being stored at tested RH for pre-determined time. $LC_1$ is the LC of freshly prepared thymol-incorporated EC-PEO nonwovens before exposure to different RH conditions.

All determinations were carried out in triplicate and results were expressed as the mean values±standard deviations. Significant differences among samples were assessed with analysis of variance (one-way ANOVA with Tukey's post hoc test), using SPSS 17 (SPSS Inc., Chicago, Ill., USA) statistical software. The probability of test statistic (p) was set at 0.05. An empirical mathematical model that is based on the pseudo first order kinetics was fitted in the release profiles of thymol:

$$C = C_e(1 - e^{-kt}) \quad \text{(Eq. 21)}$$

where C is the percentage of released thymol at time t; $C_e$ is the equilibrium percentage of released thymol; and k is the diffusion rate ($h^{-1}$). Nonlinear regression analyses were conducted to estimate the two parameters, $C_e$ and k, using the Solver function in Microsoft® Excel spreadsheet package (Microsoft Office 2010, Redmond, Wash., U.S.A.). The Generalized Reduced Gradient (GRG) nonlinear algorithm option was selected to set the coefficient of determination close to 1.0 (i.e., smaller or equal to 1.0) by changing the two parameters, $C_e$ and k, without imposing any constraints.

Example V

Encapsulation and Release of Carvacol Using Electrospun Cellulose Acetate-Poly(Ethyleneoxide) Nonwovens CA (Mn~300,000, 39.8% acetyl), PEO (PEO100, $M_w$=100 kDa; and PEO300, $M_w$=300 kDa) and carvacrol were purchased from Sigma Aldrich (Oakville, ON, Canada). Glacial acetic acid, acetone, magnesium chloride, magnesium nitrate, sodium chloride, and potassium nitrate were purchased from Fisher Scientific Company (Ottawa, ON, Canada). Anhydrous ethanol was supplied by Commercial Alcohols (Brampton, ON, Canada).

Solvents were prepared by blending glacial acetic acid and acetone in 1:0, 3:1, 1:1, 1:3 and 0:1 acetic acid:acetone weight ratios. CA was then added at 10% (w/w) concentration for electrospinning of CA fibers. CA and PEO were added, at 10:1 (w/w) ratio, to give a total polymer concentration of 11% (w/w) for electrospinning of CA-PEO fibers. The solutions were stirred for 12 h using a magnetic stirrer, followed by the addition of carvacrol at 1, 5 and 10% (w/w) loading levels. The solutions were then stirred for 1 h to form the final spin dopes. The final polymer solutions prepared were all clear and transparent, implying both polymers and carvacrol were well-dissolved in the solvent mixture. All the solutions were prepared at 22±2° C. in 15 mL capped vials to prevent the evaporation of solvent.

HSP values were calculated as described previously.

The vapor pressure of pure solvent was calculated based on Antoine equation:

$$P = \left(10^{A - \frac{B}{C+T}}\right) \times 0.13 \quad \text{(Eq. 22)}$$

where P is the vapor pressure (kPa), and T is the temperature (°C). A, B, and C are component-specific constants. The values are 7.38782, 1533.313, and 222.309 acetone. The vapor pressure of solvent mixture was calculated based on Raoult's Law:

where P is the vapor pressure (kPa), and T is the temperature (° C.). A, B, and C are component-specific constants. The values are 7.38782, 1533.313, and 222.309 respectively for acetic acid, and 7.11714, 1210.595, and 229.664 respectively for acetone. The vapor pressure of solvent mixture was calculated based on Raoult's Law:

$$P_{mix} = \Sigma_i P_i x_i \quad \text{(Eq. 23)}$$

where $P_{mix}$ is the vapor pressure of solvent mixture, i is the solvent component index, $P_i$ is the vapor pressure of the pure solvent at a particular temperature, and $x_i$ is the mole fraction.

Solution viscosity was determined as described herein.

The electrical conductivity of polymer solution was determined using a conductivity meter (Accumet® XL20, Fisher Scientific, Ottawa, ON, Canada). The dynamic surface tension of polymer solution was determined using a bubble pressure tensiometer (SITA pro line f10, SITA Messtechnik GmbH, Dresden, Germany). The tensiometer was equipped with a capillary and air was bubbled continuously into the polymer solution at a fixed bubbling frequency of 1 Hz.

The dielectric constant of solvent mixture was calculated based on the dielectric constant of individual pure solvents at 20° C. The polarization per unit volume of the solvent (p) is related to the dielectric constant (ε):

$$p = \frac{(\varepsilon - 1)(2\varepsilon + 1)}{9\varepsilon} \quad \text{(Eq. 24)}$$

Using Oster's rule, the polarization of a mixture of n component can be expressed as:

$$p_m = \frac{\sum_{i=1}^{n} x_i v_i p_i}{\sum_{i=1}^{n} x_i v_i} \quad \text{(Eq. 25)}$$

-continued where $p_m$ is the polarization per unit volume of the solvent mixture, $i$ is the solvent component index. $x_i$, $v_i$ and $p_i$ are the mole fraction, molar volume, and polarization per unit volume of each pure solvent, respectively. The dielectric constant of the solvent mixture was obtained after calculating of $p_m$.

where $p_m$ is the polarization per unit volume of the solvent mixture, i is the solvent component index. $x_i$, $v_i$ and $p_i$ are the mole fraction, molar volume, and polarization per unit volume of each pure solvent, respectively. The dielectric constant of the solvent mixture was obtained after calculating of $p_m$.

The spin dope prepared was electrospun using free surface wire electrospinner (NS LAB, Elmarco, Czech Republic). A constant voltage 35 kV was applied to the spinning electrode. The electrospinning solution was loaded into a 10 mL carriage, which swept back and forth along the wire electrode, coating the spin dope onto wire. The carriage moving speed and distance between spinning electrode and substrate were set to 100 mm s$^{-1}$ and 240 mm respectively. The electrospun nonwovens were deposited on spun-bound polypropylene nonwoven substrate. All the spinning experiments were conducted at 25° C. and 45% RH.

A SEM (Model S-570; Hitachi High Technologies Corp., Tokyo, Japan), at an accelerating voltage of 10 kV, was used to evaluate the morphology and diameter of the electrospun fibers. These fibers were coated with 20 nm of gold using a sputter coater (Model K550, Emitech, Ashford, Kent, England). Image analysis software (Image Pro-Premier 9.1; Media Cybernetics Inc., Rockville, Md., USA) was used to determine the average diameter of electrospun fibers by measuring them at 200 different points for each image.

Electrospun nonwovens were analyzed using a FTIR spectrometer (IRPrestige21, Shimadzu Corp., Kyoto, Japan), equipped with an ATR cell (Pike Technologies, Madison, Wis., USA). A measurement of air was taken and used as the background. Samples were then mounted directly on the ATR sapphire crystal, compressed with a press, and scanned between 600 and 4000 cm$^{-1}$ for 40 times at 4 cm$^{-1}$ resolution. Three spots were randomly selected from samples for analysis. Spectra were analyzed using the IRsolution software (Shimadzu Corp., Kyoto, Japan).

Electrospun nonwovens (20±1 mg) were submerged in anhydrous ethanol for 48 h at room temperature to extract carvacrol from electrospun CA-PEO nonwovens. The carvacrol content was quantified as described previously.

The carvacrol release behavior of electrospun CA-PEO nonwovens was evaluated under different RH conditions at 25° C. for 12 days as described previously.

All determinations were carried out in triplicate and results were expressed as the mean values±standard deviations as described previously.

While the present disclosure has been described in connection with specific embodiments thereof, it will be understood that it is capable of further modifications and this application is intended to cover any variations, uses, or adaptations, including such departures from the present disclosure as come within known or customary practice within the art and as may be applied to the essential features hereinbefore set forth, and as follows in the scope of the appended claims.

What is claimed is:

1. A composition for controlled-release of volatile compounds to preserve food, comprising:
two polymers and at least one antimicrobial volatile compound comprising an antimicrobial volatile impregnated material, the antimicrobial volatile impregnated material comprised of a melt blended sheeting of two polyethylene glycol (PEG) polymers, one of the PEG polymers having a high molecular weight of at least PEG 10k and another of the PEG polymers having a low molecular weight of at PEG 400 or lower or the antimicrobial volatile impregnated material comprised of insoluble electrospun nonwoven fibers wherein the two or more polymers comprise polyethylene oxide (PEO) and polylactic acid (PLA).

2. The composition of claim 1, wherein the two PEG polymers have a molecular mass from about 100 Da to about 50,000 Da.

3. The composition of claim 2, wherein the two PEG polymers comprise PEG400 and PEG10K in a ratio by weight of PEG400 and PEG10K from about 1:4 to about 4:1.

4. The composition of claim 1, wherein the at least one volatile compound comprises diacetyl and allyl isothiocyanate (AITC) up to 10% (w/w) based on weight of the PEG polymers.

5. The composition of claim 1, wherein the at least one volatile compound comprise about 0.05% (w/w) to about 5% (w/w) based on weight of the PEG polymers.

6. The composition of claim 1, wherein the antimicrobial compound is selected from the group consisting of allyl isothiocyanate (AITC), diacetyl, cinnamaldehyde, thymol, or carvacrol or a combination thereof.

7. The composition of claim 6, wherein the antimicrobial compound is selected from the group consisting of allyl isothiocyanate (AITC) or diacetyl or a combination thereof.

8. The composition of claim 7, wherein the antimicrobial compound comprises a mixture of diacetyl and AITC in a weight ratio of between 9:1.

9. The composition of claim 1, wherein the antimicrobial compound comprises a mixture of diacetyl, AITC and cinnamaldehyde in a ratio of 1:4:60, respectively.

10. The composition of claim 1, wherein the two or more polymers comprise the electrospun fibers to form a carrier, the at least one volatile compound dispersed in the carrier.

11. The composition of claim 1, wherein the mixture of PLA and PEO is in a ratio of 7:3.

12. The composition of claim 1, wherein the electrospun nonwovens fibers are prepared from electrospinning a solution containing the PEO and a cellulose derivative.

13. The composition of claim 12, wherein the cellulose derivative comprises one of ethylcellulose (EC) or cellulose acetate (CA).

14. The composition of claim 1, wherein the composition is provided in packaging material for a food product.

15. The composition of claim 3, wherein a crystallinity of PEG10K is greater than 96%.

16. The composition of claim 11, wherein a mixture of 9% PLA and 3% PEO in Tetrahydrofuran (THF) at a weight ratio of 7:3 results in a depression of PLA melting point of at least 30 degrees C. as cinnamaldehyde is increased to 42% w/w.

17. The composition of claim 16, wherein when the cinnamaldehyde loading is increased from a 0 to 42% level, a blue shift for the absorbance at approximately 1082 cm$^{-1}$ is present due to C—O—C vibration as detected by Fourier transform infrared spectroscopy, by 5 to 10 cm$^{-1}$.

18. The composition of claim 16, wherein when cinnamaldehyde loading is increased from a 0 to 42% level, a blue shift for the absorbance at approximately 1749 cm$^{-1}$ is present due to C=O vibration as detected by Fourier transform infrared spectroscopy, by 5 to 10 cm$^{-1}$.

19. The composition of claim 13, wherein polymer solutions for electrospinning are comprised of 10% w/w EC at 46-48% ethoxy content, 1% w/w PEO300, and thymol at 1, 3 or 5% w/w dissolved in 80% v/v aqueous ethanol.

20. The composition of claim 19, wherein when thymol loading increased from 5% level, a red shift for the absorbance is present at approximately 1242 cm$^{-1}$ due to C—O vibration of thymol as detected by Fourier transform infrared spectroscopy, by 5 to 10 cm$^{-1}$.

21. The composition of claim 13, wherein polymer solutions for electrospinning are comprised of 10% w/w CA at 40% acetyl content, 1 w/w PEO100 or PEO300, and carvacrol at 1, 5 or 10% w/w dissolved in acetic acid:acetone at a ratio of 1:0, 3:1 or 1:1 v/v blend solvent.

22. The composition of claim 21, wherein an addition of carvacrol would not result in any shift in Fourier transformed infrared spectra for the two or more polymers and carvacrol.

* * * * *